United States Patent
Mikkelsen et al.

(10) Patent No.: US 9,712,582 B2
(45) Date of Patent: Jul. 18, 2017

(54) TELEPHONE INITIATED PROTOCOL-IMPROVED MEDIA DELIVERY PLATFORM

(75) Inventors: John Mikkelsen, Minneapolis, MN (US); Robert Freidson, St. Petersburg (RU)

(73) Assignee: Skky, LLC, Minneapolis, MN (US)

( * ) Notice: Subject to any disclaimer, the term of this patent is extended or adjusted under 35 U.S.C. 154(b) by 367 days.

(21) Appl. No.: 12/322,537

(22) Filed: Feb. 4, 2009

(65) Prior Publication Data

US 2010/0191608 A1     Jul. 29, 2010

Related U.S. Application Data

(63) Continuation-in-part of application No. 10/183,756, filed on Jun. 26, 2002, now Pat. No. 7,548,875.

(60) Provisional application No. 60/301,681, filed on Jun. 27, 2001, provisional application No. 60/303,115, filed on Jul. 3, 2001, provisional application No.
(Continued)

(51) Int. Cl.
| | |
|---|---|
| *H04L 27/10* | (2006.01) |
| *H04L 29/06* | (2006.01) |
| *G06Q 30/06* | (2012.01) |
| *H04M 1/02* | (2006.01) |

(Continued)

(52) U.S. Cl.
CPC ..... *H04L 65/4084* (2013.01); *G06Q 30/0601* (2013.01); *G06Q 30/0603* (2013.01); *H04L 29/06027* (2013.01); *H04L 65/607* (2013.01); *H04L 67/04* (2013.01); *H04L 69/04* (2013.01); *H04L 69/329* (2013.01); *H04L 67/06* (2013.01); *H04M 1/0254* (2013.01); *H04M 2250/64* (2013.01); *H04W 4/12* (2013.01)

(58) Field of Classification Search
USPC ..................................................... 705/50–79
See application file for complete search history.

(56) References Cited

U.S. PATENT DOCUMENTS

| | | | |
|---|---|---|---|
| 4,446,334 A | 5/1984 | Groff | |
| 5,282,222 A | 1/1994 | Fattouche et al. | |
| (Continued) | | | |

FOREIGN PATENT DOCUMENTS

| | | |
|---|---|---|
| GB | 2324935 | 11/1998 |
| WO | WO 01/39473 | 5/2001 |
| WO | WO 01/39476 | 5/2001 |

OTHER PUBLICATIONS

White, Ron, How Computers Work, 9th Ed., Que Corporation, Nov. 14, 2007.*

(Continued)

*Primary Examiner* — James Detweiler
(74) *Attorney, Agent, or Firm* — Patterson Thuente Pedersen, P.A.

(57) ABSTRACT

The present invention relates to a method of delivering an audio and/or visual file over the air (wireless) from one or more servers to an electronic device, dependent or independent on an Internet connection, after inquiry and/or ordering said delivery from one or more of a dialed telephone number, dialing a toll-free number, and SMS and/or MMS message, comprising transmitting a compressed audio and/or or visual file to said electronic device, and wherein said electronic device is effective to receive said compressed audio and/or visual file and playback said audio and/or visual content of said file on demand by the user.

11 Claims, 27 Drawing Sheets

Related U.S. Application Data

60/312,450, filed on Aug. 14, 2001, provisional application No. 60/343,159, filed on Oct. 26, 2001.

(51) Int. Cl.
  *H04W 4/12* (2009.01)
  *H04L 29/08* (2006.01)

(56) References Cited

U.S. PATENT DOCUMENTS

| | | | |
|---|---|---|---|
| 5,481,599 A * | 1/1996 | MacAllister et al. | ... 379/101.01 |
| 5,629,867 A | 5/1997 | Goldman | |
| 5,664,111 A | 9/1997 | Nahan et al. | |
| 5,732,216 A | 3/1998 | Logan et al. | |
| 5,809,145 A | 9/1998 | Slik et al. | |
| 5,841,808 A | 11/1998 | Rizzo et al. | |
| 5,884,262 A | 3/1999 | Wise et al. | |
| 5,918,213 A | 6/1999 | Bernard et al. | |
| 5,926,789 A | 7/1999 | Barbara et al. | |
| 5,949,411 A | 9/1999 | Doerr et al. | |
| 5,963,916 A | 10/1999 | Kaplan | |
| 6,006,105 A | 12/1999 | Rostoker et al. | |
| 6,044,089 A | 3/2000 | Ferriere | |
| 6,061,306 A | 5/2000 | Buchheim | |
| 6,112,103 A | 8/2000 | Puthuff | |
| 6,122,347 A | 9/2000 | Borland | |
| 6,151,634 A | 11/2000 | Glaser et al. | |
| 6,167,251 A | 12/2000 | Segal et al. | |
| 6,173,316 B1 | 1/2001 | De Boor et al. | |
| 6,178,230 B1 | 1/2001 | Borland | |
| 6,188,717 B1 | 2/2001 | Kaiser et al. | |
| 6,192,340 B1 | 2/2001 | Abecassis | |
| 6,247,130 B1 | 6/2001 | Fritsch | |
| 6,253,122 B1 | 6/2001 | Razavi et al. | |
| 6,282,270 B1 | 8/2001 | Porter | |
| 6,291,756 B1 | 9/2001 | Urbanek | |
| 6,301,339 B1 | 10/2001 | Staples et al. | |
| 6,332,139 B1 | 12/2001 | Kaneko et al. | |
| 6,335,973 B1 | 1/2002 | Case | |
| 6,347,112 B1 | 2/2002 | Lattard et al. | |
| 6,418,330 B1 * | 7/2002 | Lee | ... 455/567 |
| 6,798,838 B1 * | 9/2004 | Ngo | ... 375/240.19 |
| 6,845,398 B1 | 1/2005 | Galensky et al. | |
| 6,912,241 B2 | 6/2005 | Giannakis et al. | |
| 7,031,453 B1 * | 4/2006 | Busardo | ... 379/373.02 |
| 7,065,342 B1 * | 6/2006 | Rolf | ... 455/412.1 |
| 7,076,202 B1 | 7/2006 | Billmaier | |
| 7,085,377 B1 * | 8/2006 | Norr | ... 380/37 |
| 7,092,431 B2 | 8/2006 | Maeda et al. | |
| 7,733,939 B2 | 6/2010 | Trachewsky | |
| 2001/0000505 A1 | 4/2001 | Segal et al. | |
| 2001/0009846 A1 | 7/2001 | Loeuillet | |
| 2001/0014616 A1 | 8/2001 | Matsuda et al. | |
| 2001/0024965 A1 | 9/2001 | Hayashi | |
| 2001/0026609 A1 | 10/2001 | Weinstein et al. | |
| 2001/0029192 A1 | 10/2001 | Oh | |
| 2001/0034803 A1 | 10/2001 | Sorek et al. | |
| 2001/0041588 A1 | 11/2001 | Hollstrom et al. | |
| 2001/0043684 A1 | 11/2001 | Guedalia et al. | |
| 2001/0044747 A1 | 11/2001 | Ramachandran et al. | |
| 2001/0049262 A1 | 12/2001 | Lehtonen | |
| 2001/0049566 A1 | 12/2001 | Kim | |
| 2001/0050991 A1 | 12/2001 | Eves | |
| 2001/0051926 A1 | 12/2001 | Wang | |
| 2001/0055371 A1 | 12/2001 | Baxter, Jr. | |
| 2002/0002035 A1 | 1/2002 | Sim et al. | |
| 2002/0002627 A1 | 1/2002 | Stead et al. | |
| 2002/0010740 A1 | 1/2002 | Kikuchi et al. | |
| 2002/0026867 A1 | 3/2002 | Hasegawai et al. | |
| 2002/0106074 A1 | 8/2002 | Elliott | |
| 2002/0175665 A1 | 11/2002 | O'Grady et al. | |
| 2002/0193094 A1 * | 12/2002 | Lawless et al. | ... 455/407 |
| 2004/0214551 A1 | 10/2004 | Kim | |
| 2005/0004875 A1 * | 1/2005 | Kontio et al. | ... 705/52 |
| 2006/0168451 A1 | 7/2006 | Ishibashi et al. | |

OTHER PUBLICATIONS

Derfler, Frank J. et. al., How Networks Work, 7th Ed., Que Corporation, Oct. 18, 2004.*

Gralla, Preston, How the Internet Works, 8th Ed., Que Corporation, Nov. 21, 2006.*

Gralla, Preston, How Wireless Works, 2nd Ed., Que Corporation, Oct. 24, 2005.*

"OFDM/FM Frame Synchronization for Mobile Radio Data Communication"—William D. Warner and Cyril Leung (pulished in IEEE Transactions on Vehicular Technology on Aug. 1993).*

OFDM/FM Frame Synchronization for Mobile Radio Data Communication (published in Aug. 1993).

DRT: Greenman, Catherine; "Personalize Your Cell Phone by Using the Sound of Music," Houston Chronicle, Apr. 28, 2000, p. 6, Proquest #53115394, 3 pgs.

Woody, Jerome; "Favorite Tunes are a Download Away," Syracuse Herald Journal, Aug. 5, 1999, p. 9, Proquest #43720095, 3 pgs.

Majidimehr, et al. "Delivering Compressed Multimedia," Electronic Engineering Times, Nov. 22, 1999, n 1088 p. 72, Proquest #46780967, 3 pgs.

Ling, Connie; "Ring My Bell: Mobile Phones That Jingle . . . That Ring Their Favorite Tunes," Asian Wall Street Journal, Jun. 22, 1998, Proquest #30338788, 4 pgs.

Chen, James; "IEEE 802.11a—Speeding up Wireless Connectivity in the Home," Communication Systems Design, Feb. 2001, Proquest #68587621, 8 pgs.

Breen, Christopher; "Professional Audio Tools," Macworld, Sep. 1998; vL519, p. 59, Proquest #32528807, 3 pgs.

Amazon.Com web page [online] [retrieved on Jul. 31, 2002] Retrieved from Internet: http://www.amazon.com/exec/obidos/tg/browse/-/5174/ref=gw_br_mu/103-8907110-3440637http://www.amazon.com/exec/obidos/tg/browse/-/5174/ref=gw_br_mu/103-8907110-3440637.

Linden Decarmo, PC Magazine, "Solutions, Tools and Tips for the Internet Age"—Issue date Jun. 26, 2001, 3 pgs.

Web pages of Interactive Week: Interview: Thomas Dolby Goes Mobile—Issue Date Mar. 1, 2001, 4 pages.

John C. Dvorak, PC Magazine, "Inside"—Issue date May 22, 2001.

Steve Lohr, The New York Times, Nokia to Join With I.B.M. in 2 Ventures on Software, Issue Date Jul. 9, 2002.

Nokia Cellular Phones [online] [retrieved on Jul. 31, 2002] Retrieved from the Internet:http://www.nokia.com.

DRT: Ling, Connie; "Technology Journal—Sense of Site: Phone Fans Flock to Musical Web Sites," Asian Wall Street Journal, Apr. 24, 2000, p. T.2, Proquest #56075609, 3 pgs.

\* cited by examiner

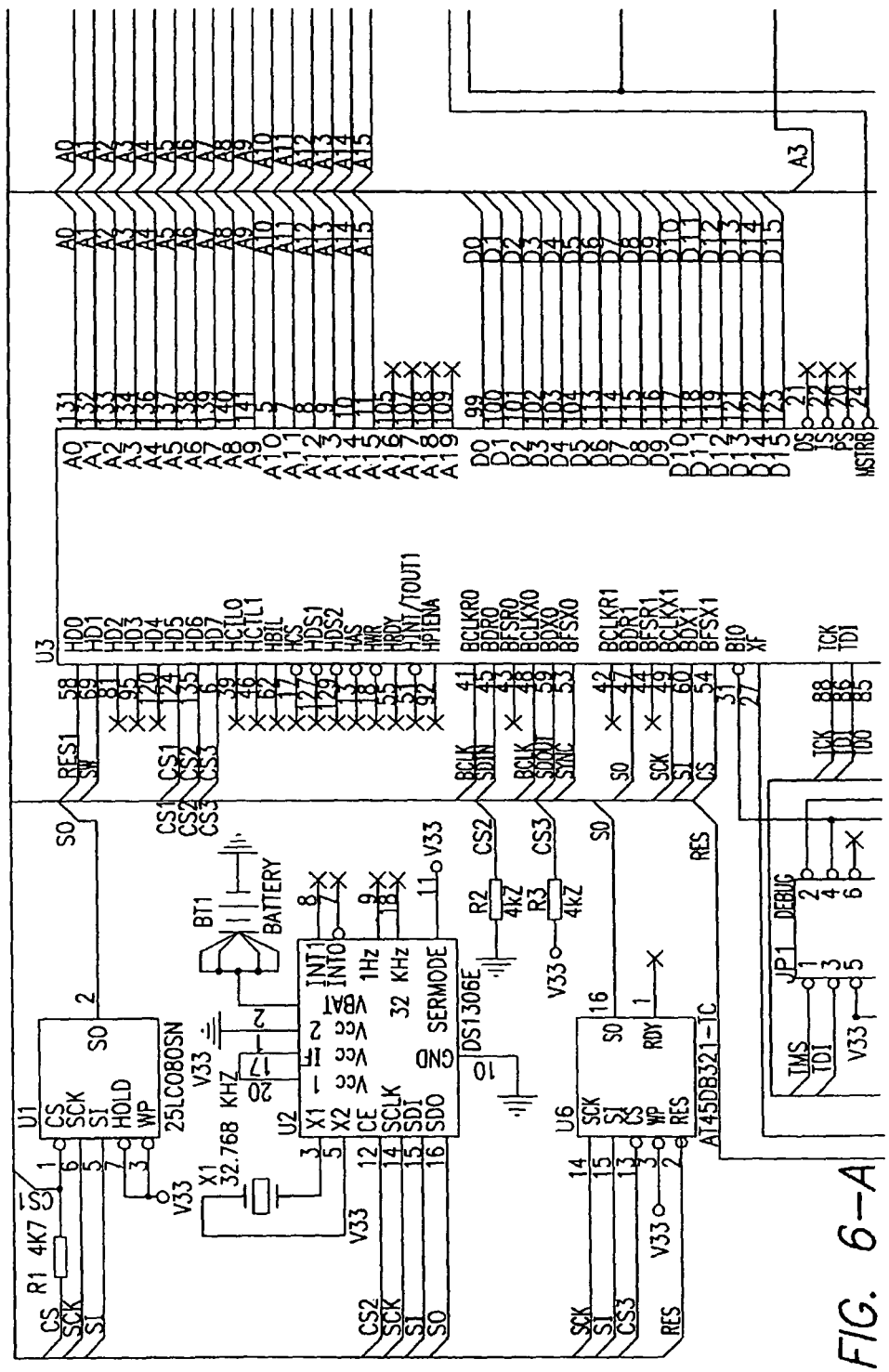
FIG. 6-A

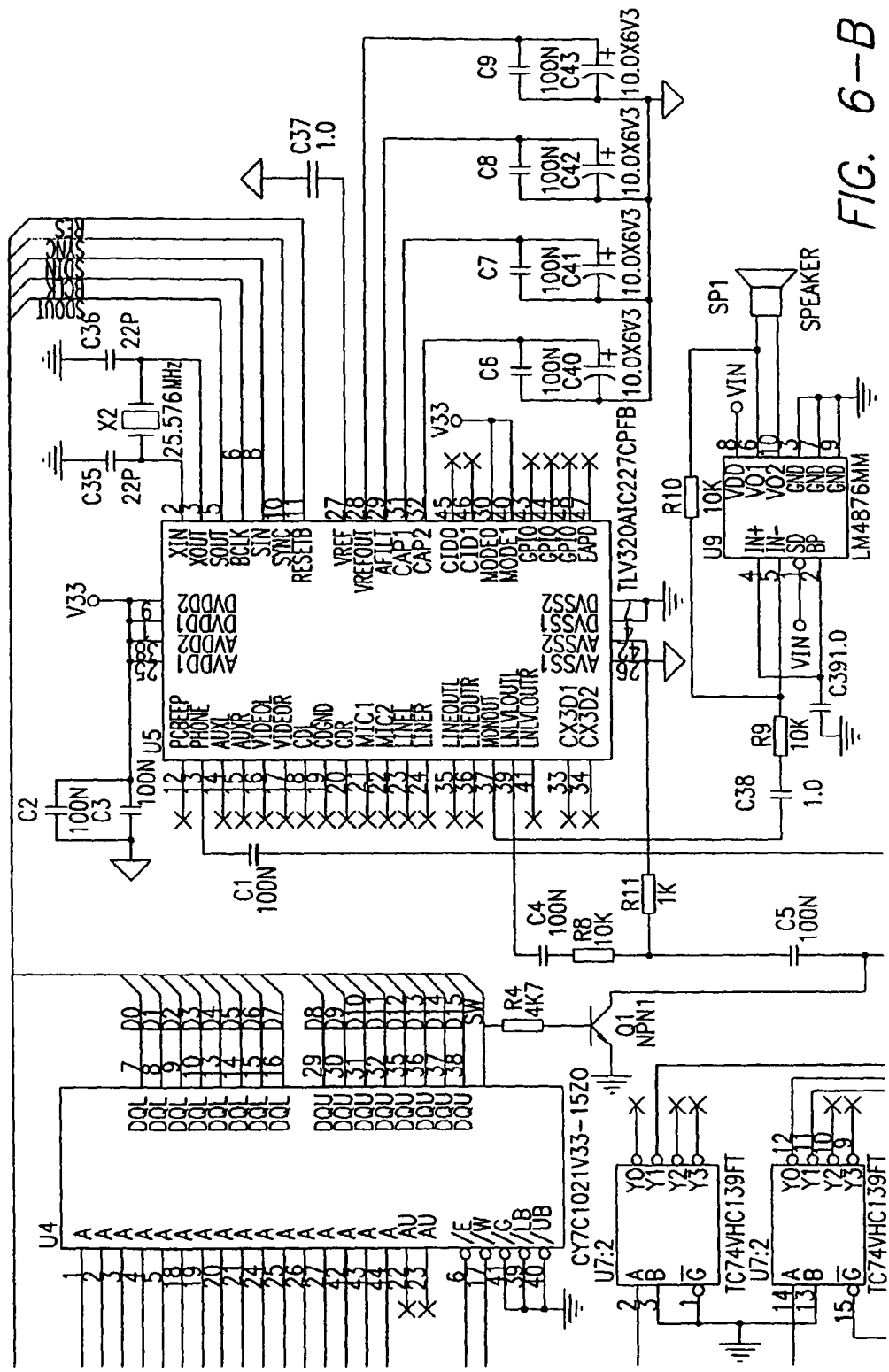
FIG. 6-B

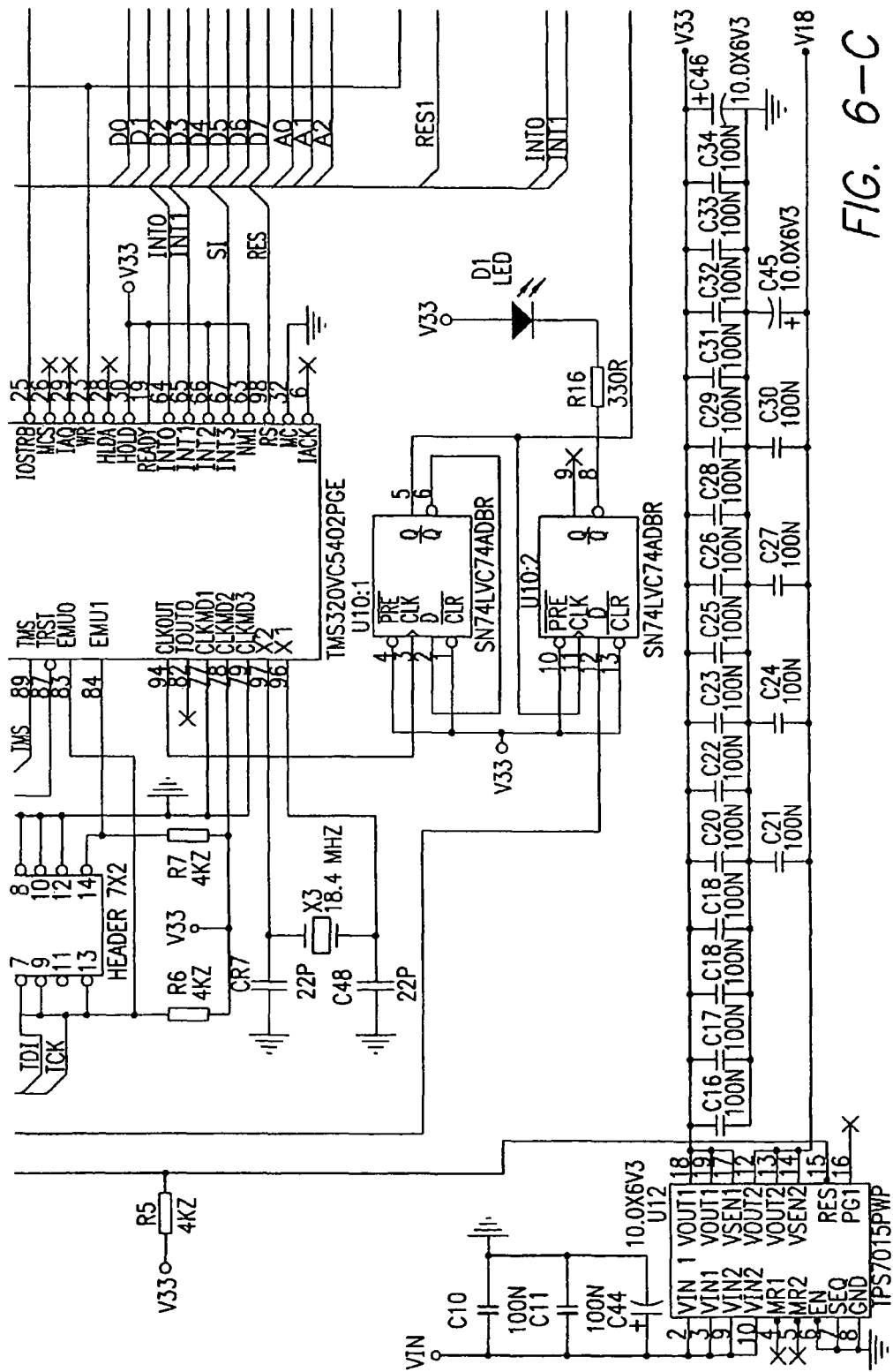
FIG. 6-C

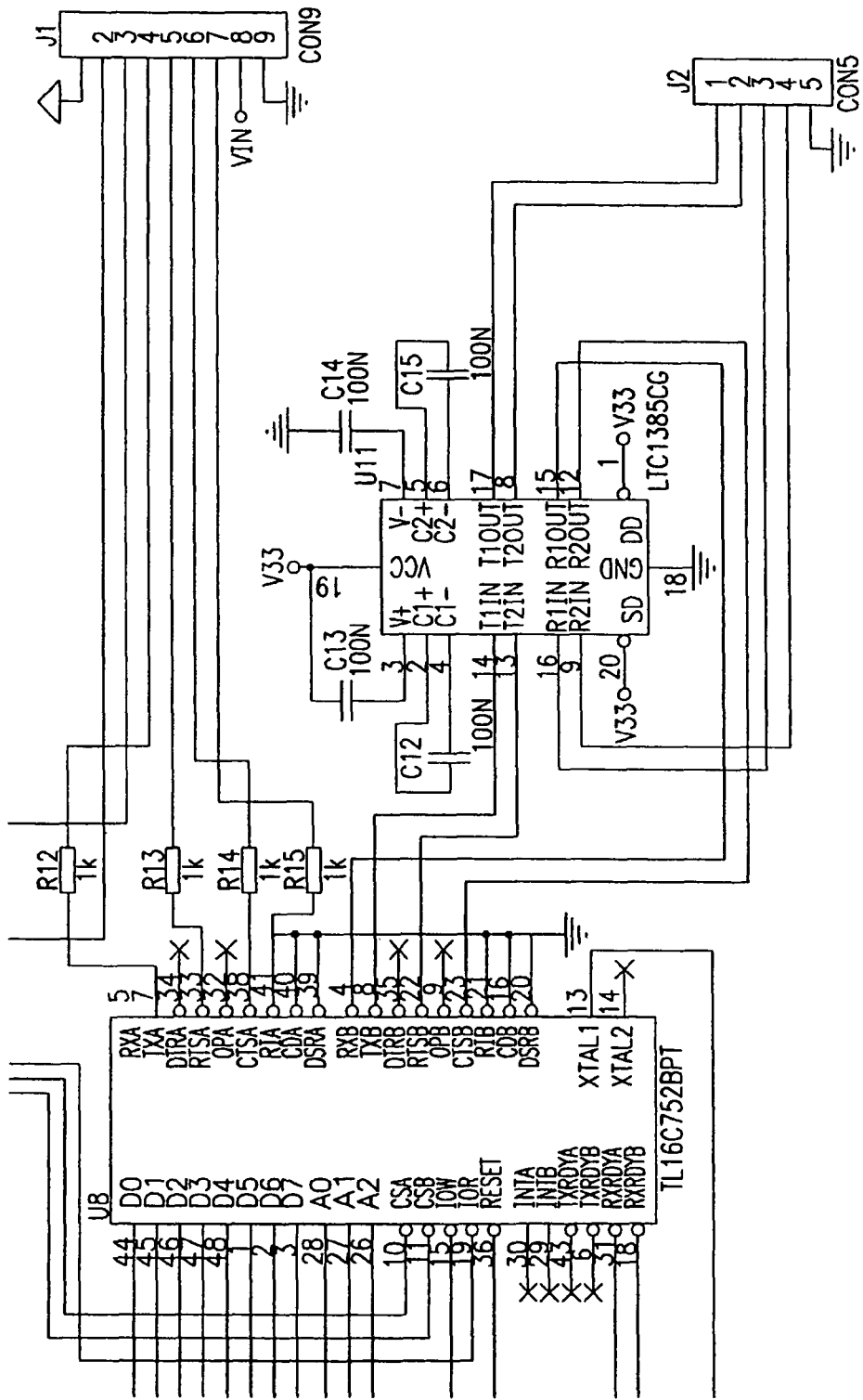
FIG. 6-D

FIG. 11
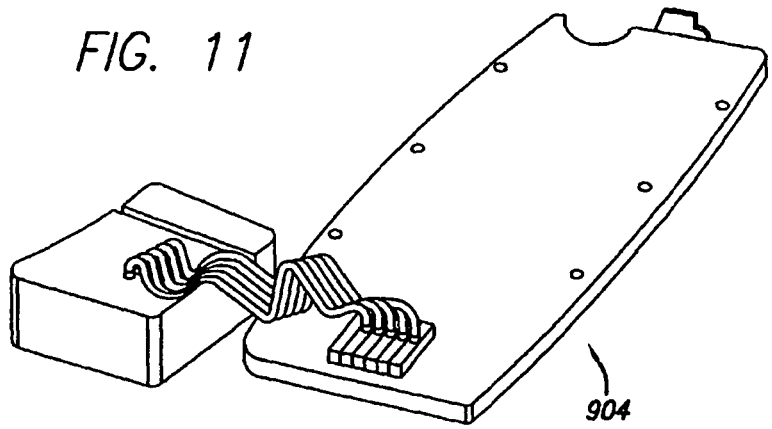
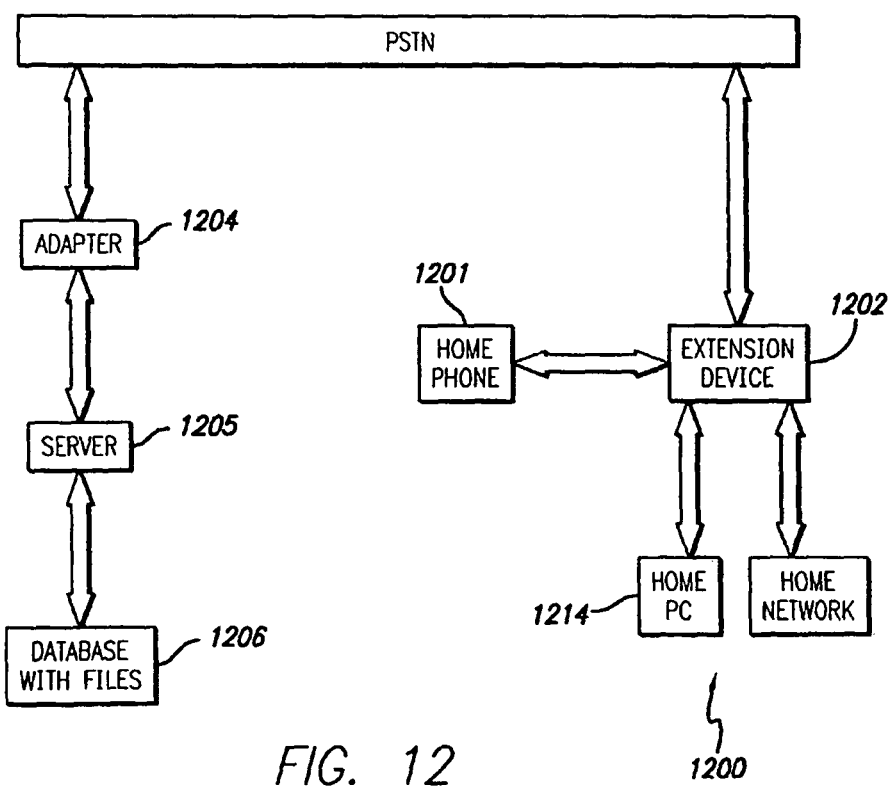
FIG. 12

TELEPHONE INITIATED PROTOCOL-IMPROVED MEDIA DELIVERY PLATFORM

RELATED APPLICATIONS

This application is a continuation-in-part of U.S. patent application Ser. No. 10/183,756, filed Jun. 26, 2002, now U.S. Pat. No. 7,548,875, which claims priority to U.S. Provisional Application Ser. No. 60/301,681 filed on Jun. 27, 2001, U.S. Provisional Application Ser. No. 60/303,115 filed on Jul. 3, 2001, U.S. Provisional Application Ser. No. 60/312,450 filed on Aug. 14, 2001, and U.S. Provisional Application Ser. No. 60/343,159 filed Oct. 26, 2001, all of which applications are incorporated herein by this reference.

FIELD OF THE INVENTION

This invention relates to improved methods of delivery and playback of compressed digital sound and image files for wireless and non-wireless electronic devices. The invention also relates to improved methods of delivery and playback of compressed digital subject matter comprising text, animation, news and weather reports, executable products, such as games and other software, and other wirelessly, over the air deliverable products and services. The invention further relates to computer software and hardware, products and systems for implementing and carrying out all of the above.

BACKGROUND OF THE INVENTION

The general concept for delivery of sound recordings or clips and visual recordings or clips by way of the cable configured or "wired" Internet is known and described in various U.S. patent applications. (See Bernard et al., U.S. Pat. No. 5,918,213; Kaplan, U.S. Pat. No. 5,963,916; Barbara, U.S. Pat. No. 5,926,789; and Doerr et al., U.S. Pat. No. 5,949,41.) Such methods are typically used to sell products to consumers. For example, a web page from Amazon.com allows a user to listen to samples of music for before purchasing compact discs (CD's) by mail. However, all of these methods are dependent upon a wired or cable connection.

Also, cell phones may be programmed by a user or manufactured to ring with a electronic facsimile of a real tune of a song or musical composition, commonly called "ringtones" and have become increasingly popular. Such electronic reproductions are known as monophonic and polyphonic tunes. Cellular phones initially on the market could only play music or to deliver "ring tones" with such electronic monophonic or polyphonic chime or ring tone rather than an actual recorded song, human voice, or musical composition. As electronic reproductions, such tones are devoid of harmony, human voice and chorus. Additionally, these ring tones must be factory installed in the telephone or the delivery methods just directly interface with the Internet and require the consumer to be on line to access and download a particular mechanical or electronically approximated ring tone.

More recently, various methods have been developed and are being used to enable a phone user to make more effective use of the variety of telephone service now available. For example, "caller ID" function is one such feature which allows the recipient of an incoming call to identify the caller based on textual information provided on a telephone display panel. A patent to Borland, U.S. Pat. No. 6,178,230 discloses an improved telephone system and method that determines the identity of the person being called for a telephone having more than one user and can identify the person being called by sounding a distinctive ring or "ring-tone" associated with the person being called. A mechanical ring tone is played depending upon the caller ID signal received to alert the telephone user as to who is calling without reading the telephone's display panel.

As may be seen, however, there exists much room for improved methods of delivery and playback of sound and image files on electronic wireless and landline devices, and especially the delivery of original music recordings with real musical instrument sounds, human voice, chorus and harmony, as opposed to crude, electronic synthesized music, directly to cellular phones and the like. There also exists a need for the use of real music and the like in a variety of applications, such as ringtones. There further exists a need for the use of such improved methods of real sounds/music and image delivery video, business methodally delivery, etc., in conjunction with established marketing methods with demonstrated efficacy such as advertised telephone numbers (vanity phone numbers) and toll-free calling and the like.

Toll and toll-free telephone services for the purpose of commonly used methods by which a business/subscriber can advertise, receive and collect free calls from an interested customer or end user. By the end user or customer dialing, for instance, any number beginning with "800", "886", "887", "700", etc., or other varieties of a "toll-free" number, a call is typically routed to a regular phone number and the charge for the call is usually billed to the company or individual owner of the called number. In processing such calls a database or network operation is queried by a network switch to determine the actual destination number for the call, which is then employed by the switch to route the call through the network to an appropriate destination. Toll-free customer service lines have long been used, and toll-free calling is also known as a highly effective business tool. Such toll-free calling is also highly effective to develop market recognition and source identification, and in acquiring strong and valuable trade and service mark rights, for example, such as "1-800-BANKRUPT" which has been recognized as a property right to receive telephone calls dialed to the number 1-800-226-5787, which matches the letters in the word "bankrupt" on the users' phone keypad. Personal toll-free numbers have also been used as effective alternatives to calling cards and pay phones, or as alternatives to business cards, such as "1-800-LAWYERS", or "1-800-BREAKING NEWS", or "1-800-SPORTSLINE", "1-800-AUCTION", "1-800-REALTONES", "1-800-MASTERTONES", "1-800-REALMUSIC", "1-800-ANIMATIONS", "1-800-CUSTOMTONES", "1-800-MYTONE", "1-800-DOWNLOADMANAGER", "1-800-DATEMATE", "1-800-DATELINE", and the like. These toll-free numbers are referred to as "vanity" numbers by the marketing industry. The toll-free vanity number marketing approach allows companies to market products in conjuction with an associated word in conjunction with a toll-free number and driving the targeted customer to call the more easily memorable vanity number.

As some examples of toll-free services, PowerNet Global currently offers a stand-alone toll-free card and service, AccuDial offers toll-free numbers for the home, office, business or overseas location that one can forward anytime via a website and Kall8 On-The-Fly Programmable toll-free service offers to route a custom 800 number to a business or residence and to change the number as desired by way of a secure website. Still other examples include Z-tel Bundled Unlimited and Cheap toll-free services, and toll-free services offered by Covista, Unitel and OPEX. In some recent developments, there have been some new techniques which provide cable-connected Internet subscribers with a way to offer toll-free access to end users. See, for example, U.S. Pat. No. 6,181,690. In another example, there is provided the ability of a caller in one country to dial a toll-free number associated with a destination in another country with the international toll charges assessed to the call origin and with the destination network charges assessed to the destination. See U.S. Pat. No. 5,875,237.

Such hugely popular and effective toll-free services in conjunction with the delivery of compressed real music recordings, voice content, video animations and other rich media over the air to electronic devices, such as mobile phones, has not yet been made available or even explored. The integration of toll-free calling capability in conjunction with such wireless and wireline delivery of data is also seen to provide a yet even more powerful marketing and sales approach than current protocols offered by Internet usage and toll-free uses separately.

SUMMARY OF THE INVENTION

The present inventive methods, products and system provide a much-needed improvement to applicants' prior method and system of delivering compressed digital audio and image files, text, video, animation and the like over-the-air, without a cable to wireless and wireline electronic devices effective to receive transmission of such files and to play back such digital data on demand as selected and desired.

Accordingly, the present invention enables a user to dial one or more advertised telephone numbers, preferably a toll-free number, to connect the user to a proprietary data server which is charged with various select content such as audio, image, and informational files, for direct over-the-air transmission to the user's wireless telephone device, or to a users' wireline device or other electronic devices.

The inventive system and products provide a unique protocol for both wireless/wireline and Internet users which is a much needed and attractive alternative to conventional protocols. The inventive novel protocol provides unique advantages in both the private and business sectors for worldwide mobile wireless/wireline users and wireless data delivery providers. The present inventive novel protocols, which have heretofore been unavailable, also integrate broad business segments of wireless carriers and over the air delivery of compressed rich media into a single, unified worldwide wireless data delivery protocol. End users of the inventive novel protocol are, thereby, not dependent upon the inconvenience of constantly needed access to the Internet (conventional WAP protocol) and related subservience to ISPs, but instead may be connected directly to one, or a plurality, of multicontent-providing toll-free servers.

Distinct and unique heretofore unavailable business advantages are also afforded by the present invention, which enables the generation of revenue in several different aspects.

In one aspect, the invention benefits the market accessed by the worldwide mass consumer customer/purchaser. In another aspect, the invention is relevant to the worldwide mass data-distribution customer provider. The former market is advantageously served by the present invention's ability for users to receive and play back high quality, possibly the highest quality, wireless information and entertainment and arts data via the most convenient and inexpensive protocol available.

The latter distribution market is likewise advantageously served by providing high quality wireless information, entertainment and arts data to distributors' customers and business chain contacts, again via the most convenient and inexpensive protocol available, which effectively maximizes revenue generation.

Additional advantages and benefits of the present invention with its wide array of practical embodiments and applications will be appreciated and understood with reference to the following Detailed Discussion of Preferred Embodiments with accompanying drawings.

BRIEF DESCRIPTION OF DRAWINGS

FIGS. 6 A-D illustrate the electrical schematics of a mobile telephone accessory unit in accordance with the present invention.

FIG. 11 is a picture of the accessory unit of FIG. 9, disassembled from the mounting.

FIG. 12 is a schematic diagram of a landline transmission system for a home telephone.

DETAILED DISCUSSION OF PREFERRED EMBODIMENTS

Figure 1:
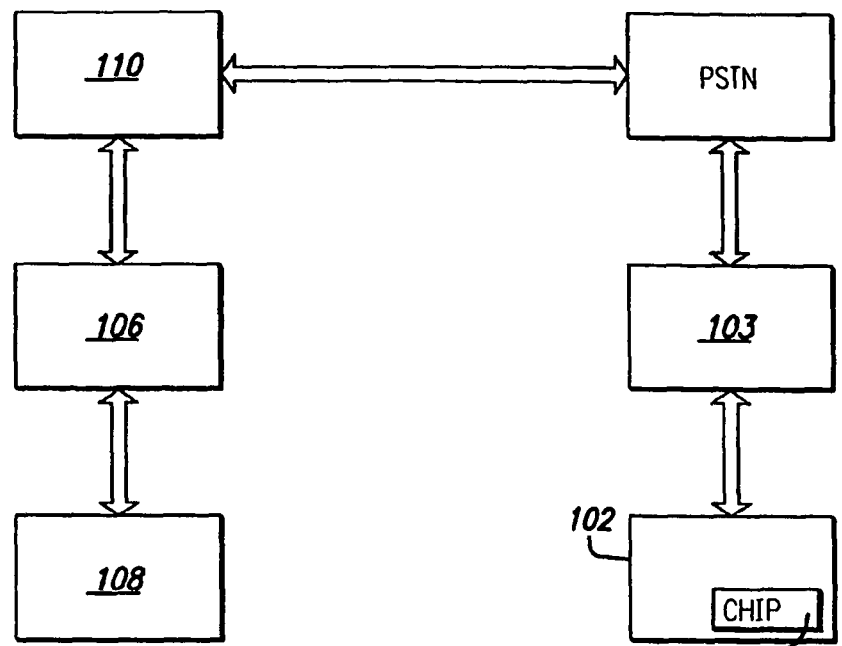
FIG. 1 is a general schematic diagram illustrating the basic components of a wireless transmission system for a landline or cellular telephone.

All patent references, published patent applications and literature references referred to or cited herein are expressly incorporated by reference herein to the same extent as if each were specifically and individually indicated to be incorporated by reference. Any inconsistency between these publications and the present disclosure is intended to and shall be resolved in favor of the present disclosure.

In the following discussion, many specific details are provided to set forth a thorough understanding of the present invention. It will be obvious, however, to those skilled in the art that the present invention may be practiced without the explicit disclosure of specific details, and in some instances of this discussion, with reference to the drawings, known elements have not been illustrated in order not to obscure the present invention in unnecessary detail. Such details concerning computer networking, software programming, telecommunications and the like may at times not be specifically illustrated as such are not considered necessary to obtain a complete understanding of the core present invention, but are considered present nevertheless as such are considered to be within the skills of persons of ordinary skill in the art.

It is also noted that, unless indicated otherwise, all functions described herein may be performed in either hardware or software, or some combination thereof. In some preferred embodiments the functions may be performed by a processor, such as a computer or an electronic data processor in accordance with code, such as computer program code, software, and/or integrated circuits that are coded to perform such functions.

Having thus prefaced this discussion, in one preferred aspect the present invention provides a novel, convenient and efficient method for conducting a services and/or goods-vending business operation by exploiting the advantages of offering and selling goods and services by way of advertised telephone numbers, and optionally the tremendous advantages and opportunities afforded by toll-free calling, as used in conjunction with delivering algorithmically compressed audio and/or visual data or content to electronic devices.

In accordance with that set forth above, the present invention provides new and effective methods for telephone and toll-free calling-initiating of telephone purchases or use of goods and services, systems for carrying out operations and methods in general of conducting retail or any wholesale services and/or goods for purchase vending business via the use of phone devices and land-line and mobile phone services. More particularly, the present inventive method comprises in a preferred embodiment the steps of a caller, and would-be purchaser of goods and/or services, or other information, dialing an advertised telephone number, such as a toll-free number, and receiving a message from a merchant or a merchant provider in which audio and/or video content may set forth, for example, inter alia, a menu of goods and/or services for purchase, terms of purchase of various services or goods for sale, and a fee schedule for purchases and/or a request for payment confirmation. The message may be a phone message or a SMS text or MMS multimedia message. Upon acceptance of the contents of the audio and/or video/image or any non-data product, for example, for particular services and/or goods for a set fee or price on the purchase of a product for a price, the caller/purchaser is then billed or charged a fee which then allows the caller/purchaser access to the advertised telephone services or the ability to download a product for a predetermined time period, for example, by use of a password or code. In another embodiment, upon expiration of the time period, the caller/purchaser's phone service is forwarded a second audio and/or video/image message, or perhaps another SMS text or MMS multimedia message and the like requesting the caller's agreement to be billed or charged a further fee for a second predetermined time period for the advertised telephone services or goods, or an otherwise second time prescription period for telephone services and/or goods. This operation may be repeated as desired for any number of cycles.

In further embodiment, the purchasing consumer may have a business or residential mailing address linked to an electronic device (cellphone or landline phone) from which a purchase can be made. Upon purchasing the desired product or services via the advertised toll-free number, the items will be delivered to the residential or business address preconfigured to the cell phone account from which the cell phone call was made. The purchaser may be prompted by calling a displayed advertised number and reaching a live operator, or Interactive Voice Response (IVR) operator, or recorded message describing products or services of interest. The end user/purchaser may select and/or otherwise purchase goods or services by activating a code sequence, or a single function, such as a "one-click" function, or a voice command, e.g., a one-word voice command, to consummate the desired transaction.

The purchaser is preferably sent a receipt of the transaction, such as by SMS/MMS text or multimedia message, or e-mail, or a printed receipt or a photocopy of a receipt to a handset. A phone manufacturer may provide a feature, such as a "one-click" or "buy now" button and the like, which a purchaser/user may conveniently activate on a keypad or touchscreen electronic device. Upon consummating a transaction after reaching an operator, IVR or recorded message, a purchaser may be provided with a time certain in which to cancel or void an undersired or unintended transaction, or features of the inventive method and system can be modified to comply with local consumer laws and ordinances, such as "opt out".

In another aspect of the invention, in billing a purchaser regarding a consummated transaction, the purchaser is either billed with respect to the associated telephone bill from the phone number used to consummate the purchase, or a separate account can be established integrating a purchasers' credit card or money transfer card number with the telephone number used to consumate the purchase. "Purchase" is the context of this invention means the transfer of goods and/or services by any mode, be it a money-purchase transaction, a lease, a license or any other transfer.

In another method of billing, a "wireless" credit card/ money purchase number, such as a personal identification number (PIN) may be linked to the purchaser's phone number. An example follows.

LL Bean customer dials the vanity phone number "1-800-myLLBean". First-time callers will have an opportunity to set up wireless billing information associated with their phone number. An electronic account will be embedded or linked to customer's cell phone or land-line phone number optionally with a pre-determined line of credit. Purchaser may also pay by COD for purchases, or transfer cash from a purchase money card, i.e., debit card. Customer may also browse a catalog or venue such as LL Bean, and purchase products via key pad/code association to specific products of interest, such as:

| | |
|---|---|
| Blue twill pant - | code 263 |
| White cotton cap - | code 172 |
| Size code | XL - 1 |
| | XXL -2 |

When customers finish shopping, e.g., a shopping cart is as full as desired, a customer may consumate purchase by activating a "buy-now" button or feature code, i.e., #, * on the keypad or touch screen.

In a further embodiment of the invention, there is provided a method in which a potential customer or customer dials an advertised number, which may be a toll-free number, from either a land line or wireless phone device, and a service provider or vendor may then determine whether the call is from a land line phone or mobile phone device, and respond accordingly, for example, through a recorded message or call back to a land line user or with text or multimedia messages to a mobile phone user who is so-enabled, to provide goods and services.

In yet another embodiment, the present invention provides an improved method for selection, delivery and play back of sound and image files which include songs, musical compositions, and other sound recordings, cartoons, movies, animations, real music sound clips, television shows, or any other type of performance, which may be copyright registered, as well as non copyright registered personal recordings (e.g., personal sound recordings, family photos, home movies, etc.). This new method includes the use of sound and/or image clips, which can be snippets or full files, as alerts for a variety of electronic devices or for playing on a handheld device. A collection or library of uniquely selected and/or edited clips may also be provided to the consumer in a manner far more conveniently on conventional telephone equipment than previously available.

The method provides the consumer with a unique way of accessing and browsing through selectable files which may be Internet based or independent of the Internet. Additionally, the unique delivery method provides a seller or service provider with a convenient and more efficient way of promoting and selling entire sound and image files which include downloadable music, movies, films, shows, and items such as records, cassette tapes, CDs, videos, DVDs, and an array of other games, executables, software and services. The purchasing customer will also have the opportunity to buy "non-data products", such as clothing, fitness equipment, furniture, autos, and any other products bought and sold via TV, magazine, Internet advertising including infomercials.

Some additional examples follow:

Media Delivery Platform "Audio Book Example"— ("M.800: Audio Books)

1. End user dials "m-AMA (m-262) from her mobile phone for amazon.com and receives IVR (Interactive Voice Response) operator (or live operator) and speaks the title of a book that is desired (say, "Da Vinci Code").

2. IVR search retrieves top 5 "Da Vinci Code related books and authors" sited on Amazon.com and begins speaking the titles—Number One. Da Vinci Code by Dan Brown—press or say "ONE."

3. If "item ONE" is desired by user, user presses or says "ONE" and the audio forward of the book is immediately delivered over-the-air to user's phone (along with artwork of book cover) in accordance with the invention and immediately begins playing back audibly for the user.

4. Book Cover Art stays prominent on deck of phone for 5 to 10 seconds, when a window pops up providing the user options—1. DOWNLOAD ENTIRE BOOK NOW? (an audio book is delivered digitally to phone—billed via carrier, paypal or pre-billed account)—2. BUY LATER? (artwork and title will be saved to phone)—3. BROWSE MORE BOOK TITLES? (user is returned to browser content library Media Delivery Platform "Google Buy Stuff Example— ("M.800" Google Buy Stuff)

1. End user dials m.GOOG (M.4664) from their mobile phone and connects to IVR (Interactive Voice Response) operator (or live operator) and speaks the "paroduct category" they are interested in (say "ALAN WRENCH SET").

2. IVR search retrieves top 5 ALAN WRENCH SETS" user speaks "ALAN WRENCH SETS."

3. USER FOLLOWS PROMPTS and chooses preferred ALAN WRENCH SET (alone with artwork and product brand), PRODUCT ARTWORK stays prominent on deck of the phone foar 5 to 10 seconds, when a window pops up giving the user options—1. BUY NOW? (all purchase info is sent to phone, product is billed either through carrier, paid or prepaid GOOGLE account)—2. BUY LATER? (product artwork, price etc. will be saved to phone)—3. BROWSE MORE PRODUCTS? (user is returned to browse content library.

In yet another example, showing advertising efficacy, a mobile phone user observes a billboard advertisement displaying a BMW automobile with a proprietary 4Media/Skky "m.dot" short-code of "m.269" (269=BMW on keypad)— mobile user dials "m-269" short code on the mobile phone. A rich media text photo or video advertisement in the form of digital content via the present invention is sent, preferably immediately, to the user's mobile phone, playing back on the deck of the phone substantially immediately without additional search or navigation necessary by the mobile phone user. Upon completion of the advertisement playback, an option window is provided the mobile user with the following options:

1. PLAYBACK AGAIN?
2. STORE AND SAVE ADVERTISEMENT FOR FUTURE PLAYBACK?
3. DIAL 800.BMWINFO FOR MORE INFORMATION (providing customer with additional video, text, operator assistance, etc.)
4. DELETE The same process can be implemented with periodical print advertisement, television advertisement and internet advertisement and the like.

Algorithms are provided for the delivery, storage and playback of the sound files, preferably including a delivery method algorithm, a parametric optimization and compression algorithm, and an error correction algorithm.

According to one embodiment, sound files are accessed by a cellular or landline telephone for allowing the consumer to browse, download, hear and/or purchase sound files or use sound files including sound clips as ringer sounds. In contrast to the conventional ring tones or musical chimes used to ring cellular phones currently on the market, the current invention provides a method for ringing cellular phones (both analogue and digital) and landline telephones with real sound recordings including original master recordings, which may be songs (having been properly licensed) from copyright registered CD tracks, and may comprise human voice, various instrument sounds, and other sound effects of a high quality. Instead of simply tones being played the higher fidelity musical composition can be played by the telephone or other handset with a degree of fidelity previously unavailable using conventional methods. The high degree of fidelity is achieved using data compression, error correction and parametric optimization algorithms adaptable to conventional telephones and other handheld devices.

A software based system for encoding the hardware of existing cellular phones at the time of manufacturing with delivery, storage, and playback capabilities in accordance with the present invention is provided, such that additional hardware is not required. (Only a suitable speaker need be required with most telephones already possessing the necessary quality of speaker.) The ability to provide this technology without the need for extra hardware is very significant, particularly to the cellular phone industry, as it is especially desirable to make cellular phones as lightweight and as small as possible and at the lowest cost.

In some instances, an accessory attachment to standard telephones may be incorporated to implement the delivery, storage, and playback capabilities of the present invention to existing landline and cellular telephones which have not been encoded at the time of their manufacture, if necessary. Such accessory attachments are compatible with existing telephones, and may be sold separately. Also, a micro chip may be embedded in landline telephones for providing the telephone with browsing, delivery, storage, and playback capabilities of the present invention.

The accessory attachment or telephone encoded with software and/or including hardware for providing delivery, storage, and playback capabilities as described herein, may be manufactured with embedded sound files including sound clips, such that a user can immediately play back the files, including use the files as ringer sounds, without having to first download any files.

Additionally, upon hearing a sound clip on the telephone, a user may choose to download the entire unedited sound file for a fee, or purchase an item associated with the sound clip (e.g., record, cassette tape, CD, video, or DVD, concert tickets, t-shirts, posters and the like) by pressing a designated button on the accessory attachment or keys on the telephone keypad. As such, sound clips which have been downloaded to, or preprogrammed on a cell phone, may encourage and stimulate the sale of full file downloadable files and/or items associated with the clips by allowing the user to make an impulsive purchase immediately upon hearing the clips.

The accessing of sound and/or image files by other electronic devices, such as home phones, computers, pagers, doorbells, alarms, palm pilots, watches, clocks, PDAs etc., for either allowing the consumer to browse, download, hear, view, and/or purchase sound recordings, image files, or associated items, or to use sound and/or image clips as alerts is also part of the invention and not limited to solely telephones. New electronic devices, allowing a user to browse, receive, store and play sound and image files, including master recording clips of master recordings, ringtones, movies, etc., according to the present invention, are also described.

A security feature may be included on such electronic devices adapted for allowing a consumer to access and use sound and image files according to the present invention. This feature is designed to prevent intellectual property abuse by consumers' unauthorized dissemination and reproduction of copyright protected material. The downloaded clips or recordings are coded and cannot be downloadable or transferred to units other than the consumers' preselected layer or telephone.

Also, a tracking feature for keeping a record of every song downloaded and/or each time a song is played can be incorporated for providing performing rights organizations or songwriters' organizations with an accurate method for determining royalty payments to writers and performers of music.

Additionally, a website suitable for viewing and selecting downloading sound and/or image clips or entire files may be used for giving the consumer and music or image seller a unique way of transacting the sale of such files or other associated items such as records, cassette tapes, CD's, videos, DVD's, concert tickets, t-shirts, and any other suitable items suitable for sale. The website may allow the clips to be stored on a user's computer, providing the user the ability to readily access the clips for downloading the clips to an electronic devise, using the clips as computer alerts, or playing the clips on the computer. The user may also purchase files or items associated with the clips through the computer and/or website.

The system of the present invention may also allow the consumer to browse through hundreds or thousands of sound and/or image clips and/or files for the purpose of downloading to electronic devices with an option to purchase an associated record, cassette tape, CD, video or DVD, or download the full unclipped sound and/or image file.

Furthermore, the delivery of any and all digital media files, including master recordings, music clips, imagery, etc., is not limited to web based applications. Unlike conventional methods which require computer plug-in devices for delivering and transferring digital music, the current invention may use a delivery method which allows the user to browse, download, and listen to or watch sound or image files without the need for hand wired plug-in devices or a computer connection to the Internet.

MODE(S) FOR CARRYING OUT ONE ASPECT OF THE INVENTION

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention uses a unique method for delivery, storage, and play back of sound and image files which include master recordings of full song files, musical compositions, or other sound recordings, animation, cartoons, movies, television shows, or any other type of performance, as well as personal media clips (e.g., personal sound recordings, family photos, home movies, etc.). This method includes the use of sound and or image clips as alerts or "ringtones" for a variety of electronic equipment, and provides the consumer with a unique way of accessing these files which may be Internet based or independent of the Internet.

The present invention may include a number of modules for an overall system of delivery of music and audio/visual files. These modules include a server of the files accessible by way of a specialized website for viewing, selecting, sampling and downloading selected files or portions thereof or directly accessible without going through a website. A telephone, be it conventional, cell phone or other hand held device with access to a communication network can access on a server either directly from the handset without the need for a website or through a website. The use of one or more, or a plurality, of conventional algorithms allow the transfer of the files to the handset providing the high quality recording in a file format, which optionally allows for tracking and security against unauthorized reproduction. The individual elements of the invention are unique as well as the overall system of delivery tracking and security. Described below are more detailed aspects of the invention and its use.

Use of Sound and/or Image Clips as Alerts for Electronic Devices

According to one embodiment the system allows for sound and/or image clips which are snippets of a musical and/or visual performance piece to be used for sound and/or image alerts in electronic devices. A library or collection of uniquely edited clips may be provided to the consumer for browsing and selecting files to be stored on the electronic device. The consumer may also use home made personal clips (e.g. personal sound recordings, family photos, home movies, etc.).

The digital sound and/or image files may be harvested from CD's, movies, TV shows, and the like, may include, without limitation, copies of the original master productions, actual recordings, movies and TV shows, which may include human voice, instrument sound, and other sound effects. Such content is known in the art as rich media, in contrast to mere electronic chimes or tones produced by many conventional cellular phones. Electronic devices which may utilize sound and/or image clips as alerts or ringtones include, but are not limited to, cellular phones, land line phones, computers, clocks, watches, pagers, door bells, car alarms, PDA's, palm pilots, and personal calendars. It should be understood that although using clips for alerts is preferable, full unedited files may also be used.

According to one embodiment, master recordings, sound clips, visual displays, visual displays in conjunction with master recordings or sound clips and the like, or any kind of rich media can be used to "ring" a cellular or home phone. For example, A clip or series of clips, or other rich media which the user can select, may be played instead of the conventional electronic chime or ring tone. Such a system may be implemented on conventional cellular phones, which may be analogue or digital, by algorithms for delivery, storage, and playback of the sound files, to the of the phone. For example, from one or more servers, wirelessly over the air, or perhaps by downloading firmware comprising such algorithms to a storage element, such as a RAM element. Such algorithms include a delivery method algorithm, a parametric optimization and compression algorithm, and an error correction algorithm. Alternatively, an accessory unit that attaches to the cellular phone for implementing the system of the present invention may be provided.

Conventional cellular phones, or similar devices, for example, (having a processor, RAM, and flash elements) may be integrated with software at the time of manufacturing for implementing the system of the present invention. Alternatively, a chip may be embedded into the device or an accessory unit, including a speaker, which attached to the device for implementing the system of the present invention may be provided. The accessory unit may have an adapter connection to the device. Such accessory unit may be sold with several adapter outlets to enable it to fit onto a variety of different electronic devices.

According to another embodiment, sound and/or image clips, or rich media, are used for computer alerts such as e-mail notification sounds. Rich media may also be used to ring a doorbell. Rich media may further be used by a clock or watch to sound at the beginning of each hour, similar to a grandfather clock, wherein a different type of rich media may be played at each hour.

The present invention allows the user to store hundreds of different types of rich media, such as in the form of alert clips on a device. Unlike conventional electronic equipment which hold a limited number of selectable alerts, such as a conventional car alarm or music player alarm clock, the present invention allows the user to choose from an unlimited number of rich media files including allowing the user to create his own rich media files or to choose from a library of uniquely selected and/or edited files, including samples taken from CD's, movies, television shows and the like.

Rich media sound and/or image files, sound and/or image files may be pre-stored on the electronic device or accessory unit at the time of manufacturing, such that the consumer may be able to used the file for alerts, or other purchases without first having to select and download such files over-the-air.

In yet another optional embodiment of the invention, a user of an electronic device, may download and store a number of digital media files from a website via a plug-in connection of the device to a computer, or via a wireless network system such as the Apple® Airport.

Additionally, in a further preferred embodiment, a non-Internet based system may be adapted for delivering rich media files to the electronic device or accessory unit. Such a system may be accessed via a phone "dial" or keypad, in connection wherein a user may interact with the system, such as a server(s) by using the phone keypads or voice commands. Other controls for interacting with the holding system, such as control buttons, voice commands or text keypads, may be provided on the accessory unit or the electronic device itself which may be especially adapted for interacting with such holding system. The accessory unit or electronic device itself may also be sold preprogrammed with embedded music files, gaming files, movie files, document files, etc., for demonstration use.

Additionally, such electronic devices may be capable of receiving or sending rich media files directly from one device to another device. Optionally, to prevent transferring of entire files from one device to another, a security feature (Digital Rights Management (ORM)) may be included on the devices and work in conjunction with the file.

One method of preventing the transferring of files is to encode each electronic device or accessory unit with unique scrambling/unscrambling wave capabilities. As such, when a user transfers an entire file to his device, say a cellular phone, for which he pays a fee, a scrambling wave, which may be a function of his unique telephone number, may be encrypted in the file. Upon playing the file, the user's cellular phone sends the corresponding unscrambling opposite wave. Other devices purchased by the same user may also include the unique scrambling/unscrambling wave encryption capabilities associated with the user's telephone number. As such, the files may only be played with clarity on the device or devices owned by the user, even if such files are transferred to other devices.

The security lock mechanism allows the original music or its representative to control distribution of music, and also provides an opportunity for music distributors to keep track of who plays their music. As such, a method of accounting for royalty payments to artists and performers and other parties registered with performing rights organizations such as ASCAP and BMI may include providing a tracking feature on electronic devices used by businesses such as bars, restaurants, and clubs to play music. In addition to allowing a record to be kept as to which rich media files have been downloaded and stored on the electronic device, the tracking feature may also record information, for example, on how many times and when a song has been played. This allows performing rights or music writers organizations the ability to keep an accurate record on which to base royalty payment distributions.

An electronic device having stored sound or image files may include various features which allow the user to preprogram the files to play in a set sequence or a random order. (For example, certain files which may be from the same or different songs may play in a congruous or back-to-back order with a fixed silence time between the files.) Additionally, the device may have features allowing the user to classify and arrange the files based on categories such as the type of files (i.e., movie, song, etc.), artist name, time period, etc.

Thus, a user of an electronic device utilizing the files according to the present invention will be able to arrange the files either through a website from which the files can be downloaded onto the device, or through the device itself.

Additionally, after listening to or viewing a files, the user can choose to download the entire file from where a portion of the file, e.g., a file clip, originated (i.e. the entire movie, song, etc.). The server providing the clips and the files may provide the clips for free or for a small fee as inducement for the consumer to ultimately download the entire file for which a greater fee may be charged.

An electronic device according to the present invention may also have the ability to receive rich media files which are directly transmitted onto the electronic device via audio or visual broadcasts. The user of an electronic device may program the device to sound a specified broadcast as an alert sound. For example, a sound segment from a live radio show (i.e., a sports show or a commercial) may be used to ring a cellular phone by either the caller or the callee.

Advertisements may also be transmitted through the electronic devices according to the present invention. A message such as "pick up the phone and don't forget to drink Coca Cola™" may be used to alert of an incoming call. Such transmitted advertising messages need not necessarily function as alerts for incoming call.

Additionally, this invention contemplates the use of image and sound clips which can be combined such that the user can create a unique clip of both sound and image for use in electronic devices having display screens. For example, a phone having an appropriate display screen can be preprogrammed to display a visual clip of a caller accompanied by sound, or a computer alert may display an image clip with sound. An image clip may comprise a single image frame or a picture clip as well as an animation.

Website to be Used as a Support Tool for Downloading Clips to Electronic Devices and Method for Selling According to a preferred embodiment, a website for downloading digital sound and/or image rich media files holds a library of files, each file having a specific identifying code or icon which may include, for example, the title of a musical composition or movie from where the file originated, the name of the artist, a code number, or other type of identification depending on the type of file. For example, a song file may be listed as barrywhite@lovestuff.wav, or may display the picture of the song artist or CD cover of the CD on which the song appears, along with the name of the song. The list may be organized according to the artist's name, by music classification (i.e., pop, jazz, R&B, hip hop, etc.), by length of the sound file, by the type of sound file (i.e., song, piano music, guitar music, loud, quiet, etc.), or any combination of these categories or other conventional categories depending on the type of file (image or sound). The website may also include categories of longer files which may be more suitable for ringtones, and shorter files which may be more suitable for computer alerts. The website may further contain a suggested list of weekly or daily favorite file picks, which may be provided for each category or subcategory. Additionally, items or subcategories in a given category may be organized alphabetically, by year of copyright, or any other conventional order. The website may provide any type of rich media file, including sound or image files In one preferred embodiment, Tables 1 and 2 are examples of possible arrangements for sound files in the forms of clips using music classification and artist name. Note that the listings of Table 1 such as barrywhite@lovestuff.wav are not websites, but use symbols associated with web use, such symbols being one of the many arbitrary ways of listing the files or clips. The symbol-driven website-like listings may end with other non-domain suffixes such as ".pop", ".song", etc. Additionally, this invention contemplates the use of website hyperlinks associated with each listing as shown below in Tables 1 and 2.

TABLE 1

| R&B | Jazz | Rock |
|---|---|---|
| Barry White | Herb Alpert | Chicago |
| Barrywhite@lovestuff | herbalpert@sunspots.pop | Chicago@feelings.wav |
| Barrywhite@deepvox | herbalpert@datingame.pop | Chicago@time.wav |

TABLE 2

| R&B | Jazz | Rock |
|---|---|---|
| Barry White | Herb Alpert | Chicago |
| BW-01 A-Sexy | HA-01 A-Date | C-01 A-Begin |
| BW-02 A-Love | HA-02 A-Bull | C-02 A-Search |
| BW-03 A-Peace | HA-03 A-101 | C-03 A-Color |

The file or clips may also have an identifying number associated with each. Such identifying numbers may be used in downloading the files to an electronic device using a telephone (described below) or other device having a number keypad. The website may further include a virtual personal locker or storage area for storing a selection of files personal to a user which can be accessed on the website by a unique user identification name or code. As such, a user can store files for later purchasing, downloading to the user's cellular phone, playing, etc. The website may also allow the user to upload personal files such as family photos, voice recordings, home movies, and the like, to the storage locker for later downloading to the user's cellular phone or other electronic equipment. The storage locker may include an organizer for storing the files in alphabetical order, by various categories, or any other order.

The website may allow for direct downloads of the files from the website to the computer itself or to other electronic devices.

To illustrate how downloading through the website may be carried out, a user operating the computer may drag his/her mouse over the various listed sound or image files and click on one or more selected files. Thereafter, a box can appear prompting the user to select the appropriate electronic device onto which the file or files are to be downloaded (e.g., the box may say "CELLULAR PHONE DOWNLOAD OR COMPUTER ALERT DOWNLOAD?" Assuming that the "CELLULAR PHONE DOWNLOAD" button is selected, a prompt for typing in the appropriate cellular phone number will follow. Thereafter, the selected file or files may be uploaded to the user's personal locker and made available for downloading to the user's handset.

Other features may also be included, such as an option allowing the user to arrange multiple downloads in a specific order, create a folder for grouping multiple downloads, or a feature incorporated into the phone which causes it to ring a selected files immediately after it has been downloaded. Additionally, files, which have been previously downloaded to the phone may be deleted, rearranged, or reclassified with or without using the website. (There are other methods for storing files on an electronic device such as a cellular phone, some of which are described below, including direct downloading access for phones without the need for web phone access capabilities).

Alternatively, by clicking "COMPUTER ALERT DOWNLOAD," the selected file will be downloaded to the user's computer, allowing the user to select many different sound and image files for computer alerts, such as e-mail notification, computer alarm clock, and computer calendar notification.

Additionally, multiple files may be associated with one type of alert, such that a different file is played for each alert event. The user will be able to rotate alert files and preprogram or randomize their order similar to a CD stereo carousel.

The user will also be able to hear or view a selected file which will play on the website upon the user's command. Browsing capabilities wherein the user can drag his mouse over a rich media digital sound or image library of file selections and hear the files without having to click or open a file may be included in the website. According to a preferred embodiment, a user simply drags his mouse over various file samples, which light up or flash and play one at a time. In a preferred embodiment, any time the user places the cursor over, for example, a category of music, the first tune in that category plays, and the icon representing that category of music switches to display the name of the artist and title of the song or composition being played. Once the user clicks upon that icon, he can select the next song and hear the song while at the same time seeing the name of the artist and song title. The user can cycle through all the songs within that category using this approach very quickly to not only browse but to also hear the music. If the user does not wish to switch over to another category of music, he simply moves the cursor to another icon and repeats this procedure. To select a particular song the user double clicks on the song, which is then included in a collection of selected songs to be downloaded later.

The website may be used as a shopping forum where consumers can hear or view the clips and click to buy items associated with the clips such as music records, cassette tapes and CD's, DVD's, and movie videos, or download the entire sound or image file to their computer for a fee. By allowing the user to sample and download files for use as alerts in electronic devices, the website will provide an attractive forum for selling items associated with the sound and image files, and for allowing the user to download a entire file associated with a portion or clip of a file for which a fee may be charged.

Additionally, an identifying mini icon such as the song title or recording artist CD icon associated with a file or with a group of files may appear on the computer screen at a fixed location and/or at the screen display where the file plays a computer alert. The icon may include a "buy" button which will allow the user to purchase an item associated with the file, or download an entire file from which a clip originated by clicking on the button. Such "buy" button may be a hyperlink to a website for transacting the purchase. Where a CD icon is not used, the user may click on the song title to purchase an item associated with the file. If the file comes form a song that exists on more than one CD, the customer will see more than one CD cover to choose which CD to buy.

The utility of files as alerts for electronic equipment will provide consumers with incentive to browse the website and sample the files. After hearing or viewing the file, consumers may be induced to purchase items associated with the files, which they will be able to do instantaneously through the website by the click of their mouse.

The website may further be used as a contest forum. The website may be set up to play mystery files or short segments of sound recordings which contestants will have to identify in order to win a prize (i.e., by being the first to e-mail or call with the correct answer). Thus, a radio show may set up a game where a short segment of a sound file is played on the radio or user's phone for contestants to guess and is also available for the listeners who want to hear it again on the website.

The website may include forwarding capabilities, such that a sound or image file can be forwarded as a greeting to a friend. (The security feature may be used only to prevent transferring of entire files). Consequently, the website will attract customers for the purpose of downloading files to electronic devices and ultimately purchasing items associated with the files. Additionally, the user may subscribe to a service such as an existing cell phone service provider for downloading files through their telephone, without having to be online.

The user may also create a file (e.g. by recording a song or personal clip of a song) and store the file onto a sound storage element in the electronic device. Additionally, the electronic device can be preprogrammed with files selected by the manufacturer retailer of the device.

Accessing of Sound and/or Image Files without Access to Internet

Sound and/or image files which include clips of such files may be downloaded without use of the Internet by allowing a user to access a library of files or clips via their cellular phone or home telephone or providing other electronic devices with features which allow automatic access to the library. (Although Internet free accessing will be described with respect to a telephone, it is to be understood that the method describe may be compatible with any electronic device preferably having accessing capabilities similar to a telephone).

The library may be a non-web holding unit that has files with associated codes which match the codes associated with the files on the website, wherein the website serves as a usable guide for identifying various files according to associated codes, such as numerical codes to assist the user in downloading files using voice commands or keypad commands.

Additionally, cellular phone or home telephone users may access a non-web holding unit with a library of stored files which can similarly be browsed, selected, and downloaded onto the phone using user voice commands, such as via an IVR, key pad commands, or by connection to a live operator. Such unit may be accessed by dialing a phone number, such as a toll-free number (e.g., an 800 number). Home telephones and cellular phones may have separate holding units, such as a satellite for cellular phones and a ground unit for home phones, or a satellite can be used by cellular phones to access a ground holding unit.

To facilitate selection of the files from such holding unit, the access system may provide for a code associated with each file which may be obtained by browsing the website as described above. As such, a user connected to the holding unit would access the code associated with the file to select and download the file to the user's telephone.

Many other methods allowing a user to select files from the holding unit are possible. For example, the telephone may include a voice recognition feature, wherein the user can say the name or part of the name of the song he wishes to select (e.g., "Strawberry Fields" or the name of the song artist). The phone may also utilize hierarchical submenus whereby the user may press dial keys with letters corresponding to a selection in a given category which ultimately leads to the selection of a particular song. A phone having a screen display for providing a text listing of the names of songs or categories, according to hierarchical submenus, may also be used for enabling the user to narrow down to a list of songs and/or artists from which he can make his final selection.

A telephone may likewise be used to deliver files stored on the phone to a website, an e-mail address, another telephone, or other electronic device. Sound clips, or segments of whole songs, musical compositions or other sound recordings, or image files, or combination of sound and image files will be used mostly with telephones, however, downloading entire music or image files may also be done, subject to the security feature described above. Additional revenues may be generated as the consumer accesses the content library and uses airtime while browsing and downloading clips or entire song and/or image files from the library holding unit.

Furthermore, cellular phone and home telephone service providers may offer extra features to phone subscribers which would allow the subscribers to download and store sound and/or image files for use with the telephone in accordance with the present invention. Such features by service providers may include a personal sound and/or image file storage box (which may be a file of clips and/or entire sound and/or image files) that the user can access via a personal code. For example, the user may be charged a monthly fee for a subscription to the service, and/or per downloading of each song, whether or not the user is a subscriber. Additional revenue can be generated by the service provider even if the service is provided without a special charge since consumers will use more airtime.

Telephone Using Sound Clips

A telephone having stored sound and/or image clips which may comprise real music and/or image including human voice, various instrument sounds, and other sound effects, images, animation and the like may allow the user to select one clip or a rotation of several clips to "ring" the phone effective as a "ringtone". Although it may be preferable to ring a telephone with sound and/or image clips, an entire music image file may also be used, whereby for example, a song and/or image may start playing and continue until the user picks up the telephone. (Of course, entire music and/or image files may be played on the telephone solely for the user's listening or viewing pleasure). The telephone may also be programmed to ring a conventional chime if the user so chooses. Such a telephone may utilize a storage chip carrying stored sound and/or image clips as well as the conventional phone chime programmed onto it.

Additionally, the telephone may allow the user to determine how many times a clip is repeatedly played for each ring, and the time delay between clips in a given ring. The user may also choose to mix different clips in one ring. A telephone may also include a looping feature which rings the telephone in a looped clip such that the clip plays repeatedly without a pause between repetitions of the clip, or a "cluster" feature which rings a "cluster clip" comprising a multiple number of clip segments from a single song, musical composition, visual display, or other sound recording and/or visual display played in sequence.

Other features will allow the telephone user to preprogram the telephone to play a certain file when a specific individual calls, thereby allowing the user to identify the caller based on the chosen sound and/or image file. Each person who regularly calls the user may have a unique identifying ring. This will allow a telephone user to have the option of assigning a unique sound and/or image caller ID to each of an unlimited number of callers. Other features may include allowing a caller to select his own personal sound and/or image clip to "ring" the telephone of the recipient of the call. (For example, the caller may sing or record a "Happy Birthday" song, optionally in conjunction with a visual display, or perhaps a visual-only display without sound.) Also, a telephone used by more than one user may utilize sound and/or image file clips for a callee ID function wherein the caller identifies the intended callee (e.g., by dialing a digit or sequence of digits) and the telephone plays the file clip associated with the callee.

Additionally, a telephone may be provided with a "caller message recorder feature" which allows the caller to record his/her own message to send to the number dialed. For example, the caller may send a message such as "Hey John. It's Mary. Pick up the phone," by pressing a "record ring" button on his/her phone to send such a message to John's phone. As described earlier, the telephone user, say John, may have a caller ID feature such that when a certain caller, say Mary calls, the telephone rings with a predetermined message or sound and/or image clip selected by John. The additional caller message recorder feature may cause John's telephone to play Mary's message instead of overlaying the predetermined caller ID message or clip. Additionally, John may record his own message such as "It's Mary" and associate that recorded message with Mary's phone number for a caller ID ring.

A telephone, according to the present invention, may also include a "sensory feature" for enabling the telephone to sense the level of ambient noise and adjust the loudness of the "ring" accordingly. If the phone "senses" very loud background noise, for example, a cellular phone located in a loud restaurant, the ring volume will increase. A feature for detecting whether a cellular phone is located in a pocket book or a place where the "ring" sound may be muffled is also contemplated. This feature will also enable the phone to adjust the volume of the "ring" such that the "ring" will be loud enough for the user to hear. Such detection mechanism can be achieved by detecting ambient light and other conditions.

Additionally, the user may manually adjust the volume of the ring via a tunable volume control mechanism or a multiple fixed settings control. (Although the above features are described with respect to a phone, it is to be understood that these features may also be provided with other electronic devices utilizing sound and/or image clips as alerts where applicable).

Transmission System for Delivery Clips to a Telephone

FIG. 1 is a schematic diagram illustrating the basic components for a wireless transmission system 100 for a telephone 102, having a wireless or landline service provider.

The system is described in terms of two main components: a storage chip 104, and a server 106. The storage chip 104 is an element associated with the telephone which may be embedded into the phone or into an accessory unit which attaches to the phone, having abilities to interface with the phone. The existing hardware of a cellular phone may also be integrated with a software system which may be downloaded to the RAM element of the cell phone for incorporating the present invention, without the need for extra hardware. As such, the existing hardware of the cellular phone may be made to perform the same function of the chip.

The purpose of the chip 104 is to store a selection of sound and/or image files or clips, allow for downloading of files or clips to be stored on the chip 104, and allow for the playback of files or clips, either by the telephone or the chip 104. (Although the description herein mentions, it is to be noted that entire sound and/or image files may be stored, downloaded, and played, according to the system described). Additionally, the chip 104 can associate the stored clips with a caller ID so that the particular clip to be played back is determined by the calling subscriber ID.

The server 106, which is associated with a collection of stored clip files 108, is designed to execute requests of the chip 104, which may be given through user voice commands or commands using the phone keys. The server may be equipped with a voice adapter 110 for supporting the ITU-T V.253 standard and telephone lines attached to the voice adapter. The voice adapter can also support some standard modem protocols, like V.32 or V.34, if required for compatibility.

The server 106 also allows for files to be transmitted to the chip 104 for storage. The system 100 enables a connection to the server 106 upon a request from the chip 104, utilizing the phone, and/or PSTN (Public Switched Telephone Network), and/or a voice card (voice modem) attached to the server computer.

The system may have a voice menu, which, after connection to the server 106, allows the user to listen to the server's menu and navigate through the system of voice menus using the telephone's Dual Tone Multi Frequency (DTMF) keys. The system may allow the user to select and download clips by allowing the user to listen to the clips presented by the server 106, select a clip, and issue a download command to the server 106. The server may then send the selected clip (e.g. in digital compressed form) using a Custom Data Transmission Protocol (CDTP) over the voice channel. (Illustrated in FIGS. 2 and 12).

Figure 15:
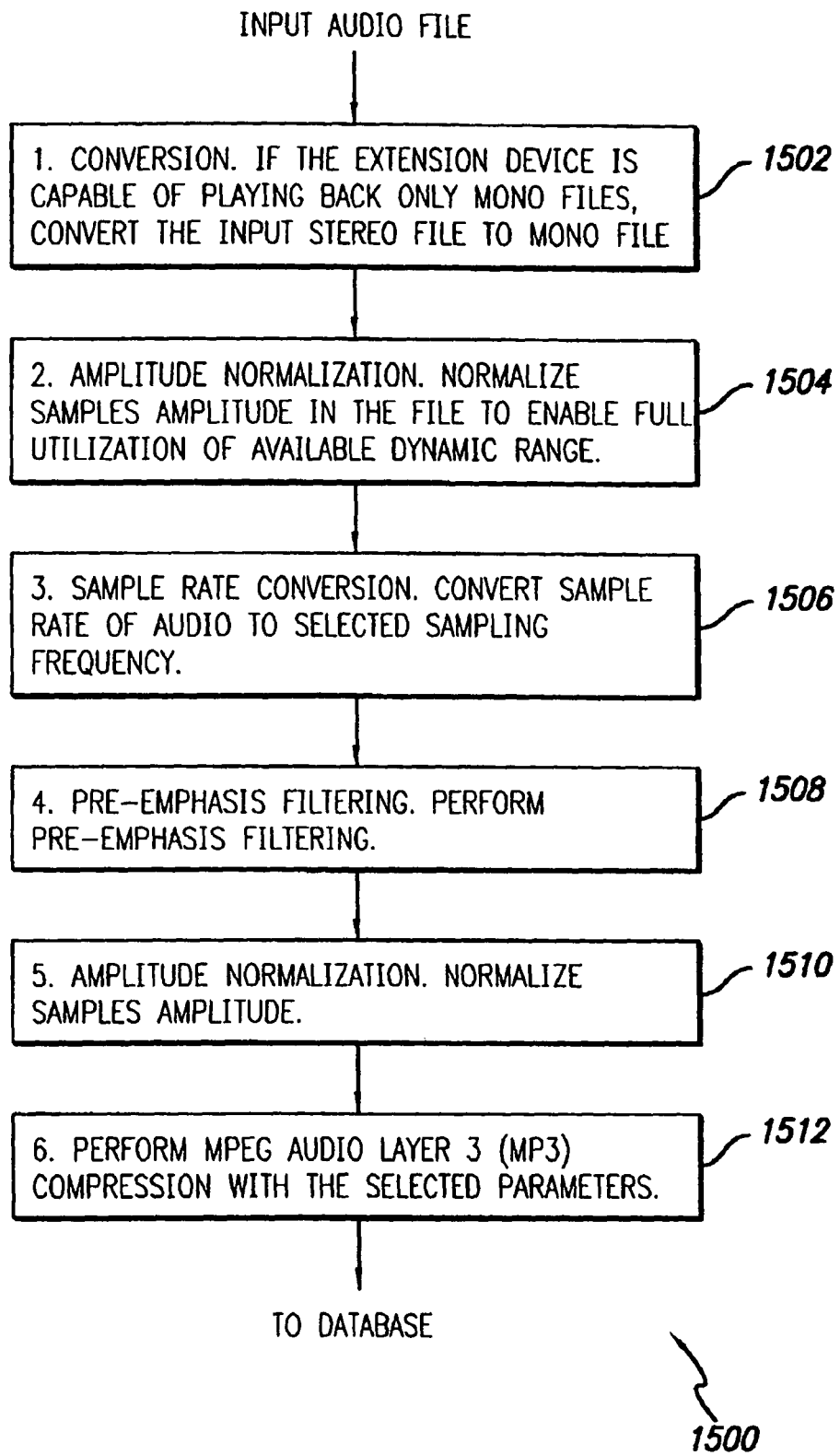
FIG. 15 is a flow chart for an audio data parametric optimization and compression algorithm.

The system 100 allows for storage of a large number of clip files in the chip's memory. The system's server 106 may utilize a music compression algorithm, or an image compression algorithm shown in FIG. 15, which converts common sound (music) and/or image files into compressed files that are downloaded and stored by the chip 106. For example, a chip supporting the storage of about 1000 clips, each being approximately a few minutes in length, may have a flash memory size of about 40 Mbytes. The chip 104 may also have a sound output element such as speakers.

The server comprises software which can run under Windows 98, Windows-NT OS, or other suitable system using a voice modem for communications. Additionally, the system may use a single modem or a pool of several modems.

Preferable Embodiments for a Telephone System

Figure 2:
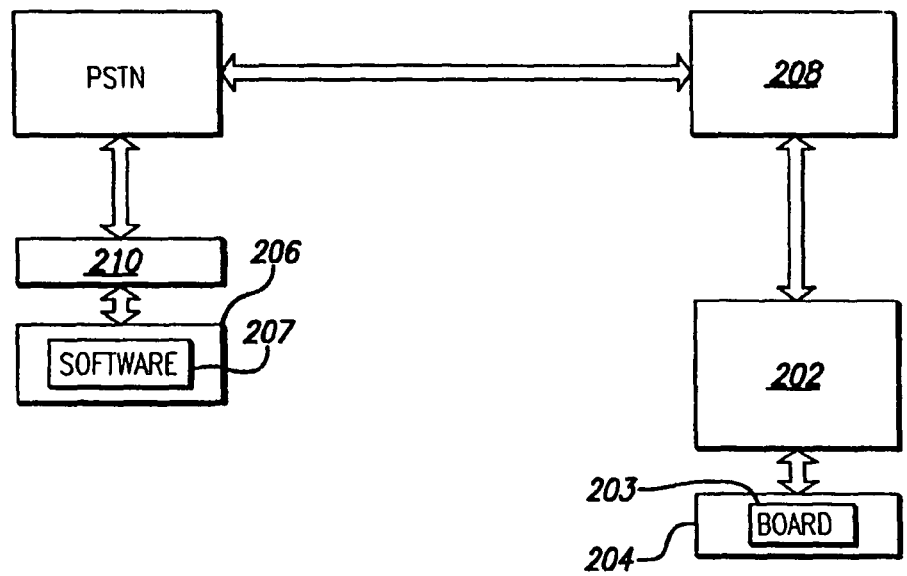
FIG. 2 is a schematic diagram of a wireless transmission system for a cellular phone.

Examples of telephone systems utilizing the method of the present invention include a cellular phone which may utilize an analogue (voice-only) system or a digital system, and a conventional land line telephony network. A system for using a cellular network infrastructure is shown in FIG. 2. A schematic diagram of a landline transmission system for a home telephone is shown in FIG. 12. (Again, although the following descriptions make reference to the use of sound and/or image clips, it is to be understood that entire sound and/or image files may also be used as described).

All described examples assume existence of a server preferably dedicated for servicing user requests and providing sound and/or image file data download capabilities. A corresponding chip, implementing all required functions is associated with the telephone.

The server may be a computer running Microsoft Windows or other suitable environment, such as a Pentium-III PC, Win95/98/NT/2000, 128 Mb RAM, 4 GB HDD. The server may store or be capable of accessing a sound and/or image file database, which may be stored on a website or non-web holding unit. The sound and/or image file database is stored in a compressed file format of those commonly known.

Figure 4:
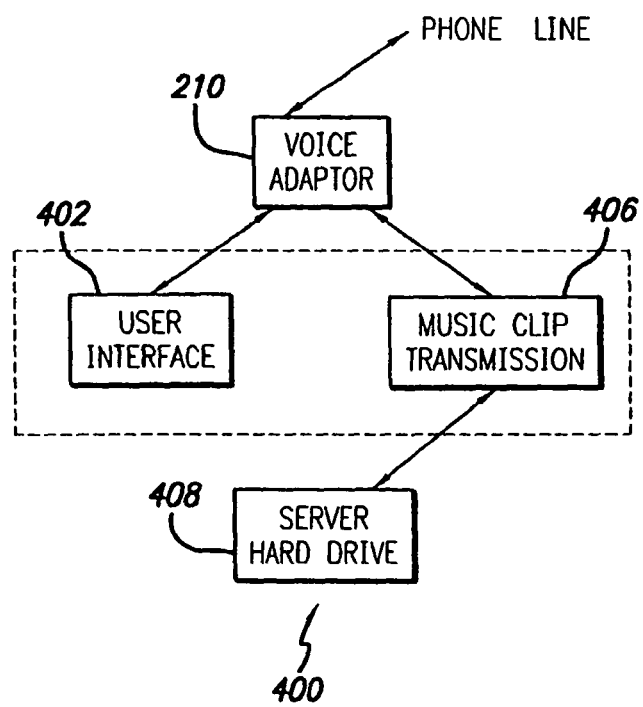
FIG. 4 is a schematic diagram of a server software system for the system of FIG. 2.
Figure 14:
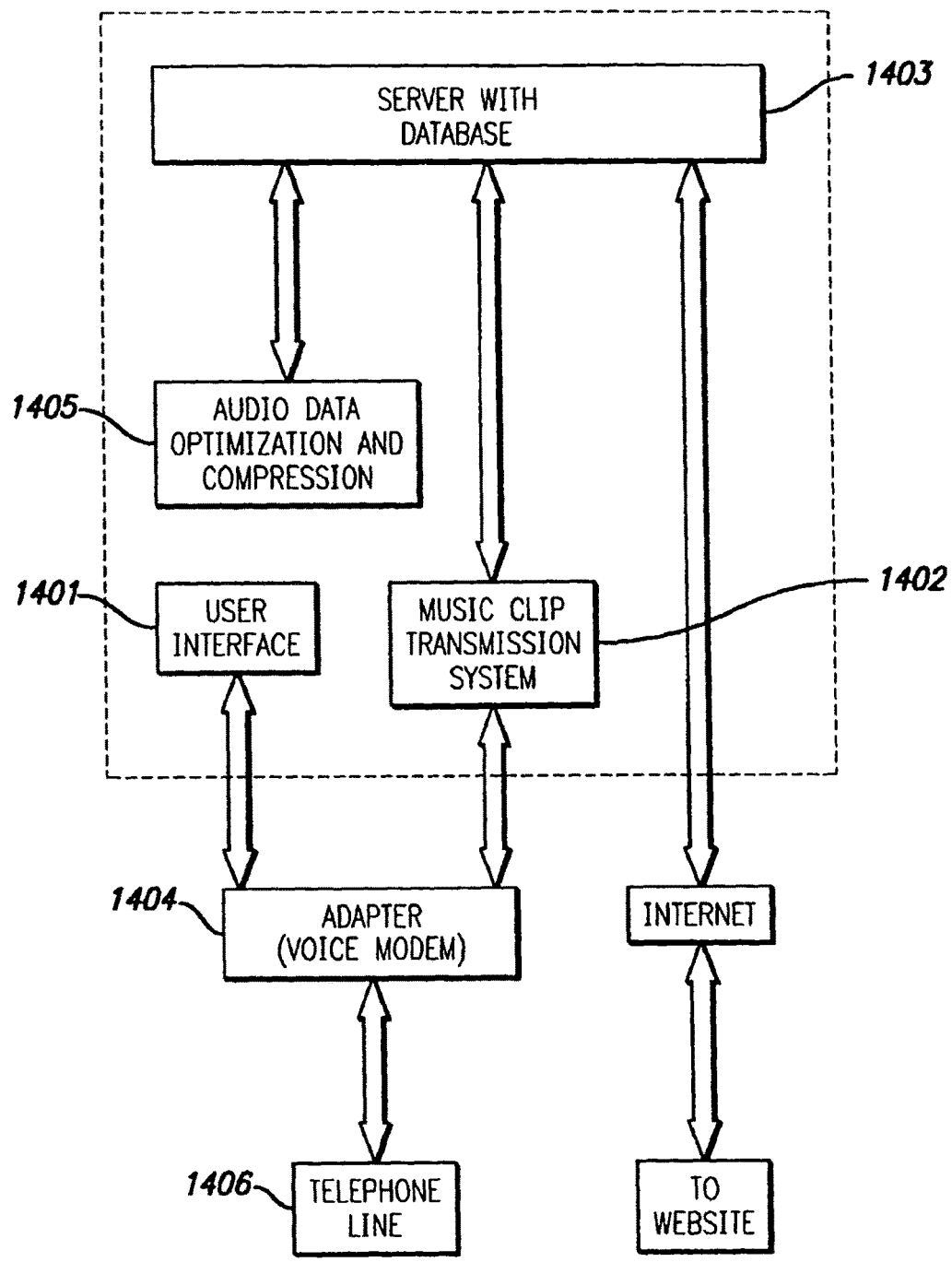
FIG. 14 is a schematic diagram of server software for the system of FIG. 12.

A schematic diagram for a server software system is shown in FIG. 4 for a cellular phone system, and FIG. 14 for a landline system. The software may be written in C++ under Microsoft Windows or any other suitable language. The functions of the server software include servicing user requests via a user interface element and transmitting a selected sound and/or image file through the phone line via a music clip transmission element.

According to a preferred embodiment, functions of the user interface element may include decoding DTMF keys pressed by the user and playing the voice menu labels to the user. The voice menu interface may include hierarchical submenus, leading to different functions. In all examples, the user interface element can be unified in the sense that the voice interface and DTMF or voice recognition-based interface are independent of the type of network or type of phone(s) used. Implementations that utilize a single server to process requests originating from different types of networks and/or phones can therefore be built.

The system of submenus leads a user to the downloading of the selected sound and/or image files. Thereafter, control is transferred to the sound and/or image file transmission element for downloading sound and/or image files into the phone. The sound and/or image file transmission element interfaces directly with the phone accessory unit, independent of the user. The sound and/or image file transmission element is dependent on the type of the phone used and the network infrastructure.

Example Transmission System for a Cellular Phone and Network

FIG. 2 is a schematic diagram of a wireless transmission system 200 for a cellular phone 202, which may be either an analogue (voice-only) or digital system. In both cases, a specialized board 203, implementing all required functions, similar to the chip 104, is incorporated in an accessory unit 204 attached to the cellular phone. Although the system 200 is described as incorporating an accessory unit, it should be understood that a chip performing the same functions of the board may instead be embedded or situated in the phone itself, or a software system may be integrated with the existing hardware chip of a conventional cellular phone without the need for additional hardware. The system 200 further includes a server 206 and software 207 for the server.

The cellular telephone 202 may be any commercially available cellular phone having capabilities for supporting a command set for general telephone control, [i.e., a V.25 Ter serial asynchronous automatic dialing and control as recommended by the ITU-T (International Telecommunication Union-Telecommunication sector)] and for supporting V.25 Ter "+C" extensions according to the ETSI (European Telecommunications Standards Institute) ETS-300-916 standard for obtaining codes of keys pressed by the user and for receiving caller ID information. Additionally, the phone 202 should have capabilities for subscribing to a cellular provider 208 with caller ID service support.

Figure 3:
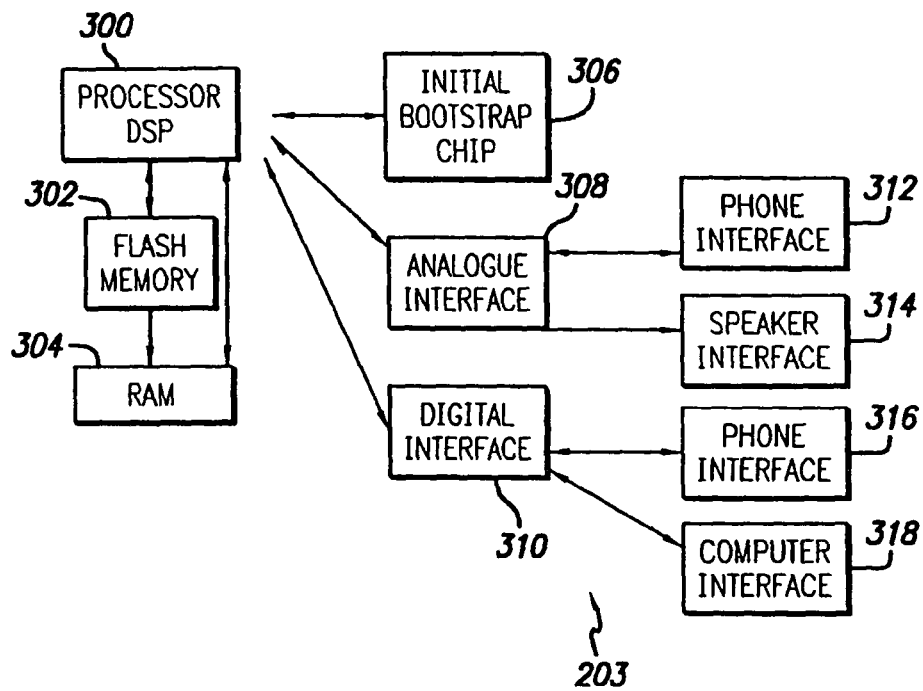
FIG. 3 is a schematic diagram of a board system implemented in an accessory unit of the system of FIG. 2.

A schematic diagram of the board 203 is shown in FIG. 3. In an embodiment where an accessory unit is used the board 203 is implemented in the accessory unit 204 which can be attached to the phone 202 through a standard extension connector where other commercially available accessories such as a hands free ear set and charging adapter are typically connected.

The board 203 may include the following main blocks: a Digital Signal Processor (DSP) 300, a flash memory element 302, a Random Access Memory (RAM) element 304, an initial bootstrap chip 306, an analogue interface element 308, and a digital interface element 310.

The processor 300 may execute the device firmware, provide control for all other blocks and perform the computational tasks for the board 203. The tasks performed by the processor 300 include control of the board's units, monitoring of keys pressed by the user and processing of key-press events, reception of information from the computer through the computer digital interface, reception of caller ID information through the phone digital interface, reception of packed sound and/or image files through the phone analogue or digital interface, unpacking and then playing back sound and/or image files through a built-in speaker connected to the analogue interface of the accessory unit 204, support of a voice menu-driven user interface, and performance of other auxiliary functions.

The flash memory element 302 may contain the device firmware, and sound and/or image files which can be pre-loaded as well as downloaded from the server. The RAM element 304 may enable the processor to run faster and also holds buffers for unpacked sound fragments and processor service procedures. When the power is turned on, the initial bootstrap chip 306 loads the device.

The analogue interface element 308 includes a phone interface element 312 and a built-in speaker interface element 314. The phone interface element 312 is used for input and output of signals when downloading sound and/or image files from the server 206. The speaker interface element 314, with the speaker, plays all system sounds heard by the user including voice menus and sound clips, and/or a screen display visual files.

The digital interface element 310 includes a phone interface element 316 and may include a computer interface element 318. The phone interface element 316 is used for phone control and for receiving key codes and caller ID information from the phone. The computer interface element 318 is used for various service functions such as downloading preprogrammed sound and/or image files from the computer to the flash memory.

The functions of the server software, shown in FIG. 4, include servicing a user's requests via a user interface element 402 and transmitting a selected sound and/or image file through the phone line 404 via a sound and/or image file transmission element 406.

A user interface element 402 is provided whose functions include decoding DTMF keys pressed by the user and playing the voice menu labels to the user. The voice menu interface may include hierarchical submenus which lead to the downloading of the selected sound and/or image file. Thereafter, control is transferred to the sound and/or image file transmission element 406 for downloading sound and/or image files into the phone. The sound and/or image file transmission element 406 interfaces directly with the phone accessory unit, independent of the user.

The selected sound and/or image file may be transmitted through the phone line to the accessory unit 204 first through the server hard drive 408, then through the server software 207, next through the voice adapter 210, then through the phone line of the network to the cellular service provider 208, to the cellular phone 202, and through the analogue interface 308 of the accessory unit 204, then through the processor 300 of the accessory unit 204, and finally, through the flash memory element 302 of the accessory unit 204. When the sound and/or image file transmission is completed, the task of the sound and/or image file transmission element is completed. Thereafter, the phone line 404 is released and control is transferred to the user interface element 402.

In an autonomous mode, the board 203 may contain a number of pre-loaded sound and/or image files. Initially, the board 203 is in the inactive state. The board 203 and phone 202 interact such that the phone sends to the board codes of all the keys pressed by the user. Upon receiving a particular sequence of codes or when, for instance, a particular key is pressed for a prolonged period of time, the board 203 switches to the active mode. In the active mode the board 203 may interact with the user via a voice menu-driven interface where voice messages, via a speaker, prompt the user to respond by pressing a selection of phone keys indicating the user's responsive selections. The board 203 reacts to the user's selections by analyzing the keys being pressed.

The clips are stored on an internal clip index which can be retrieved from the internal memory and played back according to key commands provided by the user. Examples of voice menu options provided by the device 204 through a speaker upon switching to an active mode include: 1) the user may choose to exit the active mode and enter the passive mode (e.g., by pressing "0"); 2) the user may choose to listen to a current sound file or view an image file on the file index (e.g., by pressing "1"); 3) the user may choose to listen to the next file on the index (e.g., by pressing "2"); 4) the user may choose to listen to a previous file on the index (e.g., by pressing "3"); or 5) the user may choose to assign a caller ID number to the current file on the index (e.g., by pressing "4").

Upon choosing to assign a caller ID phone number to the current file, the device may switch to a sub mode with a sub-menu having the following options: 1) the user may choose to switch back to the previous menu (e.g., by pressing "0"); 2) if the selected file was already assigned, the user may choose to get information regarding the caller ID already associated with the file (e.g., by pressing "1"); or 3) the user may input a new caller ID phone number for the current file (e.g., by pressing "2" indicating this choice, then dialing in the phone number followed by the "#" sign).

In the passive mode, the device 204 may analyze messages being received from the telephone 202. Upon receiving an incoming call, the device 204 checks the incoming caller's phone number against the list of assigned caller ID sound and/or image files in its memory and plays back the particular sound and/or image file through the built-in speaker and/or screen if the specified caller's phone number was assigned to this file. Alternatively, the device 204 may play back a default sound and/or image fileif the particular caller ID was not assigned to any file.

In order to transfer digitally compressed sound and/or image file data through the analogue channel a suitable method and algorithm to map digits to sounds may be used. This method is implemented not only for a cellular telephone using an analogue cellular network but also for a landline transmission system of a home phone, shown in FIG. 12.

Method for Data Transmission Over an Audio Channel of a Wireless Telephone

Figure 5:
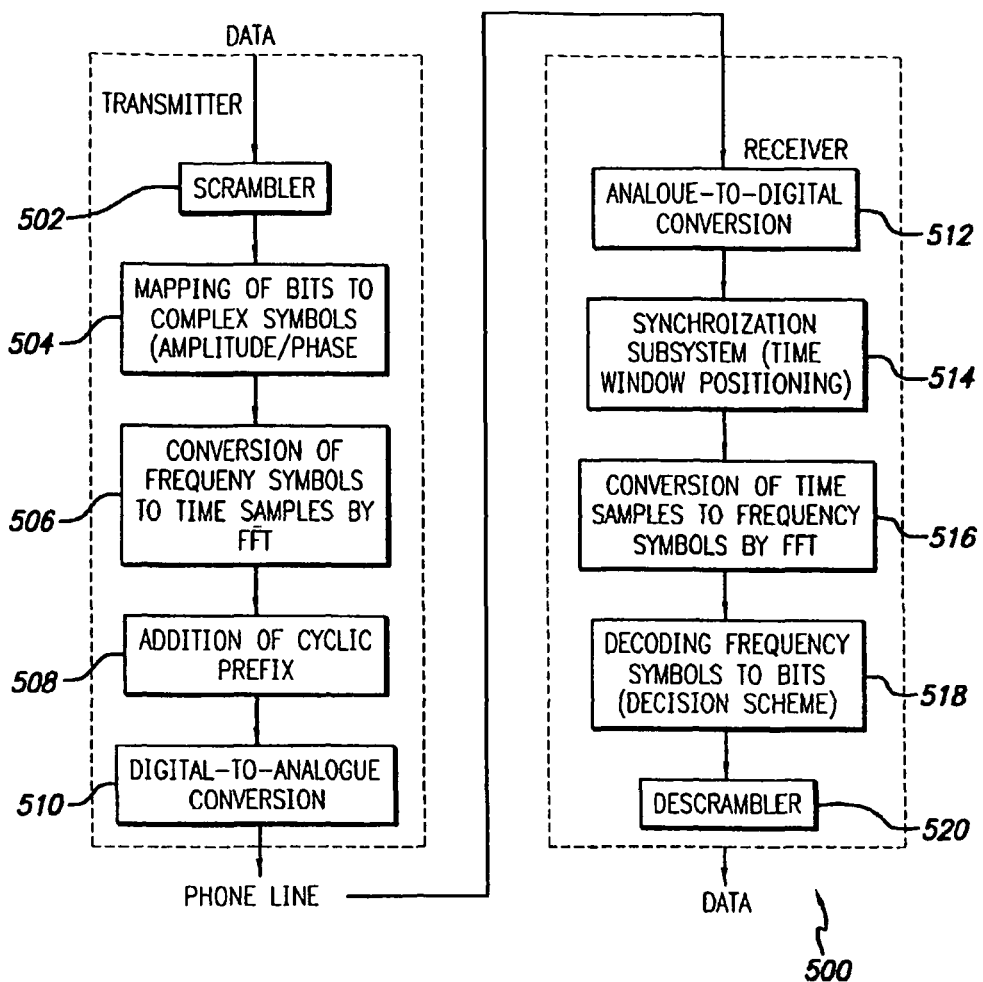
FIG. 5 is a flow chart illustrating a data transmission method.

A data transmission method 500 for transferring data through the phone line and the receiver, based on a voice mode connection (versus data mode) and DTMF signal interpretation is illustrated in FIG. 5. A similar approach can be implemented for a landline telephone that does not have a data transmission mode.

For transmitting data through the phone line, the transmission method 500 comprises the steps of a) data scrambling 502, b) data mapping 504, c) conversion of frequency symbols to time samples 506, d) addition of cyclic prefix 508, and e) digital to analogue conversion 510. The data is then sent through the receiver, following the reverse steps of f) analogue to digital conversion 512, g) symbol synchronization 514, h) conversion of time samples to frequency symbols 516, i) decoding frequency symbols to bits 518, and j) descrambling the data 520.

The transmission method is used to provide enough speed for the data transmission. The transmission method allows simultaneous use of the voice communication and data transmission features (during one connection session) without having to switch the mode of connection. A customer does not need to use a Wireless Internet Service Provider. A user can simply place a regular call to the specific number (e.g., an "800" number) to gain access to the Server. The dual-mode connection allows for voice and "push button" support as well as voice recognition service.

An orthogonal frequency-division multiplex (OFDM) modulation scheme may be used for data transmission, or any other equivalent or suitable scheme or technique. The benefits of OFDM include: 1) the modulation can be made robust to Inter-Symbol Interference (ISI) by increasing symbol size; 2) the modulation can be made robust to impulse noise by increasing symbol size; 3) for each individual sub-channel, the channel's response could be considered essentially flat, minimizing the need for channel equalization; and 4) different encoding schemes could be used for different sub-channels, for accommodating frequency-selective channel distortions.

The total bandwidth to be used by the method is determined by the worst case of supported audio channel. A suitable algorithm for compression of the voice channel is the GSM RPE-LTP algorithm which essentially has a built-in down-sampling by a factor of 3 in which the allowed bandwidth is limited at 4000/3=1333 Hz. Usually channel response is severely limited at frequencies below about 200 Hz to 250 Hz. No OFDM symbol time-windowing is employed to minimize variations of transmitted signal amplitude envelope.

A compressed voice channel can also introduce significant non-linear distortions. Therefore, it may not be preferred to have a large number of sub-channels; otherwise the algorithm may be affected by significant inter-channel interference (ICI) due to loss of orthogonality between sub-channels. About 32 sub-channels appear to provide enough symbol size while maintaining satisfactory low ICI.

Modulation Symbol Structure

Each OFDM symbol consists of a minimum number of samples sufficient to represent all sub-channels. To increase computation efficiency, a Fast Fourier Transform is employed to convert sub-channel symbols from frequency to time area. Therefore, for 32 sub-channels, OFDM symbol size should be at least 64 real samples (at 2666 Hz rate). A circular prefix of 16 samples is used to improve separation between symbols, and minimize ISI (Inter Symbol Interference) and ICI. Therefore, total symbol size is 80 samples at 2666 Hz.

Receiver Synchronization

Circular extension prefix redundancy, present in the signal, is used to facilitate OFDM symbol synchronization in the receiver. A synchronization subsystem effectively computes auto-correlation coefficients of the received sequence (e.g., at 2666 Hz). The output of the correlator goes through a "rectifying" phase-locked loop-like system which outputs synchronization impulses at the proper time instants to sample OFDM symbols correctly.

Synchronization system induced timing jitter leads to rotation of received sub-channel phasors by increments, proportional to the central frequency of a particular sub-channel. This rotation is compensated in the decision scheme.

Data Mapping

The output of a scrambler is mapped onto complex symbols (amplitude/phase) of the OFDM sub-channels. Individual sub-channels use QPSK (Quadrature Phase Shift Keying) modulation.

Data Scrambling

Data scrambling is employed in order to provide statistically random distribution of transmitted symbols to reduce peak-to-average power ratio of OFDM symbols. A self-synchronizing scrambler with generating polynomial of is $1+x^{-18}+x^{-23}$ is used which, at the transmitter, effectively divides the data sequence by the generating polynomial. The coefficients of the quotients, taken in descending order, form the output data sequence.

Example Using Analogue Cellular Network and Cellular Telephone

The above-described accessory unit 204 is provided in this example in the context of analogue (providing only voice channel) cellular network.

Initially, the device 204 is in an inactive mode. A user dials the server number and, navigating through a system of voice menus supported by the server software, listens to and selects a particular sound and/or image file in the same way as browsing the loaded sound and/or image file in the autonomous mode. Instead of assigning a caller ID, the user may choose to download sound and/or image files.

When a user, navigating through the server voice menus, selects to download the current file and in the embodiment using an accessory unit activates the accessory unit 204 through the predefined key sequence, the process of transmission of the selected sound and/or image file is initiated. After selecting a "download" option, the user may press a specific key combination on the phone to switch the accessory unit 204 from the inactive to the active mode. The unit 204 then begins to interact with the server 206, using the analogue channel provided by the phone and network. The already established phone connection is used to receive information. The device may receive the sound and/or image file selected by the user and download it into internal flash memory.

At the end of a session, the unit 204 forces the telephone 202 to hang up and switches to the autonomous mode which enables the user to assign a new caller ID to the sound and/or image file just received. When a user, navigating through the server voice menus, selects to download a clip and activates the accessory unit 204 through the pre-defined key sequence, the process for transmission of the selected sound and/or image file is initiated.

The selected sound and/or image file is transmitted through the phone line to the accessory unit 204 first through the server hard drive 408, then through the server software 207, next through the voice adapter 210, then through the phone line of the network to the cellular service provider 208, to the cellular phone 202, and through the analogue interface 308 of the accessory unit 204, then through the processor 300 of the accessory unit 204, and finally, through the flash memory element 302 of the accessory unit 204.

Generally, the server software 207 retrieves the selected sound and/or image file from a database 212, converts it, for example, to the special sequence of sounds modulates, transfers codes of these sounds to the voice adapter 210 that converts these codes to actual sounds and transfers these sounds to the phone line 214. From the phone line 214, the sounds go to a cellular provider 208 through to a radio channel, and to the cellular phone 202 itself (much like voice sounds are transferred during a normal phone conversation). The sounds then go through the connector and are received in analogue form by the board 203. The sounds are then converted by the device ADC (Analog to Digital Converter) to the digital form and are processed by the DSP (digital signal processor—"demodulated") 300 to the same digital data form initially stored on the database 212 (e.g., in MPEG audio format). In this form, the sound clip data are written into the flash memory 302 of the device 204.

Following a reverse direction, going from the board 203 to the server 206 using the same chain, the device sends to the server either an "acknowledgement" of a successful delivery of the sound clip data or a list of data blocks received with errors so that these blocks can be resent in a second try. In order to transmit digital data through the analogue channel, a similar procedure is used to convert data to sounds and back.

When all the data is transferred without errors, the board 203 signals to the server 206 that the call may be disconnected. Thereafter, the server 206 instructs the voice adapter 210 to hang up, freeing the phone line for another client, and the board 203 switches to the autonomous mode, allowing the user to assign a caller ID to the sound clip most recently downloaded.

Example Using Digital Cellular Network and Cellular Telephone

The above-described accessory unit 204 is used in this example in the context of digital (capable of providing a dedicated data transmission channel) cellular network. Since in this case a digital channel is used for sound and/or image file data transmission, no modulation is required on the mobile phone side. The server, on the other hand, uses a modulation protocol compatible with the protocol supported by the cellular network provider. Usually this can be accomplished by using a standard ITU-T-approved modem, like V.32 or V.34.

Initially, the unit 204 is in an inactive mode. A user dials the server number or otherwise connects with a server and, in a preferred embodiment, navigating through a system of voice menus supported by the server software, listens to, or views, and selects a particular sound and/or image file in the same way as browsing the loaded sound and/or image file in the autonomous mode. Instead of assigning a caller ID, the user may choose to download sound and/or image files.

When a user, navigating through the server voice menus, selects to download the current file and activates the accessory unit 204 through the pre-defined key sequence, the process of transmission of the selected sound and/or image file is initiated. After selecting a "download" option, the user may press a specific key combination on the phone to switch the accessory unit 204 from the inactive to the active mode. The unit 204 then begins to interact with the server 206, using the digital channel provided by the phone and the network. If possible, the already established phone connection is used, or a new connection is established specifically for digital data transmission.

The selected sound and/or image file can be transmitted through the phone line to the accessory unit 204, or a phone enabled and configured as such, first through the server hard drive 408, then through the server software 207, next through the voice adapter-modem 210, then through the phone line of the network to the cellular service provider 208, to the cellular phone 202, and through the digital interface of the accessory unit 204, then through the processor 300 of the accessory unit 204, (on phone) and finally, through the flash memory element 302 of the accessory unit 204.

Generally, the server software 207 retrieves the selected sound and/or image file from a database 212, transfers codes of these sounds and/or images to the voice adapter-modem that converts these codes to actual sounds, (or something) that converts codes to images using one of the standard modulation protocols supported by the cellular provider (like ITU-T V.32 or V.34) and transfers these sounds and/or images to the phone line 214. From the phone line 214, the sounds and/or images go to a cellular provider 208, where they are demodulated back into digital data and then the data goes to the cellular phone 202, through the radio channel, using the digital channel provided by the cellular network. The data is then received by the processor of the accessory unit, and then written into the flash memory 302 of the device 204.

Following a reverse direction, going from the board 203 to the server 206 using the same chain, the device sends the server either an "acknowledgement" of a successful delivery of the sound and/or image file data or a list of data blocks received with errors so that these blocks can be resent in a second try. When all the data is transferred without errors, the board 203 signals to the server 206 that the call may be disconnected. Thereafter, the server 206 instructs the voice adapter-modem to hang up, freeing the phone line for another client, and the board 203 switches to the autonomous mode, allowing the user to as sign a caller ID to the sound and/or image file most recently downloaded.

In order to provide a guaranteed and error-free delivery of digitally compressed sound and/or image file data through the data channel provided by the phone and network, a special error detection and correction method is proposed in a preferred embodiment.

A Data Transmission Method with Error Correction Delivery

In a preferred embodiment, a method for data transmission with error correction assumes a sufficiently low probability of error in the channel and implements error correction by re-sending the affected data blocks. The data (i.e. the compressed sound clip) is split into smaller data blocks by the server. Each block is supplied with a special header that, in particular, includes the block number and a cyclic redundancy code word for error detection, computed for the block data and header. Other error detection codes can also be utilized. The data blocks are then sent through the data channel sequentially. Using the redundancy code, the receiver (i.e. the mobile device) checks the correctness of each received block. The size of blocks is selected in such a way that 1) there is a high probability of error-free transmission of a block; and 2) the overhead introduced by additional control information (e.g. header, CRC word) is not high compared to the data payload.

If the block size is selected properly, only a few blocks out of the entire sequence are usually affected by channel errors. These erroneous data blocks are re-sent by the Server upon receiving special requests.

Depending on the availability of bi-directional data transfer, one of two protocols can be used. If the phone and network support simultaneous transmission of data in both directions, a protocol that uses simultaneous transmission of data in a server-to-phone direction and acknowledgements in a phone-to-server direction can be utilized. In this case, a special acknowledgement packet is sent for each valid data block received by the device. If a block is received with an error, a negative acknowledgement packet is sent.

Figure 16:
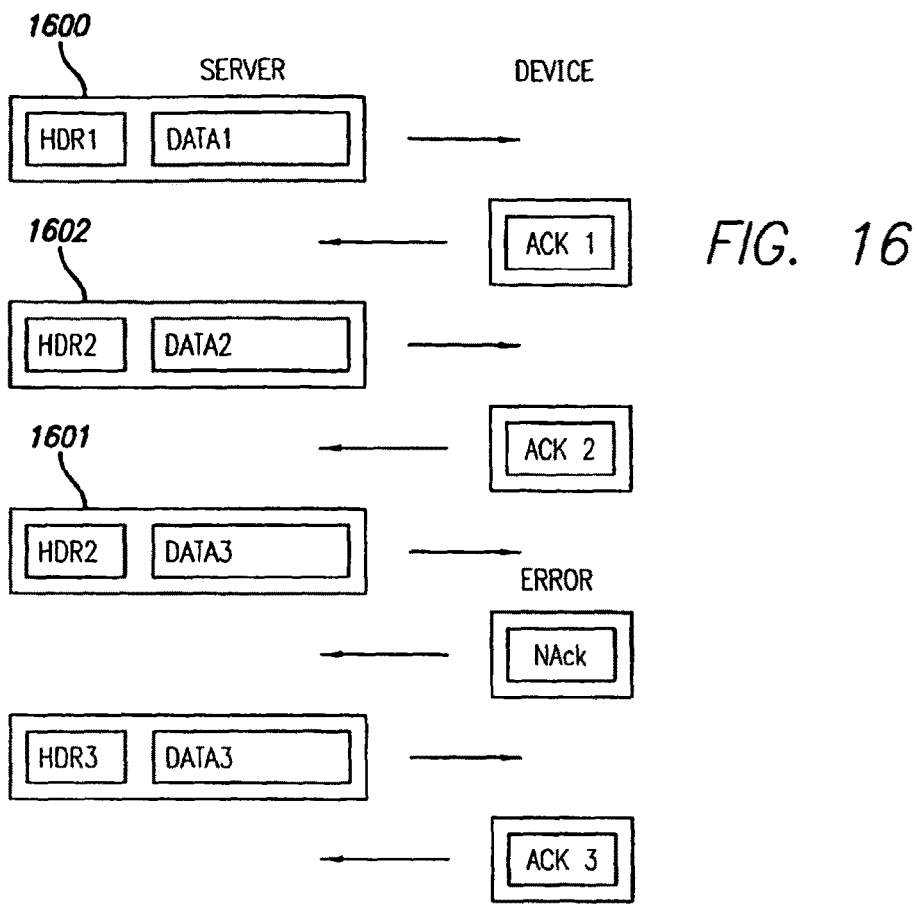
FIG. 16 is a schematic diagram of a protocol for a data transmission method with error correction delivery for a digital cellular telephone, illustrating individual packet acknowledgement for a full-duplex channel case.

The sever software, receiving these control packets, either sends the next subsequent data block, until all data blocks are transferred, or resends the block received with error. When all data blocks are transferred, and the positive acknowledgement is received for the last block, the sound and/or image file is considered to be completely delivered. An example of such interaction is shown in FIG. 16 (Do I have this figure?) for a protocol with individual packet acknowledgement for full-duplex channel, showing three data blocks 1600, 1602, and 1604 for corresponding data, indicated in the figure as "Data1" "Data2" and "Data3", with corresponding headers "Hdr1", "Hdr2", and "Hdr3". Positive acknowledgements "Ack1" and Ack2" are sent for packets numbers 1 and 2. Packet number 3 is originally received with an error, indicated by "Nack" and is subsequently re-sent to successfully correct the error, whereby a positive acknowledgement "Ack3" is sent.

Figure 17:
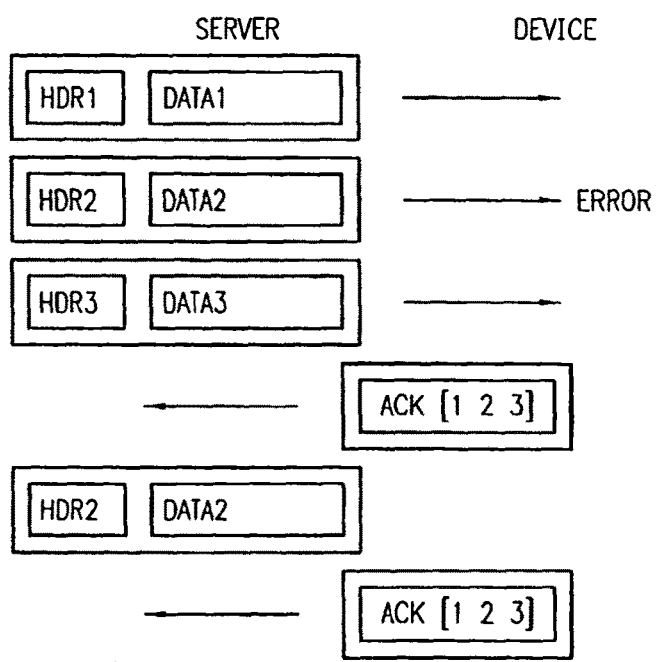
FIG. 17 is a schematic diagram of a protocol for a data transmission method with error correction delivery for a digital cellular telephone, illustrating single acknowledgement for all packets for a half-duplex channel case.

If the phone or network supports only unidirectional data transmission, the other protocol can be utilized to minimize the number of channel direction alterations. In this case, all data blocks for the sound and/or image file are sent at once by the server, without receiving acknowledgements for the individual packets. Then, a single control packet is transferred in the opposite (device to server) direction. This control packet contains a bit mask, with one bit for each data block received. Each bit in the bit mask has a "1" value if the corresponding data block was received without errors, or a "0" value if the corresponding block was affected by errors. The server then re-sends those blocks that were received with errors in the first pass. When all data blocks are transferred, and the acknowledgement mask without errors indication is received by the server, the sound and/or image file is considered to be completely delivered. Example of such interaction is shown in FIG. 17, (Do I have this figure??) where the packet number 2 is originally received with an error and is successfully re-sent subsequently to correct the error. Note that only two "ACK" packets were sent during the entire procedure.

Example Using Landline Telephony Network and a Conventional Home Telephone

FIG. 12 illustrates an example of a landline telephony network system 1200 using a voice channel and a conventional home telephone 1201, according to a preferred embodiment. (Although this system is described with respect to the accessing and delivery of sound clip files, it is to be understood that the system may be used for the accessing and delivery of entire files).

The system 1200 has two main components: a home telephone accessory unit 1202 and a server 1205. The accessory unit 1202 is an autonomous unit, attached to the phone line 1208 and to the phone (between the line and the phone), and powered from the AC power outlet. A chip performing the same function of the accessory unit may instead be embedded in the phone itself. The purpose of the accessory unit 1202 is to support selection, downloading, and playback of sound and/or image files according to the Caller ID of the calling subscriber. The accessory unit 1202 may include a speaker system and enables the phone to "ring" sound and/or image files or perform other functions as described for the cellular phone 102.

The server 1205, which is associated with stored clip files 1206, which may be stored on a website or a non web holding unit, is designed to execute requests of the accessory unit 1202 either through user voice commands or commands using the phone keys, and allows for files to be transmitted to the accessory unit 1202 for storage. The system 1200 enables a connection to the server upon a request from the accessory unit 1202, utilizing the phone and PSTN (Public Switched Telephone Network), and an adapter 1204 (voice modem) attached to the server computer. The system 1200 may have a voice menu, which, after connection to the server, allows the user to listen to the server's menu and navigate through the system of voice menus using the phone's DTMF keys. The system may allow the user to select and download files by allowing the user to listen to the files presented by the server, select a file, and issue a download command to the server. The server then sends the selected file (e.g., in digital compressed form) using the Custom Data Transmission Protocol (CDTP) over the voice channel.

The device 1204 may further interface with a home PC 1214 for downloading sound and/or image files to the device. The interface may be a plug in connection or may use a wireless network system.

The accessory unit 1204 may be sold as a unit compatible to most home phones including cordless phones, and may connect directly to the phone jack, with the phone connected to the device. Similar to the cellular phone 102, a home phone may include an embedded chip, instead of the accessory unit 1204, for performing functions similar to those of the accessory unit 1204.

The handset of a cordless phone utilizing sound and/or image files according to the present invention may ring simultaneously with the box, wherein the handset may sound a regular phone ring or a sound, and/or display a file "ring" while the box plays a sound and/or image file "ring".

The server comprises software shown in FIG. 14, which can run under Windows 98®, Windows-NT OS®, or other suitable system using a voice modem for communications. Additionally, the system may use a single modem or a pool of several modems.

Initially, the accessory unit 1202 is in an inactive mode. A user dials or otherwise connects to the server and, in a preferred embodiment, navigating through a system of voice menus supported by the server software, listens to and/or views and selects a particular sound and/or image file in the same way as browsing the loaded sound and/or image files in the autonomous mode. Instead of assigning a caller ID, the user may choose to download sound and/or image files.

When a user, navigating through the server voice menus, selects to download the current file and activates the accessory unit 1202, such as through the pre-defined key sequence, the process of transmission of the selected sound and/or image file is initiated. After selecting a "download" option, the user may, e.g. press a specific key combination on the phone, to switch the accessory unit 1202 from the inactive to the active mode. The device 1202 then begins to interact with the server 1205, using the analogue channel provided by the telephone and the network. The already established phone connection is used to receive information.

The selected sound and/or image file is transmitted through the telephone line to the accessory unit 1202 first through server 1205, next through the adapter 1204, then through the telephone line of the PSTN to and through the analogue interface 1305 of the accessory unit (shown in FIG. 13), then through the processor 1301 of the accessory unit 1202, and finally, through the flash memory element 1302 of the accessory unit 1202. (always need flash memory?)

Figure 13:
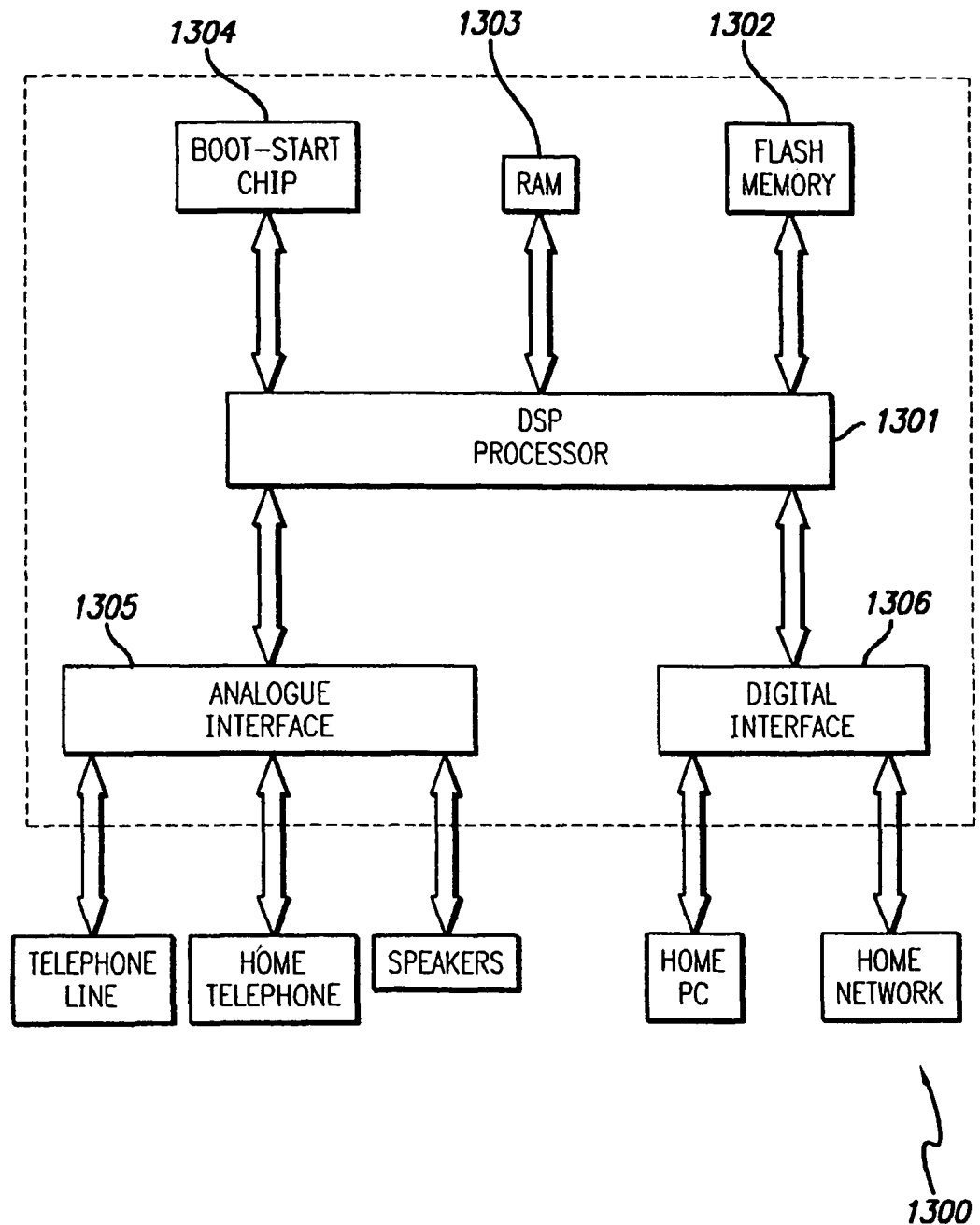
FIG. 13 is a schematic diagram of a board system implemented in an accessory unit of a home telephone utilizing the system of FIG. 12.

A preferred embodiment of a schematic diagram of a board 1300 implemented in the accessory unit 1202 is shown in FIG. 13. The board may include the following main blocks: a processor element 1301 [e.g., a Digital Signal Processor (DSP)], a flash memory element 1302, a Random Access Memory (RAM) element 1303, a bootstrap chip 1304, an analogue interface element 1305, and a digital interface element 1306.

The processor 1301 executes the device firmware, provides control for all other blocks and performs the computational tasks for the board. The tasks performed by the processor 1301 include: control of the board's units, monitoring of keys pressed by the user and processing of key-press events, reception of information from the computer through the computer digital interface, reception of caller ID information from telephony service provider, reception of sound and/or image files through the phone analogue interface, unpacking and then playing back sound clips through a built-in speaker connected to the analogue interface of the accessory unit 1202, support of a voice menu-driven user interface, and performance of other auxiliary functions.

The flash memory element 1302 contains the device firmware, and the sound and/or image files which can be pre-loaded as well as downloaded from the server. The RAM element 1303 enables the processor to run faster and also holds buffers for unpacked sound fragments and processor service procedures. When the power is turned on, the bootstrap chip 1304 loads the device.

The Analogue Interface element 1305 includes a telephone interface element and a built-in speaker interface element. The telephone interface element is used for input and output of signals when downloading sound and/or image files from the server 1205. The speaker interface element with the speakers, plays all system sounds heard by the user including voice menus and sound files. (What about image files?)

The digital interface element 1306 may include a computer interface element and other digital interface elements to the home network. The computer interface element may be used for various service functions such as downloading preprogrammed sound and/or image files from the computer to the Flash Memory.

In an autonomous mode, the accessory unit 1202 contains a number of pre-loaded sound and/or image files. Initially, the accessory unit is in the inactive state. The accessory unit 1202 and telephone 1201 interact such that the telephone 1201 sends to the accessory unit 1202 codes of all the keys pressed by the user. Upon receiving a particular sequence of codes or when, for instance, a particular key is pressed for a prolonged period of time, the accessory unit 1202 switches to the active mode. In the active mode, the accessory unit 1202 may interact with the user via a voice menu-driven interface where voice messages, via a speaker, prompt the user to respond by pressing a selection of phone keys indicating the user's responsive selections. The accessory unit 1202 reacts to the user's selections by analyzing the keys being pressed.

In the passive mode, the accessory unit 1202 may analyze messages being received from the telephone 1201. Upon receiving an incoming call, the accessory unit 1202 checks the incoming caller's phone number against the list of assigned caller ID sound and/or image files in its memory and plays back the sound and/or image file through the built-in speakers and/or screen display if the specified caller's phone number was assigned to this file. Alternatively, the accessory unit 1202 may play back a default sound and/or image file if the particular Caller ID was not assigned to any file.

A preferred embodiment of a schematic diagram of the server software is shown in FIG. 14. The server software is used for servicing user requests through user interface element 1401, and transmitting the selected sound and/or image files through the phone line via sound and/or image file transmission element 1402. The user interface element 1401 decodes DTMF keys pressed by the user, and plays voice menu labels to the user. The voice menu interface includes hierarchical submenus to lead the user to the downloading of the desired sound and/or image file, where control is transferred to the sound and/or image file transmission element 1401.

The sound and/or image file transmission element 1401 downloads sound and/or image files to the phone, independent of the user interface element, interfacing directly with the phone accessory unit. The sound and/or image file transmission element 1402 initially transmits the selected sound and/or image file to the adapter 1404 for data transmission from the server to the accessory unit. When the sound and/or image file transmission is completed, the task of the transmission element is done, and the telephone line is released and control is transferred to the user interface element 1401

Generally, the server software retrieves the selected sound and/or image file from a server database 1403, which is preferably associated with an audio data optimization and compression element 1405, converts the file to the special sequence of sounds modulates, and transfers codes of these sounds to the adapter 1404 which converts these codes to actual sounds and transfers these sounds to the phone line 1406. From the phone line 1406, the sounds go through the PSTN and are received in analogue form by the accessory unit 1202. The sounds are then converted by the device ADC (Analog to Digital Converter) to the digital form and are processed by the DSP (digital signal processor) 1301 to the same digital data form initially stored in the server database 1403 (e.g., in MPEG audio format). In this form, the sound clip data are written into the flash memory 1302 of the accessory unit 1202. (What about images?)

Following a reverse direction, going from the accessory unit 1202 to the server 1205 using the same chain, the device sends to the server either an "acknowledgement" of a successful delivery of the sound and/or image file or a list of data blocks received with errors so that these blocks can be resent in a second try. In order to transmit digital data through the analogue channel, a similar procedure is used to convert data to sounds and/or images and back. When all the data is transferred without errors, the accessory unit 1202 signals to the server 1205 that the call may be disconnected. Thereafter, the server 1205 instructs the adapter 1204 to hang up, freeing the phone line for another client, and the accessory unit 1202 switches to the autonomous mode, allowing the user to assign a Caller ID to the sound clip most recently downloaded The server audio data optimization and compression element 1205, utilizes a music compression algorithm outlined in FIG. 15, which converts common music files into compressed files in order to reduce the audio clip size for minimizing its download time, while maintaining predetermined audio quality. These files are downloaded and stored by the accessory unit 1202.

Preferred Procedure for Audio Data Parametric Optimization and Compression

The method 1500 of compressing the files comprises the steps of a) conversion 1502; b) amplitude normalization 1504; c) sample rate conversion 1506; d) pre-emphasis filtering 1508; e) amplitude normalization 1510; and f) performance of MPEG audio layer 3 (MP3 or any other effective compression, such as the lossy format WMA, AAC and Ogg Vorbis or a lossless compression format as FLAC, Monkey's Audio and SHN) compression with the selected parameters 1512. The compressed files are then transferred to the server database.

Step 1502 of conversion to mono only needs to be performed if the input file is in stereo and if the audio output subsystem of the target hardware is only capable of playing back mono audio. At this step all available information is included into the output audio by summing of the left and right channels to form a single mono output.

After conversion, or if the file does not need to be converted to mono, compression begins with the step 1504 of amplitude normalization, wherein sample amplitudes in the file are normalized. This step is required for enabling audio utilization of all available dynamic range and for improving the computational accuracy of subsequent steps. In order to maximize preservation of original audio range, a fixed coefficient for the entire audio file normalization is used. The coefficient is obtained using input file analysis to "stretch" the input audio range over the maximum available range.

Step 1506 converts sample rate of audio files to selected sampling frequency. The original audio clips may have various sampling rates (44100 Hz, 48000 Hz, 22050 Hz, 11025 Hz, etc.). After analysis of available hardware capabilities an optimal sampling frequency, which provides the most adequate audio quality, is selected. Increasing the sampling frequency above the optimal sampling frequency would not significantly increase the perceptual audio quality, due to the limitations of the audio output subsystem of the accessory unit. For example, for the cellular phone system of FIG. 2, after analysis of available hardware capabilities and a series of perceptual tests, the 22050 Hz sampling frequency was selected as providing the most adequate audio quality since the audio output subsystem of the accessory unit has a relatively sharp drop in response for frequencies above 10-12 kHz.

In order to avoid aliasing effects when changing from higher to lower sampling rate, a low-pass pre-filtering with a cutoff slightly lower than the new Nyquist frequency is applied before down sampling. For rates that are not multiples of each other, cascaded sampling rate conversion schemes are constructed to minimize memory consumption and improve performance.

The step 1508 of pre-emphasis filtering, along with the re-sampling of the previous stage, takes into account the specifics of the audio output subsystem of the accessory unit, to achieve improvement of the perceptual audio quality, and to reduce the resulting audio size after compression.

Since the speaker of the audio output subsystem of accessory unit is preferably very small, the resulting sound has very low power in the low frequency range. Therefore, providing output in the low frequency range is likely to be futile, as it would only increase the size of audio file without any perceptual improvements. Additionally, providing output in the low frequency range may create undesirable "overflow" effects for the speaker.

For example, for the cellular phone system of FIG. 2, all frequency content below about 400 Hz is removed from the audio. In order to make the audio more "perceptually rich" in the low-frequency range, frequencies around 600 Hz are increased by about +6 dB. The frequency range from 1200 Hz to 8200 Hz is kept unchanged. Then, starting from about 8200 Hz the signal power is gradually increased, up to +15 dB at the highest frequency (11 kHz). This compensates for the drop in speaker transfer function at high frequencies and improves the listening experience.

A set of subjective audio perceptual tests with various types of audio contents, using the wide spectrum of hardware of the target platform has proved that the above-described pre-emphasis significantly improves the perceptual quality of resulting audio. At the same time, reducing frequency contents in the "non-significant" frequency regions allows reduction of the resulting compressed audio size, since the data bits are not allocated to non-used frequencies.

The described pre-emphasis procedure is implemented by a filtering with a FIR (Finite Impulse Response) filter, according to the formula: 1 y k=i=0 N–1 b i x k–i where $b_1$ are filter coefficients, $x_k$ is the k-th output audio sample, $y_k$ is the k-th output audio sample.

The $b_1$ coefficients are fixed and computed for the particular sampling rate and the desired pre-emphasis response curve. The filter can be designed to have a linear phase response (this is actually guaranteed if the $b_1$ coefficients are symmetric), which would ensure absence of phase distortions to the audio. Since the delay introduced by the filter is not harmful for off-line processing, the filter size can be made rather large to approximate the desired response curve with a high precision.

After completing the step of pre-emphasis filtering, normalization of the sample amplitude is once again performed. Since the filtering significantly changes the signal, the second amplitude normalization step 1510 is required to convert resulting audio "loudness" to some pre-defined value.

Proceeding to step 1512, the processed audio clip is compressed into an MPEG Layer 3 bit stream. The resulting bit rate (level of compression) can be varied to suit different needs. For instance, it can be made dependent on the source audio clip length, to make the compressed file fit into a pre-defined size. Alternatively, it can be made dependent on the anticipated delivery method (to create, for instance, a "built-in" audio clip of a very good quality, or to make the audio clip of a very small size, for delivery through a slow channel). The compression parameters can also be selected so that the clip delivery time is a constant independent of the actual link transfer rate.

Figure 7:
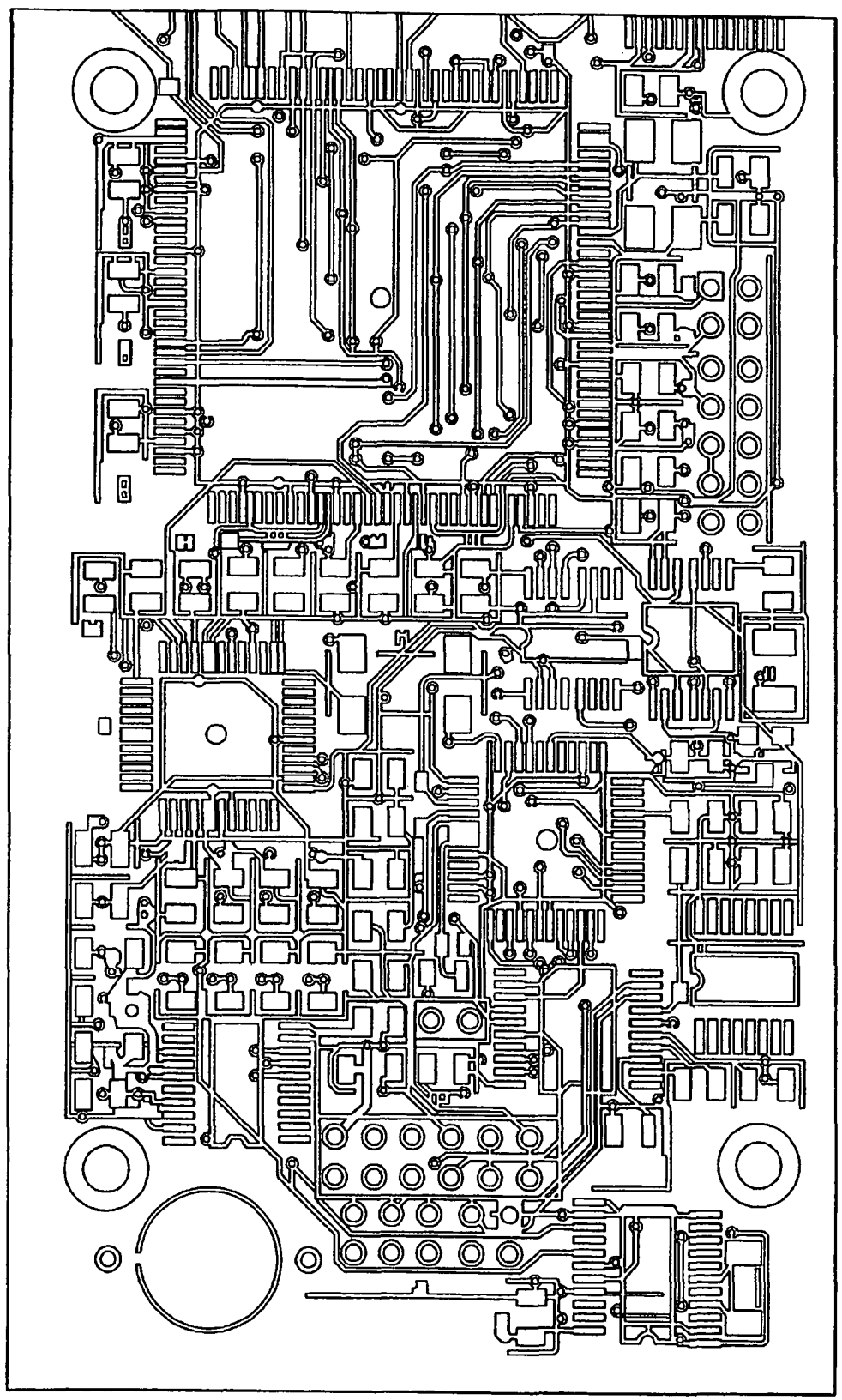
FIG. 7 illustrates an image of a printed circuit board for the accessory unit of FIGS. 6 A-D.

Technical Description of a Preferred Embodiment for a Cellular Phone Accessory Unit Electrical Schematics FIGS. 6 A-D illustrate in a preferred embodiment, the electrical schematics of a mobile phone accessory unit. (The image of the printed circuit board, as rendered by Computer Aid Design Software is shown in FIG. 7). Initial boot-up of the processor is done from the EEPROM (Electrically Erasable Programmable Read Only Memory) using passive serial SPI (Serial Programming Interface) protocol. Thereafter, the boot loader code, read from the EEPROM, loads the main firmware from the Flash memory. The PLL (Phase Locked Loop) of the processor is programmed for 5.times-.multiplication of clock frequency.

Firmware debugging is carried out through the JTAG (Joint Test Action Group) port using standard TI (Texas Instruments) software. External RAM is mapped both to the program and data space at the same addresses and occupies all lower address space (64 k). Flash memory (Serial Data Flash) is accessed using software emulation of SPI protocol.

Audio code (Coder-decoder) works at approx. 22 kHz sampling rate (both channels). The Mode Control transistor selects the phone interface mode: either RS-232 control mode (closed state) or "hands free" mode (opened state). The phone itself does not support simultaneous usage of these two modes.

Both channels of RS-232 work at 11,5200 baud rate. From the PC side CTS (Clear to Send) and DTR (Data Terminal Ready) signals are supported. From the phone side CTS and RTS (Request to Send) signals are supported, with inverted polarities. Both channels employ hardware flow control.

The analogue signal level at the phone input is about 100 mV RMS (Root Mean Square). The level at the phone output is about 600 mV RMS.

Cellular Phone with Accessory Unit

Figure 8:
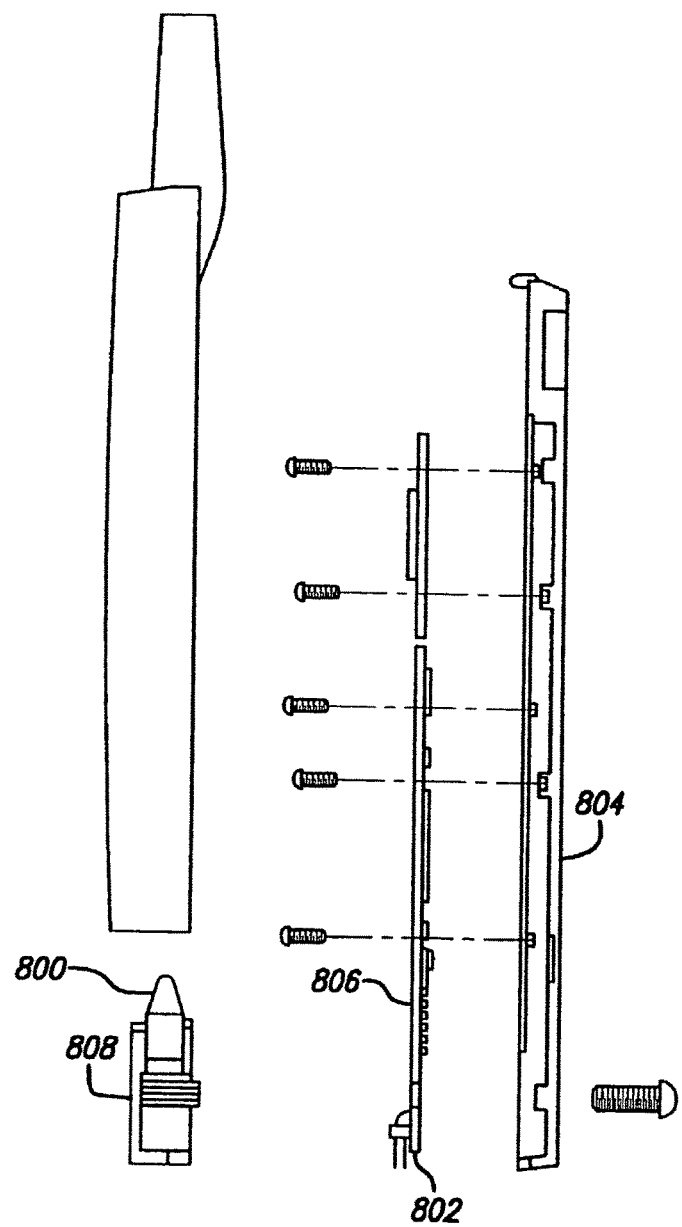
FIG. 8 is an exploded side view illustrating the assembly of a cellular phone accessory unit and cellular phone attachment to the accessory unit.
Figure 9:
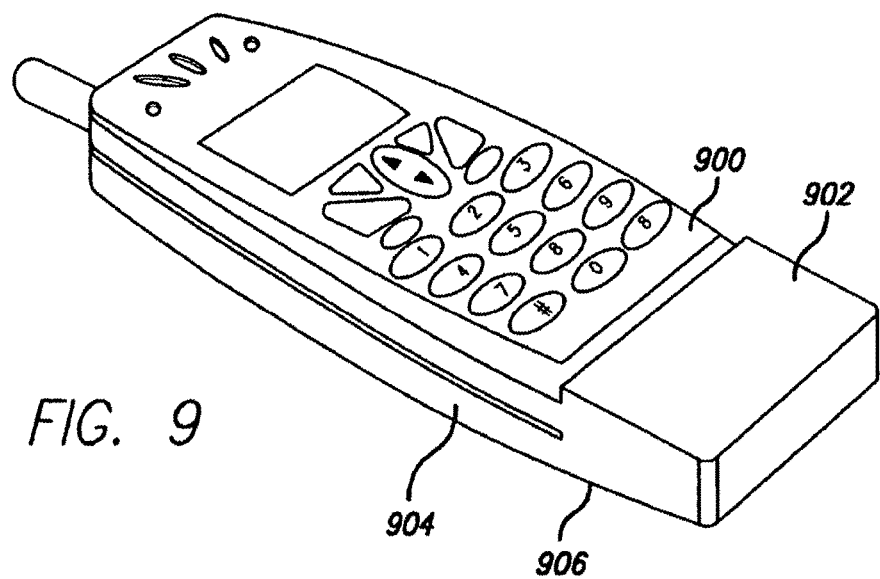
FIG. 9 is a perspective view of the cellular phone accessory unit and cellular phone of FIG. 8, showing the cellular phone attached to the back of the phone connector and mounting of the accessory unit.
Figure 10:
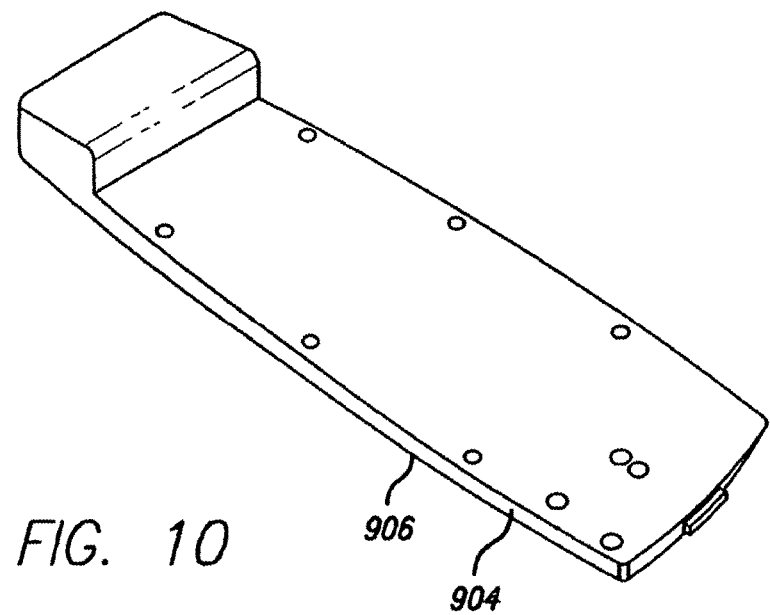
FIG. 10 is a perspective view of the accessory unit of FIG. 9, detached from the telephone.

A cellular phone 900 with an accessory unit 902, according to one embodiment, is shown in FIGS. 8 and 9 using the Ericsson R520 as an example. The accessory unit is housed in thin cover 904 (see FIGS. 10 and 11) providing a mounting body 906 for attaching the phone 900 to the unit, via an interface connector 800. The accessory unit contains the printed circuit board 802 and speaker, preferably along the thin portion of the body.

The accessory unit is attached to the back of the phone using the phone connector 800. A snap mounting which utilizes a dimpled section on the phone case typically intended for a car phone holder may also be used.

The accessory unit includes the server software and two voice modems, attached to the server. The mounting body contains all necessary electronic components.

The tasks of the electronic components include playing back of a pre-loaded sound clip upon a caller ID notification reception and downloading new clips from the server.

The body of the accessory unit preferably comprises a base 804, a thin cover 806, and a molded cover 808. All three body components are preferably made of high-quality aluminum-magnesium-copper alloy (duralumin) and are chemically covered with a protective oxide film using two different dyes (colored and black) for the two copies of the device. A dense rubber casing may also be used. Factors considered in selecting the body material include lightness (so that the accessory unit would not exceed the phone itself in weight), mechanical strength, and the quality of electromagnetic shielding properties for protecting the internal components from the waves radiated by the phone.

According to one embodiment, the accessory unit that embodies the delivery system for a cellular phone attachment is about 1.5".times.1.5".times.0.25" and includes a small high fidelity built-in speaker. The accessory unit may connect into the AC adapter fixture in the bottom of a cellular phone. A dense rubber casing or glove may house the device to protect it. The inside of the rubber glove may have a molded cavity that the device will fit into. The glove may have a circle of small holes which line up with the device's speaker to allow full sound penetration. The device and glove may be sold in different design variations both for marketing purposes and for fitting the different cellular phones on the market.

Additionally, the accessory unit may connect into a cable connector instead of an AC adapter jack so that different jacks can be used. The device may also be modified with four or five variations to fit the various cellular phone software systems, (not AC adapter variations) currently on the market. The device, including a speaker, may also be made with several different adapter applications that would attach to a variety of different phones.

A snap-on mount for fastening the accessory unit to the phone may be located in the base body. The main purpose of the thin cover is to provide the electromagnetic shielding. The molded cover 808 contains connectors and some other components.

A simple snap mechanism for attaching the accessory unit to the phone, similar to the installation of a cellular phone to a car phone holder, may be provided.

Figure 20:
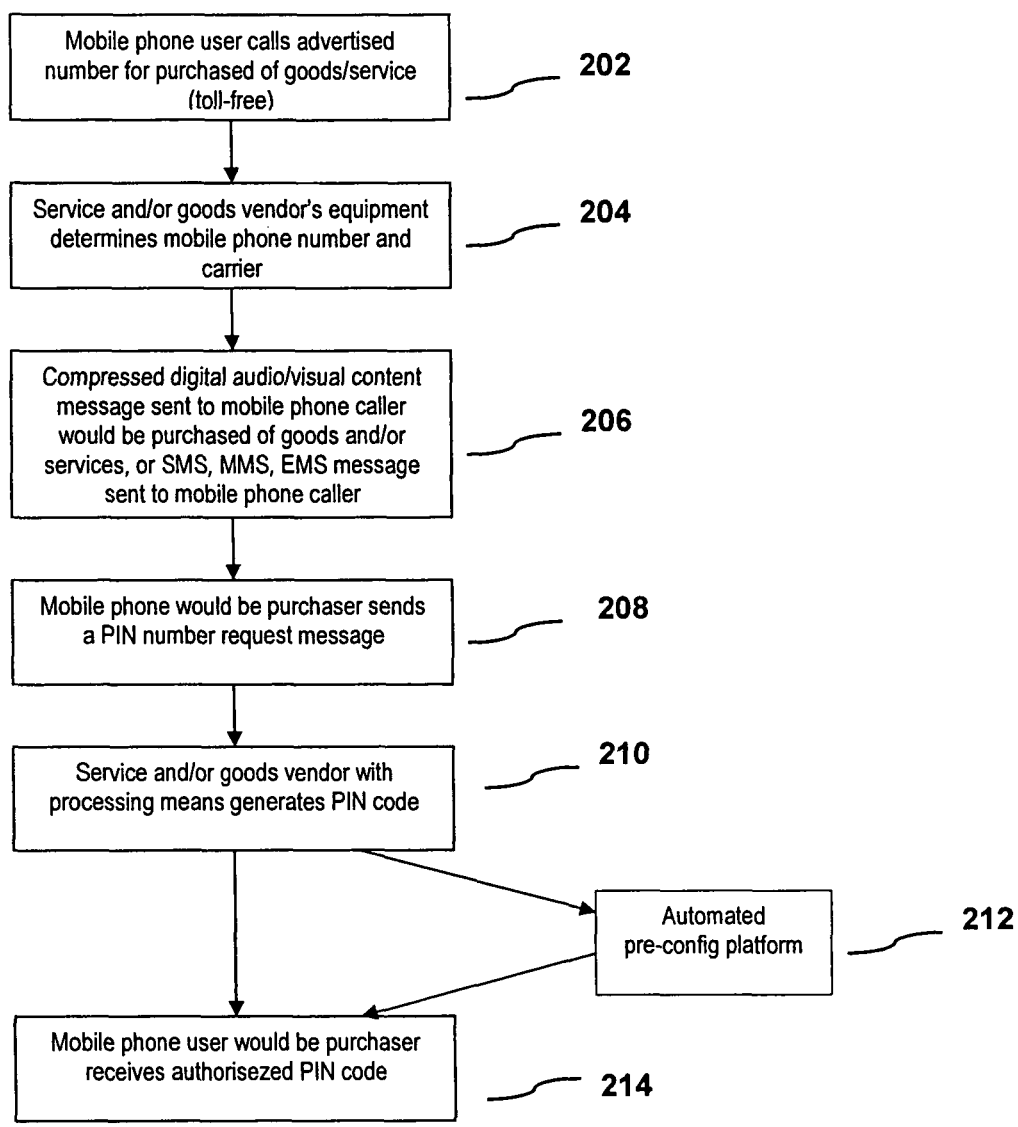
FIG. 20 illustrates by schematic flow diagram a mobile phone device goods and/or services for purchase method and system employing SMS text messages and/or MMS multimedia messages in accordance with the present invention.

FIG. 20 shows the accessory unit by itself, detached from the phone. The accessory unit can be detached from the phone similar to the detachment of other accessories such as the phone charger (usually by applying a rotating force rather than pulling straight out).

Figure 21:
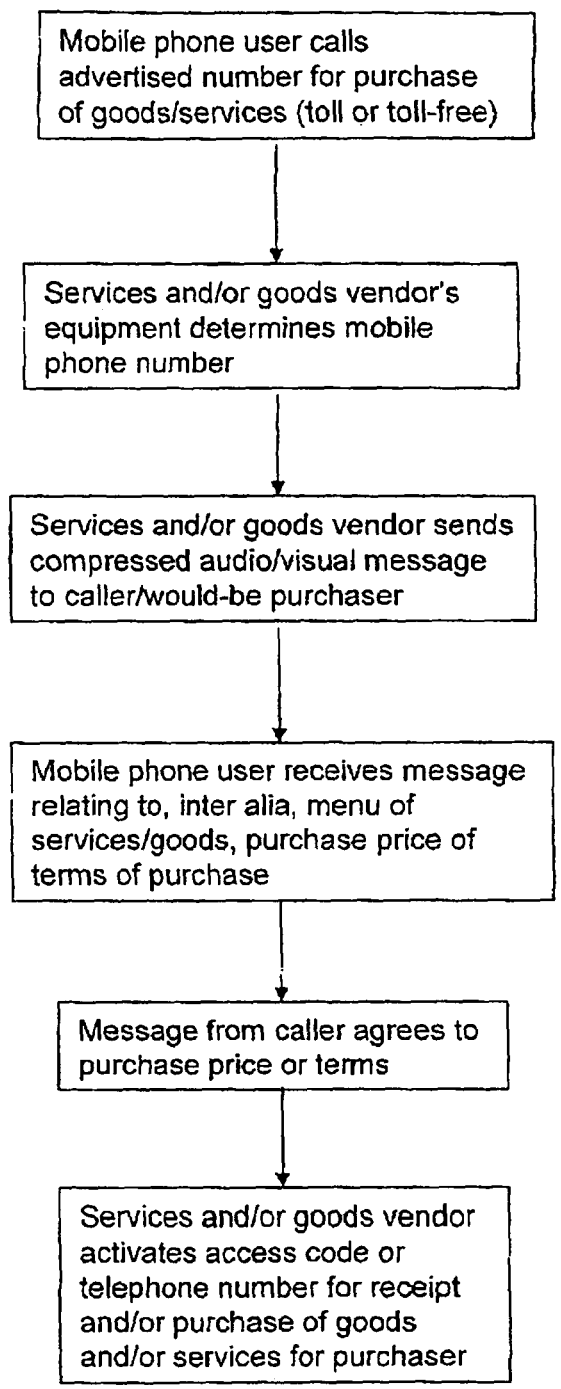
FIG. 21 illustrates by schematic flow diagram another embodiment of a mobile phone device goods and/or services for purchase method and system employing SMS text message and/or MMS multimedia messages in accordance with the present invention.

FIG. 21 shows the accessory unit uncovered. It is preferable to leave the body of the accessory unit closed. Preferably, there are no glued, soldered, or other permanent junctions inside, however, the high precision in the manufacture of some components could lead to their degradation after repeated assembly and disassembly.

The accessory-to-phone mounting is preferably designed to withstand repeated attachment and detachment without degradation of the snap-on mounting or connector. Although the phone body is also durable, it is preferable to attach and detach the accessory by shifting the snap-on lock upward manually during the attachment procedure (like to during detachment) to reduce wear of phone body near the latch.

The PCB (printed circuit board), located inside the accessory unit, is a multi-layer board which may have 0.2 mm gaps, two solder mask layers, and a silkscreen layer. The board preferably carries all the components, as illustrated in the schematics, excluding connectors and the speaker. Two outer layers of the board are signal layers; two internal layers are ground and 3.3V power plane. For convenience of the PCB assembly on modem plants, most packages are surface-mounted but not BGA. The board preferably does not contain any components requiring rare or custom-made equipment for their assembly.

The phone connector is preferably selected to maximize the firmness of the attachment, taking into account significant dimensions of the accessory unit. It should be mentioned that the connectors are unique to the type of the phone used (Ericsson R520 and compatible, like R320 and T28, in this example).

Factors in selection of the speaker for music playback included sound quality, which is primarily related to the speaker size, compactness, and weight of the speaker, as it is desirable that the speaker not be thicker and heavier than the phone itself. Depending on the available technology, there may be some tradeoff between good speaker quality and having a lightweight speaker. Speakers used in professional radio receivers-scanners may be a reasonable compromise since such speakers provide better than usual sound quality while possessing reasonable dimensions and weight. Other options include either sacrificing weight and dimensions to increase sound quality or using the new so-called "ceramic" speakers that are now appearing on the market. Mention should be made that although using these speakers could provide better quality, special modifications to the device would be required since these speakers could not be directly substituted in place of the standard ones.

It should also be noted that the bandwidth of the acoustic channel of the cellular phone which, in turn, is non-linearly compressed and transmitted over a digital channel of the phone, is much less than the bandwidth of the conventional landline phone and can deliver about 150 bytes per seconds data transfer rate. Conventional landline phone could deliver about 3700 bytes per seconds (V.34). Using better speakers in the phone would entail loading sound fragments of better quality (and, therefore, of bigger size), which would increase the time necessary to download a melody. The problem could be solved by using the GSM digital data channel directly which would provide a rate of about 1000 bytes per second for existing cellular networks and more than 7000 bytes per second for newly deployed systems. Alternative solutions include: having to tolerate an increase in the sound file or sound clip download time, downloading a melody from a local computer (the melody being delivered to the local computer by some alternate means), and redesigning the system to support conventional (landline) phones. In the latter case, due to the significant increase in the device body size, it may make more sense to use a stereo-effect (which is reasonable when the speakers of left and right channels have enough spatial separation).

Server Software Description

The server described herein performs the following functions: 1) startup, detection of the modem, detection of the melodies available; 2) answering incoming calls; and 3) servicing requests of user via DTMF codes.

Upon startup, the application requests the user to select which device to work with. Possible options include local test mode (0), modem on COM1 port (1), and modem on COM2 port (2).

If the local test mode is selected, all sounds will be played back using the sound card of the local computer and the computer keyboard will be used to control the server (via numeric buttons instead of DTMF keyboard). This mode is primarily for system testing purposes.

If one of the modems is selected, all sounds will be played back into the phone line using the selected modem, and the calling party's phone keyboard (DTMF tones) will be used to control the server. This is the normal mode of server operation.

The answering of incoming calls is performed differently in the local and the normal modes. In the local mode, the application waits for the 'R' key to be pressed to simulate remote party RING, while in the normal mode, the application waits for the RING signal from the modem. Then, in either mode, the application initializes the device used (sound card or modem). In the latter case, the modem goes "off-hook" and plays back the greeting message and the main menu (e.g., 0-End of the session, 1-Current, 3-Next, 4-Load).

Thereafter, the application goes into calling party servicing loop. Exit from the loop is possible upon reception of DTMF code '0' (or its simulation using the keyboard) or after the 30-seconds timeout if no reaction is detected from the remote user. Additionally, if working with the modem, the loop is exited when short beeps ("BUSY") condition is detected on the phone line. In the local mode, the 'X' key also leads to the immediate exit of the application.

The calling party servicing algorithm may work as follows: the software keeps the internal counter or number of the current sound clip. Initially, this number is "0" indicating that the clip is at the top of the list. Upon receiving the "1" command, the software plays back the clip with the current number. Upon receiving the "2" command, the software increases the number and plays back the melody, i.e., plays the next melody. Upon receiving the "3" command, the software decreases the number and plays back the melody, i.e., plays the previous melody. Upon receiving the "4" command, the melody download is simulated. For the obvious reason, this mode is not implemented yet. Upon receiving the "0" command, the application switches the modem "on-hook" releasing the phone line and returns to the incoming call waiting state. Upon encountering any other command, the application plays back a standard error message. At any moment, the server application can be aborted by pressing <Ctrl>C combination on the keyboard.

The server application keeps a log file (e.g., named "ProgramName_N.Log") where N is a port number. Therefore, if two instances of the application are started, one for the modem on COM1 and the other for the modem on COM2, two independent log files will be created. The log file contains brief information about user and server actions, times of events, their main features, for example, state of the modem or the sound card. These files are intended to be sent to the software developers in case of problems but can be used for other purposes as well, for example, to estimate the server load.

Due to the fact that the server application always plays a melody with the same quality as one would be able to hear through the conventional phone channel [monophonic, 8 kHz-sampling rate (signal bandwidth up to 3.7 kHz)], the sound quality of the played back clips may be low. This is not related in any way with the quality of sound that would be digitally transferred to the client's phone when the melody is selected since listening to the clips from server through the phone network could not deliver better quality than the phone channel itself. For this reason, sound files compressed in monophonic versus stereo form would be preferred since the rate of delivery would be faster, with no loss in playback quality from the phone. At the same time, when the clips are downloaded into the phone in digital form, significantly better quality could be delivered upon playback due to the perceptual compression; however, this would increase the transfer time.

The server software could also be implemented to track which clips were sent to which user or subscriber. This information could then be tracked and reported to different third parties such as the Copyright Office, or performing or artists rights organizations or societies.

Devices for Accessing Sound and Image Files

Electronic devices adapted to receive sound and image data, according to the present invention, may be provided with an attachment or built in mechanism for providing consumers with Internet based or Internet free access to a library of downloadable sound and/or image files. Consumers may be allowed to download free clips of a song, musical composition, or other sound recording or movie or other performance onto any of these devices for use as alerts.

After hearing or viewing a clip, the user, preferably by the push of a button, may transact a purchase of the full file associated with the clip, which may be downloaded to the device in its entirety, or delivered to the user's address on an independent medium such as records, cassette tapes, CDs, videotapes, and DVDs. Such practice is intended to encourage the sales of sound and image files by giving the user the opportunity to quickly make an impulse purchase.

A device for downloading and listening to music files, which is similar to a walkman type I-Pod™ device, but uses the same delivery method as described for the cellular phone comprises a speaker and/or an earphone set for listening to music with volume controls (such as Bose or Shure E5 universal earphones), and a server access element (which may be approximately the size of a credit card). Such a device may be used as a hand held portable music player, as well as a car radio or home system, and may include larger speakers for use as an audio system by businesses such as bars, restaurants and clubs.

In addition to features which allow a user to access the server library, the device may include other features common to conventional MP3 or other compression-type players and/or Apple I-Pod™ devices, or other devices for receiving and playing back compressed data. The server access element includes controls, which may be buttons, for accessing, browsing, and downloading files from the server to the device. Speed dial technology may be used for accessing the server. For browsing, a multi-task arrows button which allows the user to browse, listen to samples, and highlight specific selections may be provided.

The server access element may include a small LCD monitor (approximately 1".times.1.75") for text browsing the server library. A small microphone hole may also be included for allowing the user to browse the library using voice commands. The earphone set or speaker will enable the user listen to downloaded sound files.

Downloaded files may be stored on a device storage list for accessing at all times, or deleted. Thus, the user may access a library containing a large number of sound files, and browse, download, and listen to music, without the Internet or the need to plug into a computer. The consumer may be charged a fee for each download, or may be able to purchase actual items, for delivery to an address indicated by the user, such as records, cassette tapes and CD's through the access element. Free clips which the user can download may induce the consumer into purchasing the entire sound file from where the clip originated.

The device may also include a mechanism for allowing a user to store downloaded files on a medium, such as a card, independent of the device. To this end, the device may provide a slot into which a storage card may be inserted, such that when the device is full, files may be downloaded onto the card for emptying space on the device. A security mechanism may also be included to prevent intellectual property abuse, for example, by preventing users from playing copied files on other devices as described above. Such devices may further include a monitoring feature, which would allow performing rights organizations such as ASCAP and BMI to keep track of music publicly played by business such as bars, restaurants, and clubs for the purpose of paying out royalties.

Figure 18:
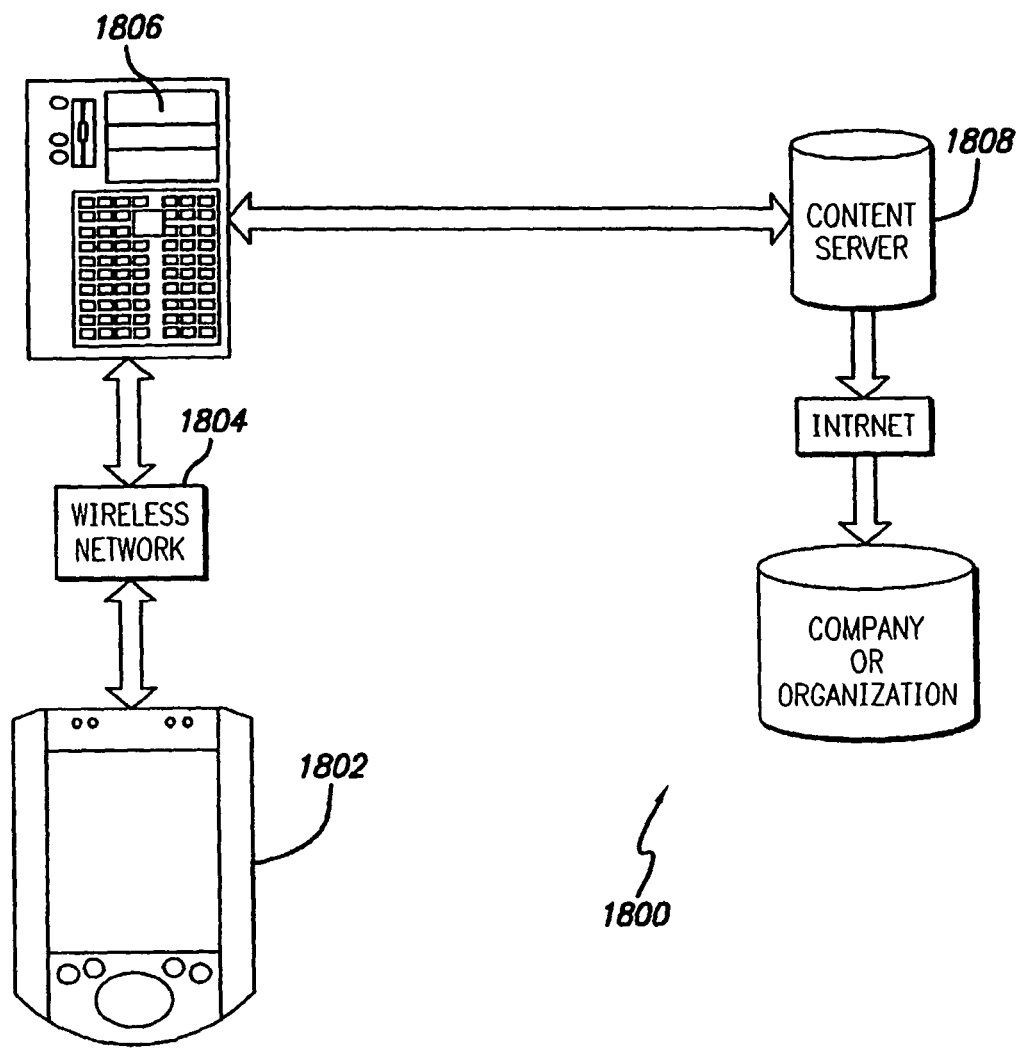
FIG. 18 is a schematic diagram for a media file monitoring system.

A schematic diagram for a media file monitoring system 1800, according to a preferred embodiment, is shown in FIG. 18, for use with an I-Pod™ type listening device 1802, wherein a consumer may purchase copyright registered media files which are downloaded wirelessly to the device 1802. The system 1800 includes an existing wireless network 1804 of 1.5G or more, a system monitoring server 1806, and a system content server 1808. The monitoring server 1806 monitors and counts every file delivered to the consumer device 1802, for monitoring and counting every file delivered to the device 1802. The server 1806 may track each individually titled file which may include information such as song title and artist name, purchase price, the consumer's name, and other identity information, time of delivery, and any other pertinent information. The server 1806 may also protect encrypted copyrighted files from illegal file copying. The content server 1808 stores copyrighted digital media content licensed from multiple entertainment companies. Thereafter, monitoring information, including statistics may be transmitted (e.g. through the Internet) to a company or organization. The system described may also apply to a viewer device for monitoring image files.

A portable laptop type viewer device, for accessing and viewing image and/or sound files, may comprise a wireless earphone set and/or speaker for listening to programs with volume controls, and a Personal Digital Assistant (PDA) with a monitor which may be approximately the size of a laptop computer. This device allows the user to access a server library containing a large number of movies, TV shows, cartoons, and other files, using either text or voice activation, without the need to plug into a computer or use of the Internet or other computer based wireless telecommunication system.

The files may be categorized and subcategorized by type of file (i.e. movies, TV shows) then by title or name of main actors. TV shows may further be classified by providing a description for each episode, similar to a description provided in a TV Guide™. Other categories and subcategories of classification may be provided to allow the user to identify the exact file he wishes to access.

The device allows the user to browse, download, preview, store and view his selections, (using text, voice, or button commands), wherein a fee may be charged by the provider for any or all of these options. The files may be made available as clips as well as in their entirety. The viewer device may include a folder containing previously downloaded image files that can be accessed at any time and deleted when desired. The library may be organized by categories such as type of show (i.e. movies, TV sitcoms), names of actors, show titles, sitcom description (e.g. as appearing in TV Guide™) etc.

Method of Advertising Using Delivery of Sound Clips

The method of delivering sound and image files, in accordance with the present invention, can further be utilized as an advertising tool. To this end, any of the above-described systems carrying the library of sound and/or image files, which include a website and non-Internet accessible holding unit, may be used to expose the user to sponsored advertising messages. For example, a user calling the holding unit may hear advertising while the system is accessing the library.

Other advertising opportunities may be provided by utilizing a phone or other electronic device using alerts according to the present invention. For example, the phone may ring with advertising gimmicks such as promotional messages. Such advertisement gimmicks may be played as default rings when no clip is selected for the ring. Additionally, a phone may be programmed to play, or transmit advertisements spontaneously. Clips containing advertising messages such as jingles may also be provided. Advertising messages may be tacked onto a user selected clip of a popular song or the like.

Method of Distributing Music and Audiovisual Works to Consumers

A method of distributing music and audiovisual works to consumers while accounting to copyright owners of the works comprises: (a) Making available on a website various selections of works in various categories for review by identifying information and offering a portion of the work for hearing or listening, each work being coded internally with identification to a copyright owner or its representative; (b) Allowing consumers to select the viewable or listenable portion of the work for data storage online or for downloading to the consumers' electronic devices at home wherein the downloaded file being encrypted to only play on the consumer's electronic devices first receiving the download; (c) Optionally tracking those consumers who received the download of the portion of the work and reporting to the copyright owners or their representatives information concerning the download; (d) Allowing a consumer to return to the website to purchase and download a complete copy of the copyrighted work previously sampled by the consumer; (e) Conducting an online purchasing transaction and charging the consumer for the download; (f) Downloading a complete copy of the copyrighted work to the consumer in an encrypted fashion so as to be playable only in the consumer's electronic device and not exchangeable with third parties; (g) Tracking those consumers who received the download of the copyrighted work and reporting to the copyright owner of their representatives information concerning the download; and (h) Paying the copyright owners or their representatives a portion of the money received from the consumers for their downloading of the copyrighted work.

The delivery system, according to the present invention will also integrate with future wireless technology, such as 3-G systems, as it becomes available, for offering enhanced capabilities for accessing, delivering, and using sound and image files.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

Telephonic Initiated Delivery of Goods and/or Services

Figure 19:
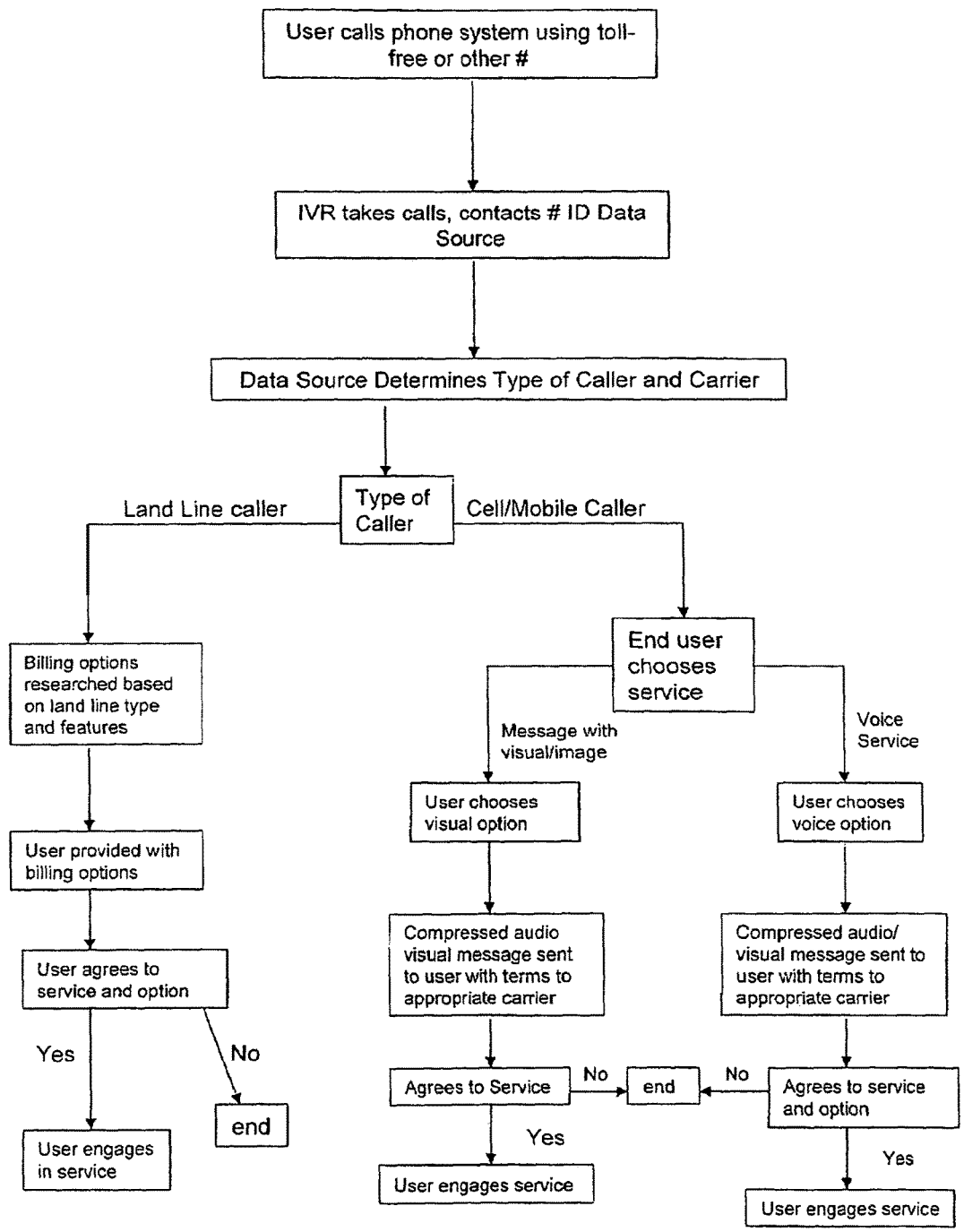
FIG. 19 illustrates in a schematic flow diagram a preferred embodiment of the present invention in the use of advertised telephone numbers to access remote service and goods providers.

Referring now to another aspect of the invention in FIG. 19, in its broadest sense the inventive method comprises the operations of a caller, or potential purchaser of goods or services (i.e. a "would-be purchaser"), dialing an advertised or provided telephone number, which in some instances may be a toll-free number, for example, 1-800-GET CHAT, or otherwise text or multimedia messaging an advertised number, from any sort of conventional fixed or land line or mobile phone device (102) with the intent of exploring the possibility of purchasing goods and/or services through the telephone number connection. As shown, preferably an IVR (104) receives calls and processes the identification of the number called from by way of an Identification Data Source (106), which determines the type of caller device (108), be it a land line or some type of mobile phone device, and the caller's carrier. Upon a determination that the caller is using a conventional land line, billing options are researched and considered based upon the land line type and available features (110). The caller-user is then provided with billing options (112) through the telephone call, such as by a prerecorded menu, or by way of a call back from the vendor or service provider, or representative thereof, or by some other type of contact. The user then agrees to the terms and/or billing options (114), and engages, for instance, in the use of offered services (116), such as a chat line, real music, etc., or does not agree and the process ends (118).

Upon a determination that the caller is using a mobile phone device, the caller is preferably provided the choice (120) of proceeding through a text message option (122) or voice option (124). The user is then forwarded a SMS text or MMS multimedia message (126) which can set forth, for instance, inter alia, available goods and/or services for purchase, terms or purchase, a fee schedule for goods and/or services for purchase, and a request for payment confirmation, or payment terms and the like. Upon acceptance of the contents of the text or multimedia message (128), for example, for certain services and/or goods for a set fee, the caller may be billed or charged a fee which then allows the caller access, for example, to the advertised telephone services and/or goods (130) for, say, a predetermined time period, and perhaps by way of a password or code, or PIN. If the caller does not agree to the terms, the process ends (132).

In some preferred embodiments, upon completion of the time period, the caller's mobile phone device is forwarded a second text or multimedia message requesting the caller's agreement or approval to be billed or charged a further fee for a second predetermined time period for the advertised telephone services and/or goods, or otherwise for a second time prescription period, which operation, of course, can be repeated for any number cycles.

In another preferred embodiment, the present invention provides a novel, convenient and efficient method for conducting a services and/or goods-vending business operation by exploiting the advantages of offering and selling goods and services through advertised telephone numbers, including toll-free calling, and SMS text and MMS multimedia messaging systems. This embodiment comprises the operations of a caller, or potential purchaser of goods or services (i.e. a "would-be purchaser"), dialing an advertised telephone number, such as a toll-free number, for example, "1-800-GET CHAT", or otherwise text or multimedia messaging an advertised number, from any sort of a land line or mobile phone device with the intent of exploring the possibility of purchasing goods and/or services through the telephone number connection. Upon a determination that the caller is using a mobile phone device, the caller is then forwarded an SMS text or MMS multimedia message which can set forth, inter alia, instructions for keying in entries on the phone to access chat lines, or information as to available goods and/or services for purchase, terms of purchase, a fee schedule for goods and/or services for purchase, and a request for payment confirmation, or payment terms. Upon acceptance of the contents of the text or multimedia message, for example, for certain services and/or goods for a set fee, the caller is billed or charged a fee which then allows the caller access to the advertised telephone services and/or goods for a predetermined time period, for example, by way of a password or code, or PIN. Upon completion of the time period, the caller's mobile phone device is forwarded a second text or multimedia message requesting the caller's agreement or approval to be billed or charged a further fee for a second predetermined time period for the advertised telephone services and/or goods, or otherwise for a second time prescription period, which operation, of course, can be repeated for any number cycles.

Alternatively, upon determination that the user is calling from a land line, or a mobile phone device which is not capable of receiving text or multimedia messages, a message may be played to the user, for example, with information as to telephone numbers useful to access services, such as chat lines, for example, "413-GET-CHAT". When the user then calls the advised number, the user's telephone number that s/he is calling from is recognized, and it is determined that the caller is a billable caller. The user may then be prompted to enter into an agreement for access to telephone services, such as payment of a set fee per month. As used herein, the terms "user" and "caller" are meant to include both users of traditional telephone land lines and users of cellular or mobile phone devices which may be capable of sending and receiving text or multimedia messages.

The Short Message Service, or SMS, protocol is well known and widely used for data transfer, or text transfer, through Short Message Service Centers (SMSC) between mobile devices and is a service provided by current GSM networks and other networks for sending short messages over a signaling channel. Using this system (and similar systems like it) an originating caller, or return caller, can dial a phone number to leave a short message, such as an alphanumeric message, on the display of a recipient mobile phone. A specific short message type handled by digital wireless networks enables receiving mobile devices to be remotely managed by a remote device management system supporting an array of different applications. Specific SMS messages and applications necessitate or require parameter change commands or specific software and applications to be applied to a digital wireless network and/or receiving mobile phone device, which are sometimes referred to as a "Configuration SMS".

Such configuration systems may be used, for example, in methods to remotely manage GSM or GPRS-connected mobile devices from a device management application by using the SMS as a content vehicle to carry configuration parameters to be applied as contemplated to a device. SMS may also be used as a form of trigger to which a device responds by launching a connection to a management server to perform management orientated synchronization activities, such as inventory, configuration and software download. As an example of such usage, see United States published patent application No.: 2003/0236981. Any of such applications or modes of use of SMS are contemplated for use with present inventive method and system.

The Multimedia Messaging Service ("MMS"), as used in mobile communications networks, denotes the latest approach for transmitting messages having a multimedia content and is oftentimes described as the most recent extension of SMS and EMS messaging protocol (as described below). MMS messaging allows messaging between different mobile users and/or between mobile users and the Internet via an e-mail address. Unlike SMS messaging, MMS can include not just text, but also sounds, images, video, animation and graphics. Formats that can be embedded with MMS include text formatted with fonts, colors, and the like, images (JPEG, GIF format and animator GLF), audio, (MP3, WAV, AMR, MIDI) and video (WPEG and Real Media) and various combinations thereof. Images may be downloaded from WAP sites, for example, as selected from a menu within a phone or may be, for instance, photos from a built-in camera in the phone which are now commonplace, with MMS capable phones first appearing in 2002.

The present invention also contemplates the employ of the Enhanced Messaging Service "(EMS"), a type of halfway service between SMS and MMS which enables some features of MMS capability, such as text, some simple pictures and audio, and some simple graphics and animation.

MMS is a store and forward messaging service which allows mobile subscribers the ability to exchange multimedia messages with other mobile subscribers, or the ability to send multimedia content in a single message and to send the message to multiple recipients, which provides an ideal messaging system for use with the present invention.

A MMS message can be created, for example, by using a built-in or accessory camera, or it may be composed of sound and/or images previously stored in the mobile phone, such as downloaded from an Internet website. Without a phone being turned on, an MMS message can be stored and forwarded to a recipient as soon as the phone is turned on. Additionally, one or a multiple of MMS messages may be stored in a user's handset and reviewed or forwarded at a later date. Further, unlike an SMS message which is limited to 160 bytes, an MMS message is a single entity as opposed to a collection of attachments and has no size limit with the possibility of being many Kbytes in size. Each MMS message contains a number of pages with each page containing an image with text and/or audio or animation, such as a PowerPoint presentation, which can be sent in a single message and downloaded in a user's phone device (or any phone device or other device as desired) through a WAP site.

Any conventional, or non-conventional telephone or mobile phone device, or equivalent, is contemplated for use in the inventive method and system, including cell phones from any catalog of the many mobile phone device vendors, some of which have the capability and appearance of a personal computer, or which are generally multifunctional. The inventive method is also contemplated for use with any conventional land line and mobile/wireless communication network.

The vending and purchase of any goods and services which can be bought and sold over the telephone is contemplated in conjunction with the present invention. For example, as used herein the term "telephone services" is defined as any service that can be conducted over the telephone lines, such as a dedicated or public telephone system or a wireless telephone system or operation, with some non-limiting examples including, for illustration purposes only, dating services, match making services, adult content services, technical support or know-how services, language learning, tutoring or other educational services involving a virtually limitless array of subject matter and topics. Further illustrative examples of services offered, bought and sold via the present inventive method and system can include any type of professional services, such as legal services, medical services, psychiatric or psychological services, marriage counseling services and counseling services in general, which can be advantageously provided by the invention in an on-the-spot emergency basis if need be. Additional examples of services include gaming, gambling, and handicapping services, architectural, business, and accounting services, and really anything or any type of information that can be sold on a time basis for a fee.

Examples of goods and/or related services which may be purchased, such as time-purchased, via the present invention, include, without limitation, ringtones, wallpaper for phone displays, games, tolls, fines, music, movies, and computer software and all executable products, financial products, application products, design and engineering products, drawing and architectural products and any and all search products including personal histories, genealogies, criminal histories, automotive and product histories, business histories, credit histories and the like. In short, a description of services and goods time-purchased in accordance with the present invention can only be limited by one's imagination.

Turning now to FIG. 20, there is depicted a flow diagram of another preferred embodiment of the inventive method and system with various optional components and features, and which is highly flexible and alterable to any desired or contemplated scheme or business plan without departing from the scope of the invention. In FIG. 20, a mobile phone device, e.g. cell phone, user and would-be purchaser (202) places a call to a number which is one advertised or made available for purchase of various services and/or products. The number called may be a toll-free number. The call is received by a service vendor's equipment (204), and the caller's mobile telephone number is determined. Next, the caller, would-be purchaser, is forwarded one or more, or a combination of, a compressed digital audio/video message, an SMS text message or EMS or MMS multimedia message (206) which can take any of several forms. For example, in one embodiment, the caller may be sent a specific text message which offers a way to bill the cost or fee of the desired purchased services and/or products to their cell phone service. In another embodiment, the caller may be offered via a text or multimedia message routed to the cell phone number a menu choice number for the cell phone user to actuate with an instructional prompt as to fee payment methods. After receiving specific use instructions from any of such embodiments, as for example, prompted on the vendor's configured platform, the cell phone caller can then send a "pin number request" message (208) which is received and processed by a Short Message Service Center (SMSC) (210). Optionally, the caller may make a toll-free call to request a PIN code for access to services and/or goods. Next, the SMSC (210), after receipt and processing of the request message (208), through, for example, automated means for preconfigured platform (212), or toll-free call as the case may be, forwards the cell phone user an SMS message containing an authorized PIN code (214), or perhaps one or a plurality of text or multimedia messages, such as instructional and/or warranty or terms of use messages in concatenated form, in conjunction with an authorized PIN code. An example message can take the form of the following sequence: [0042] i) "Thank you for joining our service!" [0043] ii) "Remember, your PIN code is good for only XX minutes worth of access to our service and is good for a period of XX hours". [0044] iii) "Here is your PIN Code, XXX. Call the number you originally called and enter your PIN code as requested. Please allow for X minutes for activation.

The activated PIN code can then be communicated to the vendor's operation for verification purposes, for example, preferably through a dedicated IP address. Upon receipt, the vendor can then store the activated PIN code for database retrieval, read and verify for say, a period of XX hours. After the purchased prescribed time period has elapsed, the vendor can then delete the PIN Code, for example, by time lapse automatic means, from an approved list for reissue and reactivation for future timed service purchases.

As can be seen, many other options and features may be implemented with this preferred embodiment, such as, for example, and without limitation, the cycle of caller purchase of timed vendor provided services compressed rich media via text or multimedia messaging being repeated a plurality of times, a feature limiting service(s) purchases to set maximum fee of services purchased per time period, such as a maximum dollar amount of timed services purchased per month, or a social security number verification and/or age verification for the timed purchase of certain services. Additionally, the issuance of PIN codes may be determined by algorithm or an equivalent random generator such that assigned patterns of numbers can be avoided in an effort to thwart fraudulent service usage.

A wide array of additional embodiments of the present invention is also contemplated, such as, for example, and without limitation, the method and system illustrated in FIG. 21, wherein a PIN code is not employed or required. In such embodiments, upon receiving compressed audio/visual, text or multimedia messages and agreeing to terms, such as billing charges and the like, a telephone number for the receipt of services (or goods as desired), such as selected rich media in the form of music and/or video and the like will be activated by the inventive method and system for a prescribed amount of time, and reactivated for additional prescribed amounts of time as the case may be.

In other embodiments, a telephone call from either a land line or mobile phone, such as a toll-free call, may be placed to a service provider or a vendor of services and goods, and upon agreement to terms of purchase, a telephone number or code for receipt of services and/or goods may be provided, such as on a timed basis.

Figure 22:
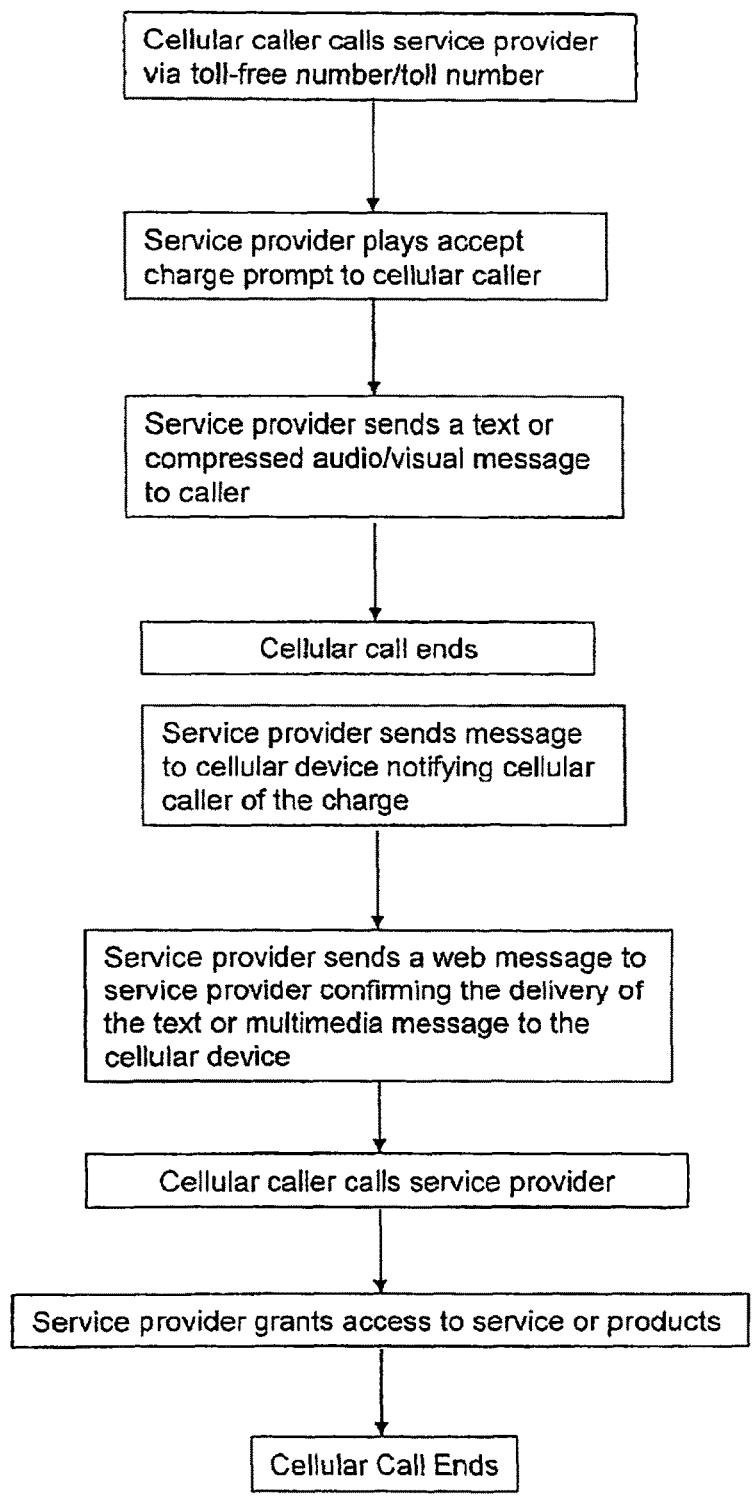
FIG. 22 illustrates by schematic flow diagram another embodiment of a mobile phone device goods and/or services for purchase method and system in accordance with the present invention.

In another example shown in FIG. 22, in accordance with the invention, a cellular caller calls a service provider with a contemplated purchase of goods and/or services. The service provider in response plays an accept charge prompt to the cellular caller, which may be, for example, an automated message. The service provider then sends an SMS message to a SMS Service Center (SMSC) and the cellular call ends. Next, the SMSC sends a text or multimedia message to the mobile phone device of the cellular caller notifying the cellular caller of charges for goods and/or services. The SMSC also sends a Web message to the service provider confirming the delivery of the text or multimedia message to the caller's mobile phone device. The caller then calls the service provider, again, preferably by way of a toll free number, and depending upon, for example, whether charges were accepted, the service provider grants the caller access to service(s) and/or product(s) such as compressed rich media in the form of music or videos and the like.

Figure 23:
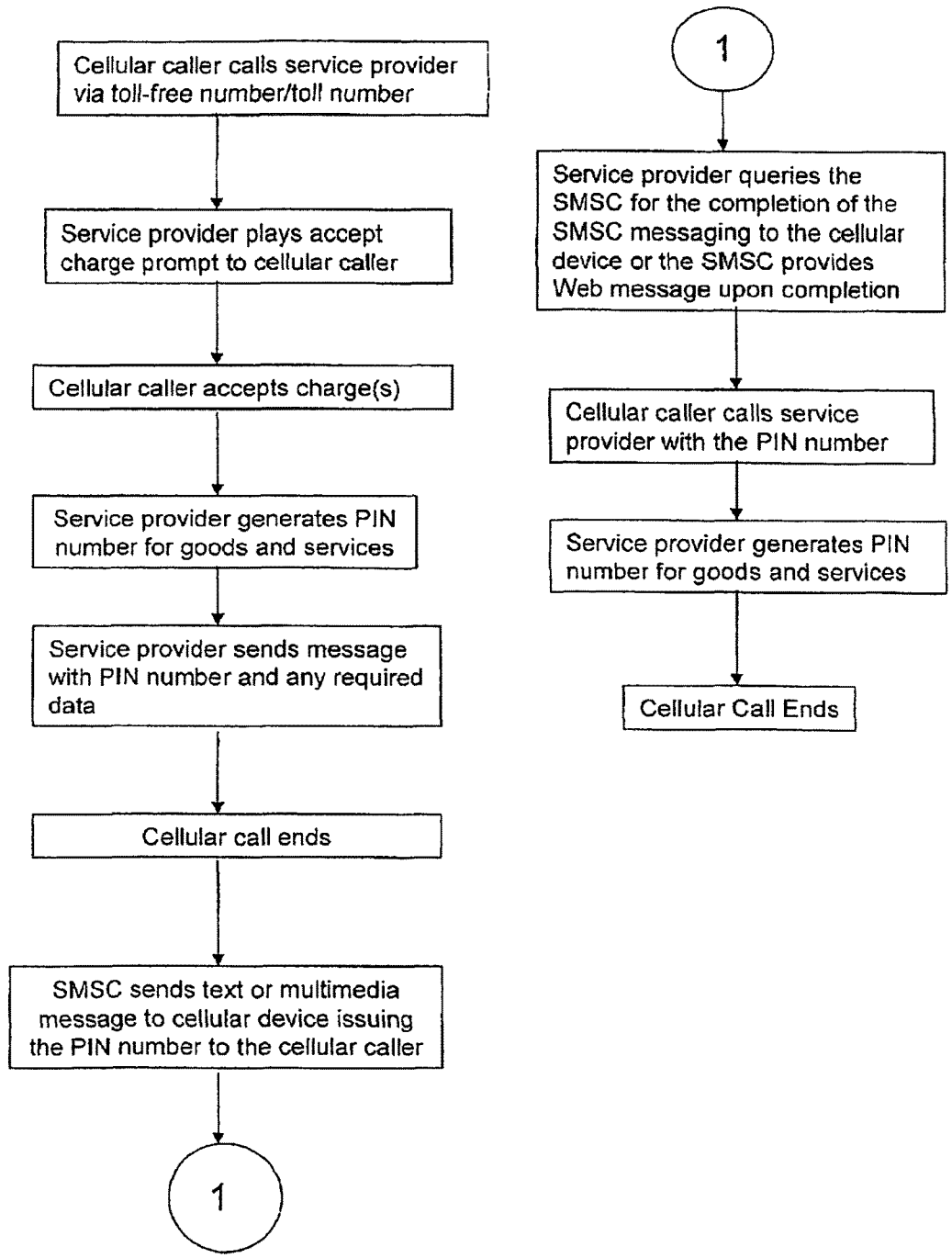
FIG. 23 illustrates by schematic flow diagram another embodiment of the present invention.

In FIG. 23, another exemplified embodiment of the invention is provided, in which a cellular caller calls a service provider with the contemplated purchase of goods and/or services, for example, by way of a toll-free number, and in response the service provider plays an accept charge prompt to the cellular caller who accepts the charge(s). The service provider then generates a PIN number for access to goods and/or services and sends an SMS message to an SMSC and the generated PIN number and any or all other required data. The SMSC next sends an SMS message to the cellular caller in which the PIN number is issued to the caller. Optionally, the service provider may query the SMSC for completion of the SMSC messaging to the mobile phone device of the cellular caller, or the SMSC may provide a Web message to the service provider confirming the SMS message to the caller and issuance of the PIN number. The cellular caller may then call the service provider and provide the issued PIN number for access to goods and/or services as desired or contemplated.

Figure 24:
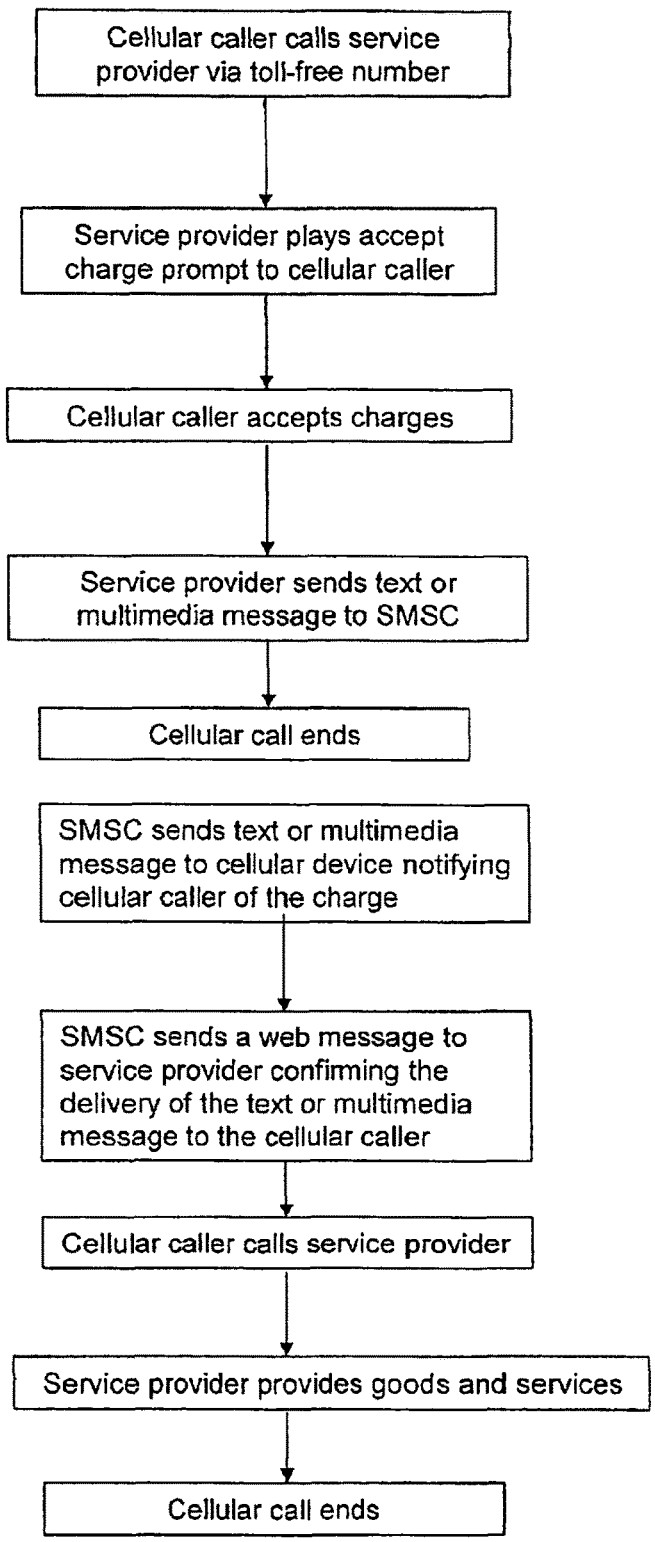
FIG. 24 illustrates by schematic flow diagram another embodiment of the present invention.

Next, in FIG. 24, an additional embodiment of the invention is schematically portrayed, in which a cellular caller, would-be purchaser, first calls a service provider, again, for instance, by way of an advertised number, such as a toll-free call, and in response the service provider plays an accept charge prompt to the cellular caller who either accepts or does not accept the proposed charges and/or terms of purchase for contemplated goods and/or services. Upon acceptance, the service provider sends an SMS message to the SMSC, which sends an SMS message to the mobile phone device of the cellular caller notifying the caller of the charge(s). Optionally, the SMSC can send a Web message to the service provider confirming the delivery of the SMS message to the mobile phone device of the cellular caller. The cellular caller may then call the service provider to gain access to contemplated goods and/or services for the receipt for example, of compressed rich media.

Figure 25:
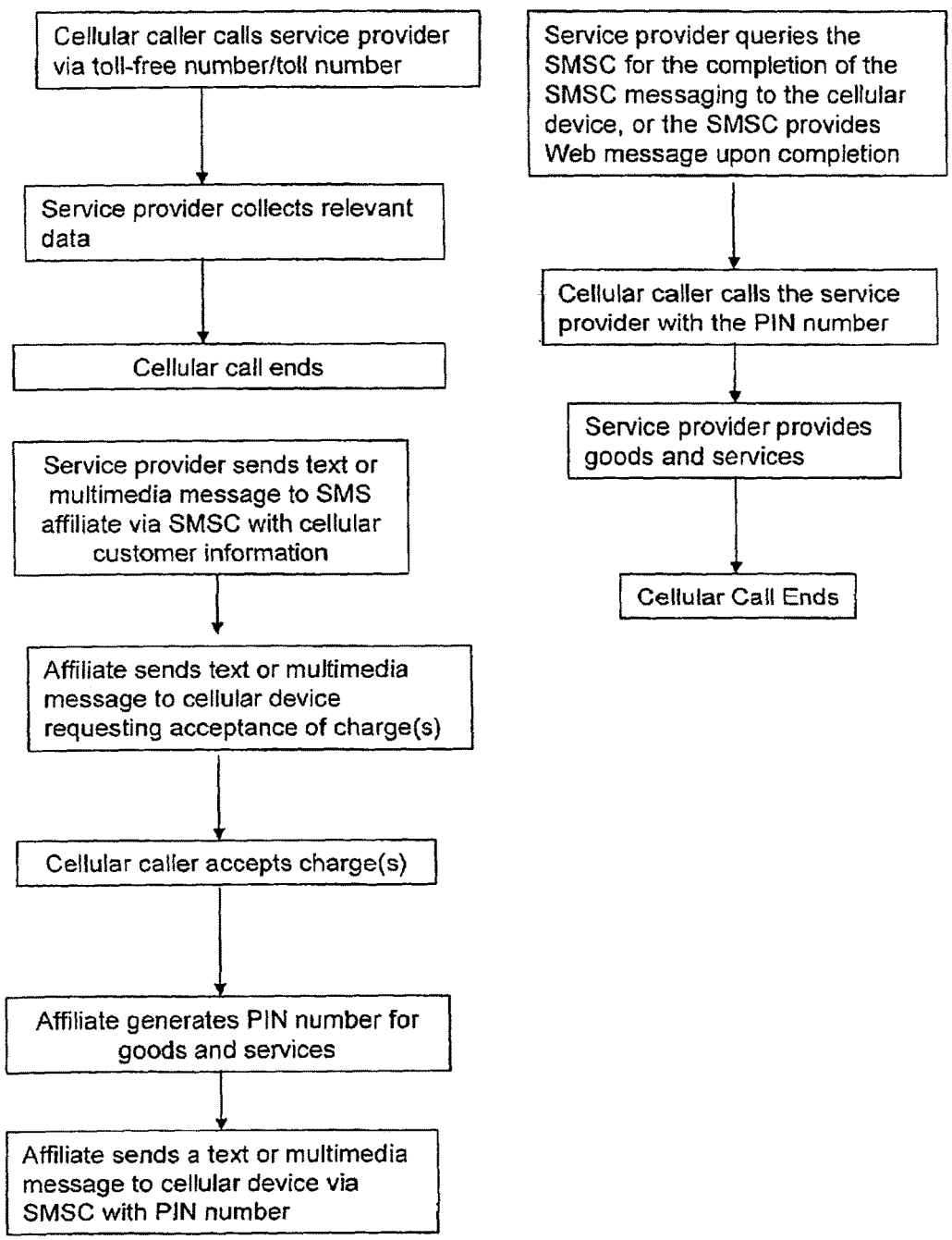
FIG. 25 illustrates by schematic flow diagram another embodiment of the present invention.

In the schematically portrayed embodiment of FIG. 25, a cellular caller or would-be purchaser calls a service provider with the contemplated purchase of goods and/or services, for instance, by way of a toll-free call, and in response, the service provider obtains from the caller relevant and/or requested information, such as identification, electronic purchase information and the like. The service provider then sends an SMS message to an SMS affiliate via an SMSC with the cellular customer information as provided. The affiliate sends an SMS message to the mobile phone device of the cellular caller requesting acceptance of the proposed charge(s) and/or purchase terms. Upon acceptance of same by the cellular caller the affiliate generates a PIN number for purchase or access of the caller to contemplated goods and/or services, and sends an SMS message to the mobile phone device of the cellular caller via an SMSC presenting the PIN number.

Optionally, the service provider may query the SMSC for completion of the SMSC messaging to the mobile phone device of the cellular caller, or a Web message may be provided to the service provider by the SMSC upon completion. The cellular caller then calls the service provider and presents the issued PIN number for access to contemplated goods and/or services, which may be digitally compressed rich media in the form of music, movies and/or videos and the like.

It is also contemplated that the present invention be used in conjunction with any and all conventional SMS, EMS and MMS methodology and technology, such as, for example, services which allow for sending and receiving text and multimedia messages to and from an application or a person's e-mail, and the like.

Method for Video/Audio Files Transmission Over 3G Wireless Network Independent of Internet Connection A further embodiment offers method of wirelessly delivering over the air one or more digital audio and/or visual media files like music, movies, tv shows, animation, etc from one or more servers to one or more 3G video/audio enabled electronic devices without a wireless internet connection.

Video Service is a key factor of wireless network progress and is of the primary drivers of wireless networks today. 3G technologies offer an endless offering of video services that will greatly expand the range of communication capabilities. Video-conferencing, watching video clips, television clips multimedia dating opportunities, movies-on-demand and personal video downloads are just a few examples. Other Services include network or cable TV channels, connecting to video cameras in private or public places, etc.

A variety of video-driven services can be implemented to explore new revenue schemes in mobile services, such as mobile TV news, mobile multimedia entertainment, live sports events, real-time video surveillance, traffic monitoring, and mobile e-learning, etc.

Over the past several years consumers prefer to more easily move content from not only server to device, but from device to device. In this dynamic ever changing environment, devices like PC computers, laptops, notebooks and netbooks, must be able to easily exchange the content that is stored or viewed on them to alternative devices like cell phones or other mobile devices at different times to and from potentially multiple consumers.

There is a challenge in the market place in providing content and services in an acceptable format to a wide variety of multimedia terminals. The capabilities of these terminals differ in data format, computing power, network access, and supported network bandwidth. So it's necessary to bridge the gap between 3G mobile phones and prevalent popular video IP applications such as IP TV, YouTube, Skype, viewed most often on an end user's PC computer, laptop computer, notebook computer etc.

In the 3G mobile video market today the industry standard for communications between a mobile video-enabled handset is the 3G-324M umbrella standard and 3G-324M umbrella protocol for video telephony in 3G mobile networks. At the same time, computer communications and multimedia networks are generally packet based protocols and use packet-switched connections or PC clients for live video delivery and playback using multimedia Internet standards such as SIP or H323.

In the enclosed invention, to solve this interworking problem and to transmit signals between a 3G circuit switched network and a packet based network, a gateway is employed at the connection point of the networks to convert the signals between the different formats of the networks. For video signals the gateway terminates the 3G-324M protocol toward the mobile network, terminates the RTP voice/video and the SIP/H.323 signals toward the IP network, and transcodes the video signals between the formats of the different networks.

There are numerous commercially available 3G video gateway solutions in the market provided by the world-leading suppliers in telecommunications, such as Ericsson, AT&T, Dialogic Corporation, etc. All these solutions have been developed for 3G mobile operators or for large content providers and require installation of expensive equipment, serious system reconfiguration and additional special fixed wire IP connection with 3G carrier's Mobile Switching Center. The disclosed embodiment solves this challenge for the 3G mobile end user with an easy and efficient way to view and listen to digital media content while simultaneously communicating on a voice call without having to an end the call. The disclosed invention also allows 3G mobile users to use their PC computer, wireless laptop, notebook, or netbook for the audio or video phone calls without the need for an internet connection.

The embodiment presents a 3G Wireless Bridge which provides real-time wireless bidirectional interoperability and protocol conversion between 3G Circuit Switching wireless video communication network and Packet Switching Multimedia Networks. It makes it possible to set up and support wireless bidirectional video/audio telephony and video streaming sessions between 3G mobile video phones and any Multimedia device without costly reconfiguration of existing systems and without depending on an access to the Internet. It also allows device users the ability to share live video or stored content over a 3G connection in real time, simultaneously with an ongoing circuit switched call, thus enhancing and enriching the end-user's voice communication and not forcing the device user to end the switched call in order to either receive or send audio or visual data.

The 3G Wireless Bridge comprises of a portable Wireless Bridge Device and basic Media Server software that doesn't need any specific computational resources and can reside as a client software on a regular PC computer, notebook computer, laptop computer or netbook. The Wireless. Bridge Device may be connected to the PC via any digital interface having enough bandwidth, such as Ethernet, USB, Wi-Fi, etc. Also the Device may be embedded into a PC as an internal element or micro chip. As a result, the 3G Wireless Bridge will extend a PC's capability transforming any regular PC, laptop or notebook computer equipped with the Wireless Bridge Device into a 3G enabled communication device, allowing user to place and receive 3G video and/or audio calls from any PC, laptop, or notebook computer, independent of an Internet connection.

Figure 26:
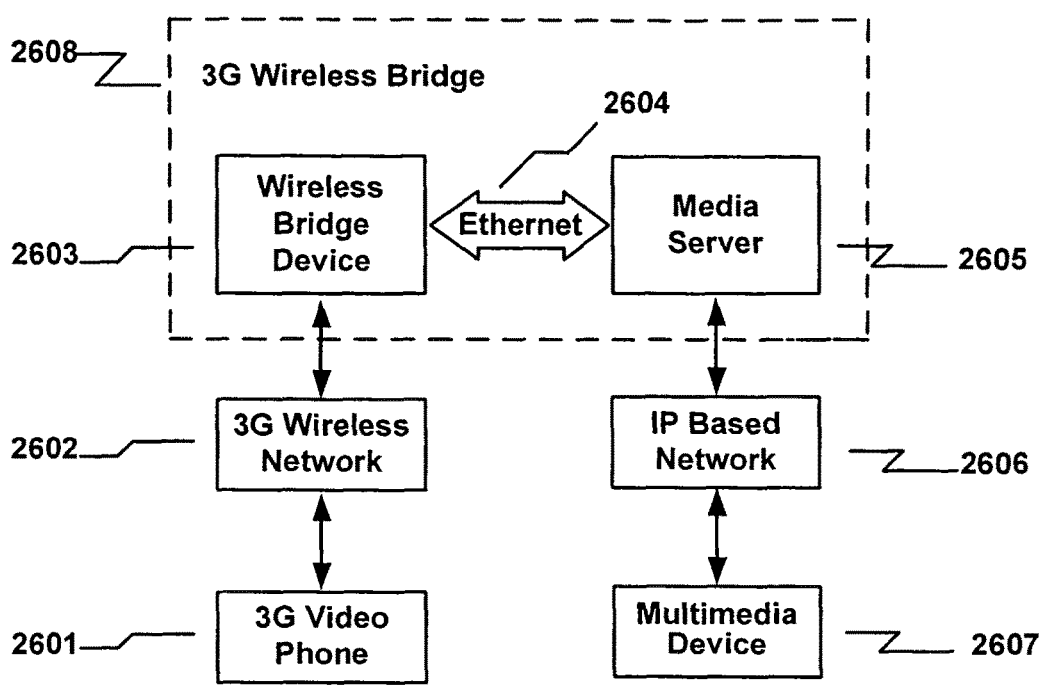
FIG. 26 illustrates a schematic diagram of a 3G wireless video/audio file transmission system for delivery of digital media content to a 3G wireless device without an internet connection.

FIG. 26 represents a schematic diagram illustrating the basic components of a 3G wireless video/audio file transmission system between a cellular 3G Video Phone 2601 having wireless 3G connection with 3G Wireless Network 2602 and a 3G Wireless Bridge 2608 which comprises of Wireless Bridge Device 2603 and Media Server 2605 connected to each other via Ethernet 2604. Media Server 2605 may be connected in turn with any Multimedia Device 2607 having interface with Packet Switching Network (PSN) 2606. The Multimedia Device 2607 can be either a personal computer (PC) or a stand-alone device running multimedia applications, such as smart phone, netbook, video player, etc.

The Wireless Bridge Device 2603 is an element that is able to establish wireless circuit switching connection with 3G Video Phone 2601 through 3G Wireless Network 2602 and also provides real-time bidirectional interoperability between 3G Video Phone 2601 and Media Server 2605. The Device 2603 performs real-time bidirectional signal transcoding between 3G-324M cellular video/audio format that is used in 3G Video Phone 2601 and 3G-324M video/audio over RTP interface format of Media Server 2605.

Figure 27:
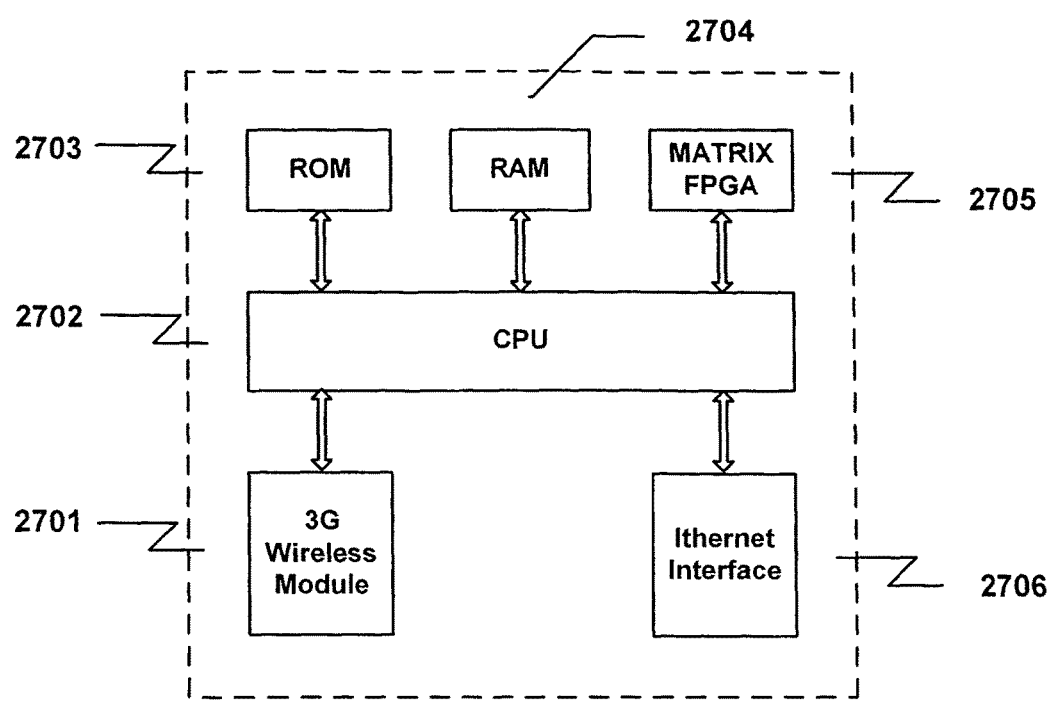
FIG. 27 illustrates a schematic diagram of a Wireless Bridge Device.

A schematic diagram of the Wireless Bridge Device 2603 is shown in FIG. 27. The Device includes the following main blocks: a 3G Wireless Module element 2701, Central Processing Unit (CPU) elements 2702, a Read-Only Memory (ROM) element 2703, a Random Access Memory (RAM) element 2704, a Matrix Field-Programmable Gate Array (Matrix FPGA) element 2705 and an Ethernet Interface element 2706.

The CPU 2702 executes the device firmware, provides control for all other blocks and performs the computational tasks for the device. The tasks performed by the CPU 2702 include control of the device's elements, interworking with Matrix FPGA element 2705 for video/audi signal transcoding, interworking with the Media Server 2605 through the Ethernet interface and performing of other auxiliary functions. The Read-Only Memory (ROM) element 2703 contains the device firmware. The RAM element 2704 holds buffers for data fragments and processor service procedures. The Matrix FPGA element 2705 provides real-time bidirectional video signal transcoding of 3G-324M cellular video format and 3G-324M video/audio over RTP format by dividing/assembling the 3G-324M stream into a sequence of RTP packets. The 3G Wireless Module element 2701 simulate an operation of regular 3G video phone and support wireless bidirectional 3G video/audio/data connection with 3G Video Phone 2601. It also provides real-time bidirectional 3G-324M interoperability with CPU 2702.

The software of Media Server 2605 performs real-time bidirectional video/audio over RTP format transcoding into multimedia Packet Switching Network format. It interfaces 3G-324M over RTP protocol of Wireless Bridge Device 2603 with tradition H.323 plus SIP-based protocols that implemented in Multimedia Device 2607. Transmission of video signals within packet based networks is performed using the session initiation protocol (SIP) or H.323 protocol, in which separate UDP (user datagram protocol) connections are used for video, voice and control signals. The control signals are transmitted using SIP or H.323 over UDP/IP, while the video, voice and/or other media signals are transmitted over the real time protocol (RTP), over UDP/IP.

Figure 28:
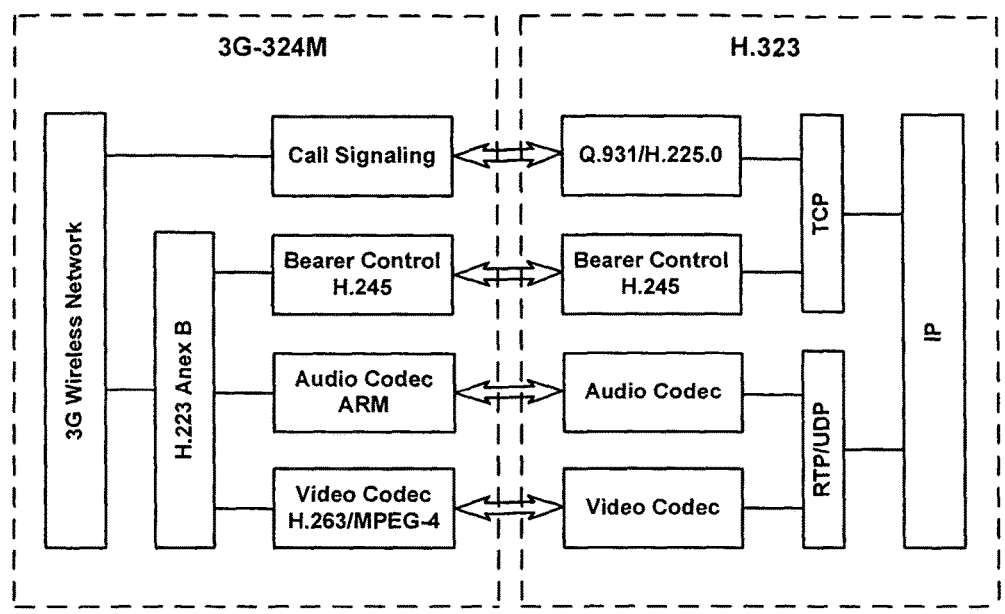
FIG. 28 illustrates a schematic block diagram of H.323 and 3G-324M Protocol Interworking Function.

An interworking function of Media Server 2605 for H.323 and 3G-324M protocols shown in FIG. 28. H.323 is based on Q.931 for call setup and H.245 for call control. 3GPP defines TS.26.112 for call setup procedure in UMTS. The interworking software maps the TS-26.112 call setup into Q.931H.323 calls and vise versa. For call control mapping, since both protocols uses H.245 the mapping is regular, however the H.245 in 3G-324M is address-less. For codec's mapping needs, to assure operation with various H.323 devices supporting codecs such as H.261 and H.263, while 3G-324M uses MPEG-4 as standard de-facto, a transcoding function may also be required.

Figure 29:
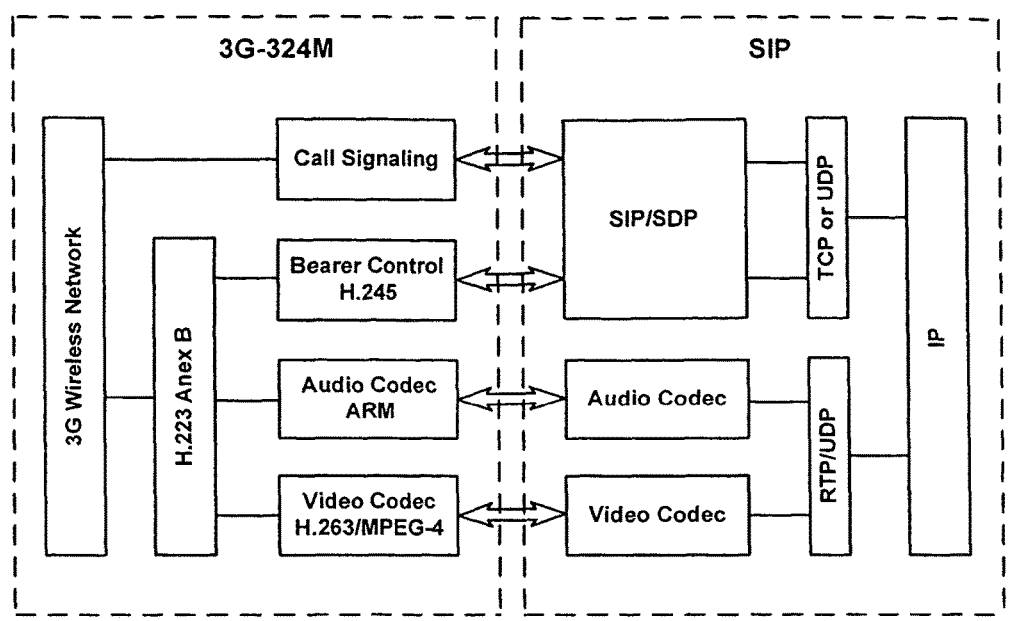
FIG. 29 illustrates a schematic block diagram of SIP and 3G-324M Protocol Interworking Function.

An interworking function of Media Server 2605 for SIP and 3G-324M protocols is shown in FIG. 29. SIP is based on Session Description Protocol (SDP) for both call setup and call control. Hence both TS 26.112 and 3G-324M H.245 call control should be mapped into Session Description Protocol messages and vise versa. For codecs' mapping needs, SIP terminals are similar to H.323 and hence similar transcoding function may also be required.

The basic software of Media Server 2605 doesn't need any specific computational resources and can be resided as client software on a regular PC, notebook and even netbook. The Device 2603 may be connected to the PC via any digital interface having enough bandwidth, such as Ethernet, USB, Wi-Fi, etc. Also the Device 2603 may be embedded into a PC as an internal element. It extends PC's capabilities and transforms any PC equipped with the Wireless Bridge Device 2603 into a 3G handset enable to place and receive 3G video calls from any 3G handset without having access to the Internet.

The basic software of the Media Server 2605 could be extended for advanced 3G Services allowing service providers greater flexibility for multimedia content adaptation and delivery over 3G wireless networks, including multiplayer gaming, watching film, television and video media clips, multimedia dating, video-on-demand, etc. Other Services include TV channels, connecting to cameras in private or public places, a reality TV shows.

To run an advanced 3G Services the Media Server 2605 acts as an aggregator of multimedia information such as video, audio, pictures, books, etc. For these applications Media Server's computer should be a high-spec machine with increased RAM and/or hard drive technologies such as RAID arrays.

As will be further appreciated by those persons skilled in the art, the present inventive method and system, inclusive of one or more embodiments of its operation through various software and hardware systems, affords distinct business advantages not previously available to vendors relating to the sale of services and products. In this aspect, the present invention provides novel methods of conducting an array of business functions comprising, inter alia, designing, manufacturing, using, marketing, selling, licensing, and/or leasing the inventive subject matter, developing business good will, developing valuable trademark rights in conjunction with use thereof, and further in providing novel methods of business entity formation, such as partnerships, corporations, joint ventures and other collaborations for the purpose of exploiting the business of the inventive subject matter.

While this invention has been described in connection with what is presently considered to be the most practical and preferred embodiments, it is to be understood that the invention is not to be limited in any way to the disclosed embodiments as such are merely set forth for illustrative purposes. The present inventive method and system, and methods for conducting business in general, are intended to cover an array of various modification and equivalent arrangements, all of which are contemplated for inclusion within the scope and spirit of the disclosure and appended claims.

What is claimed is:

1. A method of delivering an audio and/or visual file wirelessly from one or more servers to a cellular phone over an analog cellular phone line, said analog cellular phone line providing only a voice channel, the method comprising:

contacting a service provider of said audio and/or visual file by a dialed telephone number over the analog cellular phone line, the service provider recording a contact information associated with the cellular phone;

selecting through an interface element of the cellular phone the audio and/or visual file for downloading from the service provider;

the service provider converting the selected audio and/or visual file from a digital state to a sequence of sound modulates for an analog transmission;

transferring codes of these sound modulates to a voice adapter that converts the codes to a plurality of actual sounds;

transferring the plurality of actual sounds over the analog cellular phone line to the cellular phone;

said cellular phone comprising:
- a digital signal processor; said digital signal processor converting the plurality of actual sounds from an analog state to a digital state as initially stored by the service provider;
- a player for playing one or more selected digital audio and/or visual files received wirelessly from a server by way of said digital signal processor, wherein said audio and/or visual files comprise audio and/or visual content, one or more full or partial master recordings of songs, musical scores or musical compositions or other audio recording or segments thereof, videos or video segments or other visual recording, movies or movie segments, film or film segments, one or more image clips, television shows, human voice, personal recordings, cartoons, animation, audio and/or visual advertising content or combinations thereof; and
- a receiver which receives the plurality of actual sounds representing the codes of the sequence of sound modulates in analog form from said one or more servers.

2. The method of claim 1 further comprising storing the audio and/or visual file on the cellular phone.

3. The method of claim 1 further comprising playing back the audio and/or visual file on the cellular phone.

4. The method of claim 1 further comprising using the audio and/or visual file as an alert message for the cellular phone wherein the audio and/or visual file is played to alert a user of the occurrence of an event.

5. The method of claim 4 wherein the audio and/or visual file is associated with a specific caller's phone number, and wherein the audio and/or visual file plays upon receiving the call from the specific caller.

6. The method of claim 1 further comprising: said cellular phone being shared by a plurality of users, wherein a plurality of audio and/or visual files are delivered to and stored on said cellular phone, and wherein a specific audio and/or visual file of said plurality of audio and/or visual files is associated with a specific user of said plurality of users, wherein said specific audio and/or visual file alerts the user of an incoming call where said specific user is the intended recipient of said incoming call.

7. The method of claim 1 wherein said audio and/or visual file is selected from a personal recording recorded by a user of the device, or one or more segments of an audio and/or visual file or a mixture thereof.

8. The method of claim 1 further comprising charging a fee to a user of the device, said fee being charged based on a number of audio and/or visual files received.

9. The method of claim 1 wherein the audio and/or visual file is selected from master recordings, CD tracks, DVD tracks, and video.

10. The method of claim 1 wherein the cellular phone replies to the service provider to effectuate purchase of an item associated with said audio and/or visual file, upon playing the contents of said audio and/or visual file.

11. The method of claim 1 further including automatically disconnecting from the service provider after the digital signal processor acknowledges to the one or more servers the successful delivery of the audio and/or visual file.

* * * * *